(12) United States Patent
Venzac et al.

(10) Patent No.: US 10,780,435 B2
(45) Date of Patent: Sep. 22, 2020

(54) FLUIDIC DEVICES WITH AT LEAST ONE ACTIONNABLE FIBER

(71) Applicants: CENTRE NATIONAL DE LA RECHERCHE SCIENTIFIQUE, Paris (FR); INSTITUT CURIE, Paris (FR); UNIVERSITE PIERRE ET MARIE CURIE, Paris (FR)

(72) Inventors: Bastien Venzac, le Kremlin-Bicetre (FR); Ayako Yamada, Paris (FR); Jean-Louis Viovy, Paris (FR); Stephanie Descroix, Paris (FR); Laurent Malaquin, Ayguesvives (FR)

(73) Assignees: CENTRE NATIONAL DE LA RECHERCHE SCIENTIFIQUE, Paris (FR); INSTITUT CURIE, Paris (FR); UNIVERSITE PIERRE ET MARIE CURIE, Paris (FR)

( * ) Notice: Subject to any disclaimer, the term of this patent is extended or adjusted under 35 U.S.C. 154(b) by 223 days.

(21) Appl. No.: 15/744,452

(22) PCT Filed: Jul. 22, 2016

(86) PCT No.: PCT/EP2016/067502
§ 371 (c)(1),
(2) Date: Jan. 12, 2018

(87) PCT Pub. No.: WO2017/017003
PCT Pub. Date: Feb. 2, 2017

(65) Prior Publication Data
US 2018/0193833 A1    Jul. 12, 2018

(30) Foreign Application Priority Data
Jul. 24, 2015  (EP) .................................... 15306215

(51) Int. Cl.
*B01L 3/00* (2006.01)
*F16K 99/00* (2006.01)

(52) U.S. Cl.
CPC ... *B01L 3/502707* (2013.01); *B01L 3/502738* (2013.01); *F16K 99/0003* (2013.01);
(Continued)

(58) Field of Classification Search
CPC ..... B01L 2300/0816; B01L 2300/0874; B01L 2300/123; B01L 2400/0406;
(Continued)

(56) References Cited

U.S. PATENT DOCUMENTS 5,104,813 A    4/1992  Besemer et al.
6,074,869 A    6/2000  Pall et al.
(Continued)

FOREIGN PATENT DOCUMENTS

DE    1029746 A1    4/1992
EP    1628769 A1    3/2006
(Continued)

OTHER PUBLICATIONS

Wong et al., "Partitioning Microfluidic Channels with Hydrogel to Construct Tunable 3-D Cellular Microenvironments", Biomaterials, 2008, pp. 1853-1861, vol. 29, No. 12.
(Continued)

*Primary Examiner* — Jennifer Wecker
(74) *Attorney, Agent, or Firm* — Nixon & Vanderhye

(57) ABSTRACT

Disclosed is a minifluidic device including a matrix, an elongated guiding duct embedded at least in part in the matrix, with at least one port to the outside of the matrix, a movable fiber at least partly contained in the guiding duct, and able to undergo within the guiding duct, and at least along some part of the fiber, at least one action selected among a sliding, or a deformation, or a rotation and at least
(Continued)

one of the movable fiber or the guiding duct is elastic or is non linear along at least part of its length, or at least part of the matrix is elastic.

18 Claims, 22 Drawing Sheets

(52) U.S. Cl.
CPC ...... *F16K 99/0011* (2013.01); *F16K 99/0013* (2013.01); *B01L 2300/0816* (2013.01); *B01L 2300/0883* (2013.01); *B01L 2400/065* (2013.01); *B01L 2400/0644* (2013.01); *F16K 2099/0073* (2013.01); *F16K 2099/0082* (2013.01); *F16K 2099/0084* (2013.01)

(58) Field of Classification Search
CPC ..... B01L 2400/0487; B01L 2400/0655; B01L 2400/082; B01L 3/502707; B01L 3/502746; B01L 3/561; B29C 70/023; B29C 70/22; B32B 2250/20; B32B 2260/023; B32B 2260/046; B32B 2260/048; B32B 2262/0238; B32B 2262/0253; B32B 2262/0261; B32B 2262/0269; B32B 2262/0276; B32B 2262/04; B32B 2262/062; B32B 2262/065; B32B 2262/08; B32B 2262/10; B32B 2262/101; B32B 2262/103; B32B 2262/105; B32B 2262/106; B32B 2266/122; B32B 2307/202; B32B 2307/302; B32B 2307/412; B32B 2307/414; B32B 2307/7163; B32B 2307/722; B32B 2307/7265; B32B 2307/728; B32B 2307/73; B32B 2535/00; B32B 3/08; B32B 3/20; B32B 3/30; B32B 5/022; B32B 5/024; B32B 5/026; B32B 5/142; B32B 5/26; D03D 11/02; D03D 13/002; D03D 15/06; D06M 15/15; D06M 15/643; D06M 2101/06; D10B 2201/02; D10B 2505/02; D10B 2509/00; F16L 11/085
See application file for complete search history.

(56) References Cited

U.S. PATENT DOCUMENTS

| | | | |
|---|---|---|---|
| 6,558,665 | B1 | 5/2003 | Cohen et al. |
| 7,419,822 | B2 | 9/2008 | Jeon et al. |
| 7,972,561 | B2 | 7/2011 | Viovy et al. |
| 8,220,494 | B2 | 7/2012 | Studer et al. |
| 2002/0155032 | A1 | 10/2002 | Liu et al. |
| 2004/0053295 | A1* | 3/2004 | McKinnon ........... B01J 19/0046 435/6.19 |
| 2005/0146076 | A1* | 7/2005 | Alexander ........... D03D 1/0088 264/257 |
| 2005/0150766 | A1 | 7/2005 | Manz et al. |
| 2007/0154355 | A1 | 7/2007 | Berndt et al. |
| 2010/0200400 | A1 | 8/2010 | Revol-Cavalier |
| 2011/0044864 | A1* | 2/2011 | Kawazoe ............. B01J 19/0093 422/502 |
| 2011/0100472 | A1 | 5/2011 | Juncker et al. |
| 2011/0189786 | A1 | 8/2011 | Reches et al. |
| 2011/0206558 | A1 | 8/2011 | Kawazoe et al. |

FOREIGN PATENT DOCUMENTS

| | | |
|---|---|---|
| FR | 2942041 A1 | 8/2010 |
| WO | 02/45842 A1 | 6/2002 |
| WO | 2010/017578 A1 | 2/2010 |
| WO | 2010/111265 A1 | 9/2010 |

OTHER PUBLICATIONS

Oh et al., "A review of microvalves", Journal of Micromechanics and Microengineering, 2006, vol. 16, pp. R13-R39.
Hasselbrink et al., "High-Pressure Microfluidic Control in Lab-on-a-Chip Devices Using Mobile Polymer Monoliths", Analytical Chemistry, 2002, vol. 74, No. 19, pp. 4913-4918.
Lagally et al., "Monolithic integrated microfluidic DNA amplification and capillary electrophoresis analysis system", Sensors and Actuators B: Chemicals, 2000, pp. 138-146, vol. 63, No. 3.
Hulme et al., "Incorporation of prefabricated screw, pneumatic, and solenoid valves into microfluidic devices", Lab on a Chip, 2009, pp. 79-86, vol. 9, No. 1.
Huebner et al. "Static microdroplet arrays: a microfluidic device for droplet trapping, incubation and release for enzymatic and cell-based assays", 2009, pp. 692-698, vol. 9, No. 5.
Zhao et al., Lab on a Chip, DOI 10.1039/C3LC5106.
Verma et al., "Embedded Template-Assisted Fabrication of Complex Microchannels in PDMS and Design of a Microfluidic Adhesive", Langmuir, 2006, pp. 10291-10295, vol. 22, No. 24.
http://www.apparelsearch.com/fibers/htm.
http://en.wikipedia.org/wiki/List_of_textile_fibers.
http://en.wikipedia.org/wiki/List_of_fabric_names.
http://en.wikipedia.org/wiki/Category:Technical_fabrics.
http://en.wikipedia.org/wiki/Loom.
Reches et al., "Thread as a Matrix for Biomedical Assays", ACS Applied Materials and Interfaces, American Chemical Society, 2010, pp. 1722-1728, vol. 2, No. 6.
Reches et al., "S1 Supporting Information Thread as a Matrix for Biomedical Assays", ACS Applied Materials and Interfaces, 2010, pp. S1-S14.
International Search Report, dated Oct. 6, 2016, from corresponding PCT application No. PCT/EP2016/067502.
htpp://en.wikipedia.org/wiki/knitting_machine.
http://en.wikipedia.org/wiki/list of knitting stitches.

* cited by examiner

FLUIDIC DEVICES WITH AT LEAST ONE ACTIONNABLE FIBER

FIELD OF THE INVENTION

The invention pertains to the field of mini-, micro-, nano- and millifluidic systems and methods to prepare such systems. More specifically, the invention is directed to a fluidic system comprising at least one guiding duct and at least one movable fiber at least partly contained in said guiding duct,

BACKGROUND OF THE INVENTION

Microfluidic devices, or more generally minifluidic devices, are gaining considerable importance, thanks to their ability to perform analyses faster and with smaller amounts of material, and also to their ability to perform reactions, assays, cell culture, and all kinds of physical, chemical or biological application with an accuracy unavailable to conventional devices. Their range of application is increasing very fast. It encompasses, non-limitatively, diagnostics, monitoring of food quality, environmental contamination, security, forensics, chemical, physical or biological processes. Another field of interest is the development of portable or wearable devices for health monitoring, for persons in difficult environments, e.g. in military, scientific or humanitary operations, for sports, or for dependent persons. A third range of applications is the development of new tools for research, notably biological, medical, biomedical, pharmaceutical research. Of particular interest is the development of cell or tissue biology on chip, cell culture, tissues on chip, organs on chip, for fundamental research and/or for drug discovery, drug screening, stem cell research, and the like.

Current mini and microfluidic devices rely on networks of microchannels in which fluids circulate and can be processed. Typically, said channels are prepared in solid substrates by different methods issued from the electronic industry, such as photolithography, electron-beam lithography, dry or wet etching. They can also be prepared by laser ablation, hot embossing, injection molding, micromachining, or by molding from a previously prepared negative master. A substrate comprising such a microchannel is sometimes called in the art "microfluidic chip".

Among the different functionalities needed to operate a microfluidic device, is the possibility to open or close flow paths, or to compartmentalize a given volume of fluid in subvolumes. Various means have been developed in the field, to allow for control of flow displacement or fluid compartmentalization. A first approach is to control the displacement of fluids externally, thanks to external valves such as pinch valves. However, due to the high miniaturization of the chip, this creates spurious pulses during valve operation, and often hysteresis. This problem was partly solved e.g. by control of pressure, as described e.g. in EP1628769. However, this method allows for instance control of flow, but it does not allow the compartmentalization between two different areas in the device, or prevent diffusion from one area to the other, even if the flow is perfectly stopped or stabilized. There is thus a strong need for implement valves or means for compartmentalization, directly on chip.

U.S. Pat. No. 7,419,822 describes a microfluidic device for enabling fluidic isolation among interconnected compartments. This device involves microchannels with a high flow resistance. However, this provides only a limitation of flow and not a sealing. Better sealing was achieved in Wong et al., Biomaterials 29 (2008) 1853e1861. In the two above types of devices, however, compartmentalization is defined by the chip design, and it cannot be changed dynamically.

This situation has been improved by integrating valves in the structure of the chip. Numerous ways of integrating valves in microfluidic devices or chips were developed. Many of them are described in the review K W Oh et al., J. Micromech. Microeng. 16 (2006) R13-R39. For instance, Hasselbrink et al disclose in Anal. Chem. 744913-8 (2002) an in-line microvalve using a mobile polymer structure, created by an in situ photopolymerization method inside microchannels. The mobile structures are created by completely filling the microchannels of a glass microfluidic chip with the monomer/solvent/initiator components of a non-stick photopolymer and then selectively exposing the chip to UV light in order to define mobile pistons inside the microchannels. However, this procedure is complex, and the pistons are only responding to the flow or pressure inside the channels. They can provide for instance check valves, but they cannot provide compartmentalization.

Lagally et al. in Sensors Actuators B63138-46 (2000), or Quake et al., in U.S. Pat. No. 8,220,494, alleviate the above problem, by developing integrated valves with membranes. These membranes, however, require actuation by an external pressure, i.e. an external pressure source, and a complex and leak-proof circuitry to distribute the required pressure to the valves. They also require a complex multi-layers microfabrication process.

In Lab on Chip 2009, 9,79-86, Hulme et al describe screw or solenoid valves that partly alleviate the above problem, by integrating solenoids or screws directly on top of a PDMS microfluidic chip. This method, however, involves other disadvantages, notably the fact that solenoid valves are bulky, produce heat, and thus put strong constraints on the positioning of the valves and on the chip operation.

In a different spirit, other groups developed microfluidic methods able to compartmentalize fluids in microfluidic devices, without the use of integrated valves. For instance, in Lab Chip, 2009, 9, 692-698, Huebner et al., discloses a device in which a liquid can be compartmentalized in droplets, and the droplets can be arrested and used as microreservoirs to grow cells. However, fluids cannot be exchanged reversibly with these compartments, and the need for a supporting oil is a complication, leading to possible leakage or contamination. Also, these methods do not allow valving.

In Lab on Chip, DOI: 10.1039/C3LC5106, Zhao et al. disclose another type of devices, in which compartmentalization is achieved by sliding two substrates containing cavities with regards to each other. This is more versatile than methods and devices based on droplet, since these new devices allow e.g. valving. However, these devices require complex microfabrication, and the sealing also involves an oil, with the same disadvantages as above.

WO2010111265 discloses a device for carrying out a reaction, the device comprising: a first part having a first surface, at least one first area located along a portion of the first surface, the at least one first area configured to maintain at least one first substance, a second part having a second surface opposed to the first surface, and at least one second area located along a portion of the second surface, the at least one second area configured to maintain at least one second substance, wherein at least one of the first surface of the first part and the second surface of the second part is configured to move relative to the other between a first position, where the at least one first area is not exposed to the at least one second area, and a second position, where one of the at least one first areas is only exposed to one of the at least one second areas and form a closed system. This device offers a lot of possibilities to perform reactions. However, the need to keep together intimately two surfaces bearing complex areas, without leakage, is technically difficult, and limits the operation of the system.

In the prior art, M. K. S. Verma et al., Langmuir 2006, 22, 10291-10295 described methods in which a wire was embedded in a matrix, and then a channel was created in said matrix by removing the wire. However, the device wherein the removable wire is still embedded in the matrix is an intermediate, non functionalized, product, not meant for use as a microfluidic device.

WO02/45842 discloses a linear array device comprising an elongate substrate having a linear array of different spatially addressable probe moieties anchored thereto. The device is contacted with the sample under conditions conducive to selective binding with a specific probe moiety, then it is drawn past a reading apparatus for providing linear spatial address data for said probe moieties and so as to detect signal indicating the presence of bound analyte.

WO2010/017578 discloses a microfluidic system including a substrate in sheet form of paper or similar material, at least one hydrophilic microfluidic channel supported on a surface of the substrate, and a cut within the substrate for providing a switch or filter component for the microfluidic channel.

U.S. Pat. No. 6,074,869 discloses a melt-blown fibrous web with a high degree of weight uniformity. It also provides products incorporating such fibrous webs, such as devices that may include a capillary to deliver biological fluids to or from the device.

US2002/0155032 discloses a microfluidic device using one or more slidable blocks having at least one fixed-length sample metering channel.

US2007/0154355 discloses a plastic material microfluidic device having an interface for coupling and flow controlling a flow path between the plastic and a second microfluidic device, which can be made e.g. of glass. This allows coupling e.g. different material microfluidic devices e.g. in order to make use of advantages of different material type microfluidic devices.

DE4029746 discloses a device for the simultaneous measurement of various physical and chemical parameters in a measuring liquid. Said device includes a microfluidic network comprising one or more slidable strips that modify the connectivity of the network.

U.S. Pat. No. 5,104,813 discloses a microfluidic device comprising pins that can control the connectivity between two channels.

There is thus a strong need for new devices, in which the flow path in microfluidic channels, or the fluidic insulation between different microfluidic channels, can be controlled in a dynamic and simple way.

SUMMARY OF THE INVENTION

A first object of the invention consists in a minifluidic device comprising at least:
a/ a matrix,
b/ an elongated guiding duct embedded at least in part in said matrix, with at least one port to the outside of the matrix,
c/ a movable fiber at least partly contained in said guiding duct, and able to undergo within said guiding duct, and at least along some part of said fiber, at least one action selected among a sliding, or a deformation, or a rotation.

According to a favorite embodiment, the device further comprises:
d/ at least one zone in fluidic connection with said guiding duct, said zone being selected from: a fluid drop area, a reservoir, or a chamber.

According to a favorite embodiment:
at least one of the movable fiber or the guiding duct is elastic or is non linear along at least part of its length.

According to a favorite embodiment:
at least part of the matrix is elastic

The invention is also directed to an instrument comprising a device as above disclosed, said instrument being any of, or any combination of, an analytical instrument, a medical instrument, a functional clothing, a wearable instrument, an implantable instrument, a monitoring instrument, a processing instrument.

The invention is further directed to a method of initiating, or modifying, or controlling, or stopping fluid flow in a fluidic device or a fluidic instrument as above disclosed, wherein said method comprises at least one of a pulling, a pushing, a deformation, or a rotation, at least along some part of the movable fiber.

The invention is also directed to a method for analyzing any of a biological, a physical or a chemical agent, or for monitoring a process, an environment, a living species, a condition of a patient or for producing a product, or for discovering or testing a drug or an active product, or for cultivating cells, wherein said analysis, monitoring, production, discovery, or test, is performed using a device or an instrument as above disclosed, or a method of initiating, or modifying, or controlling, or stopping fluid flow, according to the invention.

According to a favorite embodiment, the minifluidic device is a microfluidic device, or a millifluidic device, or a nanofluidic device.

According to a favorite embodiment, the said fluid drop area or reservoir or chamber, is enclosed at least in part within said matrix or supported by said matrix. By "enclosed at least in part", we mean a configuration in which the fluid drop area, the chamber and the reservoir is mostly surrounded and enclosed by the matrix, but said surrounding may present some local discontinuities, for instance for inlets or outlets of fluids.

According to a favorite embodiment, the device comprises means for actuation of said movable fiber, preferably, means suitable to induce onto said movable fiber at least one of a pulling, a pushing, a deformation, or a rotation, at least along some part of said fiber.

According to a favorite embodiment, said means are mechanical means.

According to a favorite embodiment, the device comprises a multiplicity of guiding ducts and a multiplicity of movable fibers at least partly contained in said guiding ducts and able to undergo within said guiding duct, and at least along some part of said fibers, at least one action selected among a sliding, or a deformation, or a rotation.

According to a favorite embodiment, the device comprises common means, preferably, mechanical means, suitable to induce onto said movable fibers at least one of a pulling, a pushing, a deformation, or a rotation, at least along some part of said fibers.

According to a favorite embodiment, the at least some of said movable fibers are mechanically related, and can be actuated together by a single manipulation means.

According to a favorite embodiment, the movable fiber comprises at least one zone presenting fluid flow properties different from fluid flow properties in a different part of the fiber, said zone being preferably selected from: a hole, a via, an indentation, a change in cross-section, a lumen, a porous zone, a zone of material permeable to fluids, a gel.

According to a favorite embodiment, the movable fiber is hollow on at least part of its length.

According to a favorite embodiment, the lumen of said hollow fibers does not connect fluidically to the outside of the device.

According to a favorite embodiment, the movable fiber and the guiding duct cooperate to make a fluid-tight closing of at least a part of the guiding duct.

According to a favorite embodiment, at least one of the guiding duct, the matrix and the movable fiber is flexible or semi-flexible.

According to a favorite embodiment, the device further comprises at least one channel intersecting with the guiding duct, or at least one channel network in fluidic connection with the guiding duct.

According to a favorite embodiment, the actuation of said movable fiber within a guiding duct modifies the fluidic connectivity, or at least one fluidic resistance, within a channel or within a channel network of the device.

According to a favorite embodiment, the device additionally comprising a textile component embedded in said matrix, and wherein the guiding duct is entangled with said textile component.

According to a favorite embodiment, the matrix is transparent to light in at least some places.

According to a favorite embodiment, the path of the guiding duct is non-linear or is three-dimensional, or the guiding duct is in fluidic connection with a non-linear or three-dimensional channel, or with a non-linear or three-dimensional channel network.

In some preferred embodiment, said device is a minifluidic chip

In some preferred embodiment, said device is a microfluidic chip.

In some preferred embodiment, said device is a millifluidic chip.

In some preferred embodiment, said device is a nanofluidic chip.

In some other aspects, the invention is a system, or an instrument.

In some preferred embodiments, said device is microfluidic. In some other preferred embodiments, said device is millifluidic. In yet some preferred embodiments, said device is nanofluidic.

In some preferred embodiments, said action is a sliding.

In some other preferred embodiments, said action is a rotation.

In some preferred embodiments, said deformation may be any of a twisting, a stretching, a compression, a bending, or any combination thereof.

In some specific preferred embodiments, said deformation is a twisting

In some specific preferred embodiments, said deformation is a stretching

In some specific preferred embodiments, said deformation is a compression, or a bending.

The invention is further directed to a kit for preparing, connecting or using a minifluidic device or instrument, comprising, on the first hand, a minifluidic device as above disclosed, and on a second hand, at least one component selected among:

a fluid,
a chemical product or a biological product, or
an additional physical component.

According to a favourite embodiment of the kit, said additional physical component is a disposable fluidic component.

According to a favorite embodiment of the kit, said additional physical component is capable of fluidic connectivity with the minifluidic device.

According to a favorite embodiment of the kit, said disposable fluidic component is selected from: a tube, a fluidic connector, a fluid container, a duct, a fluid mobilization means, a syringe, a fluidic device, a pump, a valve, a sensor, a detector, a pressure source, an electric component, a magnetic component, an optical components, an information treatment components, a housing, a tag, an identification means, a barcode, a holder, a manipulation means, a mechanical manipulation means, a fiber manipulation means, a handle.

According to another favorite embodiment of the kit, the fluid is selected from: a solvent, a buffer, a nutritive medium, a medium appropriate for cell culture, a solution, an emulsion, an oil.

According to another favourite embodiment of the kit, the chemical product is selected from: an organic molecule, a mineral salt, a pharmaceutical active principle, a peptide, a protein, a fluorescent marker.

According to another favourite embodiment of the kit, the biological product is selected from: an AND fragment, an ARN fragment, a probe, an antigen, an antibody.

It is also an object of the invention to propose a method of preparing a functional minifluidic device, comprising the steps of a/ providing a matrix comprising at least a guiding duct embedded at least in part in said matrix, with at least one port to the outside of the matrix, b/ providing a movable fiber, with non adhesive or weakly adhesive properties with regards to said matrix, c/ embedding at least in part said movable fiber within said guiding duct, wherein said ensemble of the matrix, the guiding duct and the fiber partly or fully enclosed in said guiding duct is operational without full removal of said movable fiber from said guiding duct.

In some preferred embodiments, said embedding of the movable fiber is performed after the preparation of the guiding duct, for instance by insertion.

In some other preferred embodiments, said embedding is performed simultaneously with the preparation of the guiding duct, for instance by preparing the matrix from a matrix precursor material embedding said fiber.

In yet some other preferred embodiments, said embedding is performed by casting the movable fiber in situ in the guiding duct, for instance by hardening of a hardenable fiber precursor material.

It is thus another object of the invention, to propose a method of preparing or commercializing a product comprising a minifluidic device, comprising the steps of a/ providing a matrix comprising at least a guiding duct embedded at least in part in said matrix, with at least one port to the outside of the matrix, b/ providing a movable fiber, with non adhesive or weakly adhesive properties with regards to said matrix, c/ embedding at least in part said movable fiber within said guiding duct, d/ packaging, or commercializing, or including in a kit, the chip constituted by said matrix, said guiding duct and said movable fiber partly or fully enclosed in said guiding duct.

It is thus another object of the invention, to propose a packaged product, or a kit comprising a minifluidic chip comprising at least:

a/ a matrix, b/ a guiding duct embedded at least in part in said matrix, with at least one port to the outside of the matrix, c/ a movable fiber partly or fully enclosed in said guiding duct, d/ a package or container containing said minifluidic chip, In some preferred embodiments of the above methods, devices, chips, products or kits, said guiding duct has a cross-section comparable with the cross-section of said movable fiber along part of the length of said duct, and along part of the length of said fiber.

In some preferred embodiments, said chip additionally comprises a minichannel, or minichannels network, in fluidic connection with said guiding duct.

The invention is also directed to a method for analyzing any of a biological, a physical or a chemical agent, or for monitoring a process, an environment, a living species, a condition of a patient or for producing a product, or for cultivating cells, or for discovering or testing a drug or an active product, comprising the steps of a/ providing a matrix comprising at least a guiding duct embedded at least in part in said matrix, with at least one port to the outside of the matrix, b/ providing a movable fiber, with non adhesive or weakly adhesive properties with regards to said matrix, c/ embedding at least in part said movable fiber within said guiding duct, d/ placing in a chip holder, or in an instrument, the chip constituted by said matrix, said guiding duct and said movable fiber partly or fully enclosed in said guiding duct, or flowing in said chip at least a liquid.

According to a favorite embodiment, said method is an in vitro method or an ex-vivo method.

As compared to the prior art, the devices according to the invention provide numerous advantages: they are of a simple design, they are easy to make, they can achieve multiple flow control functions. They are adaptable to varied fluidic networks geometry, to varied fluids, to varied uses. They can be produced industrially with cheap production methods.

In one of its aspects, the invention provides ways to integrate in a microfluidic device some functionalities, which do not yet exist in microfluidics, or may already exist in microfluidics, but can be implemented more simply and at lower cost thanks to the invention. In some of its aspects, the invention also provides new microfluidic devices with improved performances and/or functionalities.

The invention is also helpful in constituting, at low cost and without microfabrication environments, microfluidic devices or integrated microfluidic devices with a number of different functionalities.

One main advantage of the invention, is to allow the performance of diverse functionalities within a microfluidic, or more generally a minifluidic, chip or device, directly in chip, with very little dead volume, and without the need to resort to complex multilayer microlithography, as in prior art.

This is achieved by a movable fiber, which can be actuated from outside, e.g. by mechanical means, such as pulling, rotating, stretching. The translation and/or rotation or deformation of the fiber can be achieved with accuracy, by guiding said fiber in a guiding duct, itself prepared in the matrix constituting the chip, or more generally a matrix constitutive of some part of the device.

As opposed to earlier methods in the art that comprise elements movable with regards to each other to perform some compartmentalization or action, such as WO2010111265, in the present invention, the presence of guiding ducts enclosing the movable fiber, allows an unprecedented flexibility about the positions within the device where said movable fibers can exert their action, and also makes the avoidance of leaks more easy. It also allows the possibility to develop 3D, or flexible or semi-flexible devices, or to involve in the same device several moving fibers that move differently.

Also, the properties of having a port to the guiding duct, offers much more flexibility of manipulation, as compared for instance to prior art, e.g. Anal. Chem. 744913-8 (2002) in which rigid mobile polymer structures were polymerized in situ. According to the invention, movable fibers can protrude from guiding ducts, offering easy means to manipulate them.

Manipulation can induce actions on the invention's movable fiber, in order to perform some preselected operation in the device.

The possibility to obtain the advantages of the invention, with different types of actions, also provides a lot of flexibility, as compared e.g. to in U.S. Pat. No. 8,220,494 to Quake, where valving can be achieved only by bending a membrane, which imposes a very specific shape of the microchannels. For instance, as will be shown below, movable fibers with via or changes of shapes can achieve altogether pumping, or insulation, onto channels or chambers of various shapes. Also the device disclosed in U.S. Pat. No. 8,220,494 requires external pressure sources, which are cumbersome.

Twisting, stretching, or compression, can be interesting to induce at some place a change in volume or diameter, within movable fibers that have a moderate elastic module. Thanks to conservation of mass, said twisting, compression or stretching will allow for instance a change in diameter, without global translation. Oppositely, rotation or sliding of movable fibers with a high elastic modulus, allows for instance the displacement of a via, or more generally of a zone presenting a change of shape or composition, inside the guiding duct, or more generally within the minifluidic device.

Also, one should note that in some preferred embodiments, the movable or actionable fiber can be movable in some part of its length, which can be pulled or pushed or rotated, and non-movable with regards to the device along some other part of its length. This can be achieved, for instance by creating on one side of the fiber, for instance a side opposite to the manipulation port with regards to an intersection of the fiber with a channel, a topological structure, or an attachment of the fiber within the matrix, which prevents this side from moving with regards to the matrix, when the other side of the fiber is pulled, pushed or rotated. This can be used for instance to impart to said fiber a deformation suitable to change the transport of fluid across said fiber. In other embodiments, this can also be used to induce reversible or irreversible deformation of the device when said fiber is pulled or pushed.

In many prior art systems, channels or channel networks have transport properties that are fixed, and performing or modifying transport need external control means on each channel entrance, such as e.g. pressure in EP1628769 to Fuetterer, or electric field in US2005150766 to Manz et al.

Or the action of an external pressure via a multiplicity of annex channels, as in U.S. Pat. No. 8,220,494. The possibility to use a variety of mechanical means allows simpler operation, and less power source. It even allows, in some embodiments, manual operation, which is very important e.g. for applications in remote places or in operation fields.

Devices of the invention may also be interesting in various dimensions. Also, the invention may be implemented as a simple microfluidic chip, or as a more integrated device, such as an instrument, or as a more complex system.

DETAILED DESCRIPTION

The invention relates to the field of miniaturized fluidic devices, an emerging field in which some definitions may not have a fully universal acceptation, so to avoid ambiguities this description will rely on the following definitions and specifications.

In all the description, "comprising" followed by a list of characteristics means "comprising at least" these characteristics.

Definitions

Fiber: By fiber, or "wire", we mean any linear solid object, with one dimension much larger than the two others. Fibers in the invention may be made of a single, monolithic fiber, or of many smaller fibers or subfibers assembled together by any method, such as twisting, bundling, braiding, and the like. Objects called wires, ropes, yarns, strands, threads, filaments, in the art of fibers or textile, or materials, are also encompassed in the term «fiber», within the description of the invention.

Monofilament Fiber: In the description of the invention, we restrict the term «monofilament fiber» to monolithic elongated pieces of material.

Support fiber: a fiber of a solid material, which adheres strongly to, or can be wicked by the matrix of the invention. Typically, support fibers in the invention are mechanically cohesive with the matrix, and will thus deform following deformations of the matrix. In many preferred embodiments, said support fibers contribute to the mechanical properties of the minifluidic component or chip as a whole, imparting it, for instance, additional performances in domains such as better tear resistance or a higher elongational modulus. Typically, support fibers in the invention can be a yarn, a thread, a fiber made, for example, of cotton, nylon, polyester, polyolefins (such as polypropylene), fluoropolymers (such as polyvinylidene fluoride), nitrocellulose, cellulose, cellulose acetate, and glass microfiber structures. This support fiber can be made of bundled subfibers, using various standard techniques known in the art, which may include, twisting, braiding, holding multiple strands together tightly, and the like, and combinations thereof.

In some preferred embodiments, support fibers may also be instrumental in retaining and/or positioning movable or removable fibers as defined below, at precise locations or along precise paths during the preparation of the minifluidic component or chip, without the need of expensive microfabrication tools. This use, however, is different from the use of fibers to prepare a reserve in the matrix for the future position of a channel, or of a guiding duct: the latter function is performed by movable or removable fibers.

Deformation: characterizes the behavior of a fiber, a textile, a matrix or a channel that changes shape when submitted to a mechanical stress, said change being for example and in a non limitative manner, a bending, an elongation, a twisting, a bending, or a compression. This capacity of deformation distinguishes a fiber, a textile, a matrix or a channel as compared to another element that will break or be irreversibly damaged when submitted to the same mechanical stress.

Reversible deformation characterizes the behaviour of a fiber, a textile, a matrix or a channel that changes shape when submitted to a mechanical stress and reverts partially, or preferably totally, to its initial shape when the stress is relaxed.

Movable fiber: As opposed to a support fiber, we designate as a movable fiber, a fiber that does not adhere strongly to, cannot be wicked by, or is mobile with respect to, the matrix, as opposed to the threads or yarns used in the prior art in minifluidic devices, which adhere to the matrix when they are encompassed in such a matrix. Typically, movable fibers in the invention can be made of a monolithic material, for instance plastic, glass, ceramic, metal, or biopolymer. In some embodiments, movable fibers can also keep some porosity, or be made of multiple subfibers, but in this case they present interfacial properties that prevent adhesion or absorption of the matrix. We also encompass in the definition of «movable fiber», fibers that have the property of being movable as defined above, on part of their length within the minifluidic device, and may not have this property on another part of their length in the microfluidic device.

By "actionable fiber", we designate a fiber that has at least one part that can be manipulated by external means, said manipulation changing its position or shape within the device. For instance, said manipulation may be any of a pulling, a pushing, a twisting, a rotation, or a combination thereof. An actionable fiber is in general a movable fiber.

By "removable fiber", we designate a fiber that is fully removed from the matrix, after casting or hardening of the matrix. A removable fiber is also a movable fiber, but the opposite is not necessarily true.

When the term "fiber" is used in the description without the specific qualification of "support", "removable", "movable", or "actionable", this is intended to mean a "movable fiber".

Flexibility: A fiber, or a sheetlike device, is called "flexible", if it can be bent without permanent deformation or breaking, with a radius of gyration smaller than the fiber's or device's largest dimension.

A fiber or sheetlike device is called "highly flexible", if it can be bent without breaking or irreversible deformation, at essentially any angle and with essentially any radius of gyration compatible with steric hindrance. To fix ideas, a fiber or a device is considered "flexible", if it can be bent without breaking or irreversible deformation, with a radius of gyration smaller than five times its thickness along the axis defining the radius of gyration of the bending.

A fiber, or a sheetlike device, is called "semi-flexible" if it can be bent without permanent deformation or breaking, at arbitrary angles, and with a radius of gyration significantly larger than its smaller lateral dimension, e.g. at least 5 times said smaller lateral dimension, but still smaller than the fiber or device largest dimension. For a fiber, said largest dimension is for instance the fiber's length, or, in some embodiments, the length of the fiber embedded in the matrix. Except if specified otherwise, highly flexible and semi-flexible fibers, or devices, are encompassed within the term "flexible" fibers or devices.

Conversely, a fiber, or a sheetlike device, is called "rigid", if it cannot be bent without permanent deformation or breaking, with a radius of gyration smaller than the fiber's or device's largest dimension.

Textile: by «textile», we designate in the description an object made of a multiplicity of threads or fibers, or made of a single fiber or thread with a multiplicity of bends or folds, so that said object involves multiple combinations of overcrosses and undercrosses. Preferably, said combination of overcrosses and undercrosses contribute to give said object its shape and mechanical properties.

Objects designated as «fabric», «cloth», «felt» in the industry are also encompassed in the definition of «textile» within the invention, provided they comprise a multiplicity of over and undercrosses between fibers, or a multiplicity of over and undercrosses of the same fiber. As a matter of example, the woven or non-woven fabrics or textiles used in clothing, but also woven and non-woven technical textiles or geotextiles, are encompassed in the definition of textile, and usable as such within the invention.

Interwoven or Entangled: we define a fiber or a channel, or a guiding duct as «interwoven» or «entangled» with a textile or a fabric or another fiber or an ensemble of fibers, when it has a multiplicity of underpasses and overpasses with said fiber or at least some fibers of said textile or fabric, or ensemble of fibers. This is used in a general sense, and is thus not necessarily restricted to devices prepared by a textile weaving method, although said textile weaving methods can advantageously used in some embodiments.

Matrix: a solid material in which the textile and any of the guiding ducts or the channels of the invention are embedded at least in part. Matrices of the invention can be made of a large variety of materials.

By «solid» we designate a matrix constituted by a material that is able to keep a memory of its shape over long time periods, as opposed to a gas or a liquid. Besides this, solid matrices in the invention can have all kinds of viscoelastic properties, notably they can be rigid, elastic, viscoelastic, thermoplastic. By long time periods, we mean in general one to several minutes, hours or even years.

By "embedded", designating a channel or a guiding duct in a matrix, we mean that said channel or said guiding duct is surrounded by said matrix on all its perimeter on at least part of its length, notwithstanding the fact that there may be some local places at which said channel or guiding duct is not surrounded by the matrix, due to a local unwanted defect, or in contrast, to produce some specific functionality, such as an access port to the channel, or a window for observation, or a way to specifically manipulate one or a multiplicity of fibers.

By "embedded", or "embedding", regarding a textile in a matrix, we mean that in at least part of the device, the matrix penetrates intimately said textile, being present at least in part between the fibers constituting said textile, For clarity, this opposes the invention to some devices of the prior art, e.g. US2011189786 to Reches, in which threads or yarns could be sandwiched between two layers of polymer, without penetration of this polymer material in the heart of the threads or yarns.

Hardenable material: As used herein, a material is said "hardenable", if it can undergo a transition from a fluid, e.g. liquid or pasty, state, to a solid state, a gel state, a viscoelastic state, and generally speaking a state in which it is able to keep its shape, as opposed to the behavior of a liquid. This also designates a material already having some limited solid-like properties, such as a physical gel, or a thixotropic material, and can undergo under some treatment a strengthening of some of its solid-like characteristics. Men in the art have different ways of characterizing solid-like characteristics, for instance, but not limitatively, by measure of elastic modulus, yield stress, indentation resistance, and the like.

This hardening can be achieved by using as material a polymerizable material, or a crosslinkable material, or a material that can increase its viscosity or elastic modulus by loss of a solvent, or by a change of temperature, or by irradiation. More preferable, this polymerization or crosslinking can be triggered e.g. by photoactivation, e.g. if said polymerizable material contains a photoactivator, or by thermal activation, e.g. by bringing at least a part of the device to a high temperature. As a second embodiment, this can be achieved by using a material that can change its viscosity or elastic modulus by application of a change of temperature. As an example, the material could be a melted material that can recover a glassy, crystalline or semicrystalline state by a decrease in temperature. The material could also be a material that can transit to a gel state by a decrease in temperature, such as e.g. a water suspension of agarose. Oppositely the material can comprise a material able to gelify by an increase in temperature, such as poly-N-Isopropyl Acrylamide (PNIPAM). Various additional types of hardenable material, usable for the invention, are recited e.g. in U.S. Pat. No. 6,558,665 to Cohen, or in the "Polymer Handbook", J. Brandrup et al. ed. Wiley, incorporated herein by reference. Hardening of said material can also be obtained by a combination of the above effects, first hardening the material by a fast thermal effect, and then making the hardening irreversible by a chemical effect, such as crosslinking or polymerizing.

Matrix precursor material: We designate here as precursor matrix material, a material that can embed a fiber, a multiplicity of fibers, or a textile, or any combination thereof, in a first state, and then be subjected to a treatment to reinforce its mechanical properties. Typically, the matrix precursor material is a hardenable material. The precursor matrix material can be selected, depending on the desired application, to be, after the hardening step, permeable or impermeable to specific species. The precursor matrix material can also be hardened by diffusion in said material of a reagent.

The precursor matrix material can be a coating paste, capable of hardening under specified conditions, which is in a fluid state, or in a gel state, allowing for its casting, spreading, spraying, lamination, and more generally any methods usable to coat or enduct a textile or another material.

Mechanically cohesive: When it is stated that a component, for example a textile component is mechanically cohesive with another component of the microfluidic device, notably the matrix, it means that any mechanical action applied to one or the other of said elements is simultaneously and necessarily sustained by the other element. A mechanical action may for example be a deformation, a pulling, a pushing, a folding.

By "sheetlike", designating an object such as a minifluidic device, or a matrix, or a component, or a chip, we mean that said object can be typically defined by two extended surfaces substantially parallel to each other, and separated by a given thickness. Usually, said thickness is small as compared to the surface's length and width. This must be considered, though, in a broad sense: for instance, the thickness may not be the same everywhere, and the surfaces may have all kind of shapes: in preferred embodiments, said surfaces are developable. Indeed, it is one of the objects of the invention, to provide minifluidic devices, that present all or some of the advantages of textiles and fabric or films, regarding their mechanical and manipulation properties, and thus to provide said properties to the matrix constituting the device.

By "channel", we mean any elongated space, tube, duct, pipe, conduit, along which a fluid substance can be transported. More specifically, we designate channels as microchannels if they are micrometric, i.e. if at least one dimension of their section is comprised between 1 µm and 1 mm. We designate channels as millichannels if they are millimetric, i.e. if at least one dimension of their section is comprised between 1 mm and 1 cm. We designate channels as nanochannels if they are nanometric, i.e. if at least one dimension of their section is comprised between 1 nm and 1 µm. Channels according to the invention are delimited, at least along part of their length, by walls that define an interior space. Further, channels in the devices according to the invention, are open along at least part of their length.

Minichannels: In many preferred embodiments, the invention is particularly interesting for microchannels. However, for the sake of terseness and completeness, in the following we shall design as minichannels channels that comprises along their length at least a portion that is either millimetric, micrometric, or nanometric. Channels within the invention are designated as "substantially enclosed" within a fluidic component, or chip, or within a device, or within a matrix i.e. they represent a fluidic path substantially contained and circumscribed by walls constituted by said fluidic component, chip, device or matrix, however a substantially enclosed channel can include inlets, outlets, exposed contact regions, and the like.

"Interconnected channels," as used herein, refers to two or more channels within the structure that are able to communicate fluid between and through each other.

A channel, or a multiplicity of non-connected or interconnected channels, defines in the device according to the invention one or several "flow paths", i.e. paths that a fluid can follow under the action of external forces.

A "non-linear" path or channel or guiding duct, as used herein, refers to such path or channel or guiding duct having a longitudinal axis that deviates from a straight line along its length by more than an amount equal to the minimum cross-sectional dimension of the channel or flow path.

The definition of non-linear paths encompasses paths with sharp angles, but also paths having along at least some of their length a continuous variation of the direction of their tangent, the latter paths being called here "curved". Typically, the curvature of a curved path in the invention, has a radius of curvature larger than one time, preferably two times of five times, the local lateral dimension of the channel along the direction of the radius of curvature.

A "longitudinal axis" of a channel or flow path or guiding duct as used herein refers to an axis disposed along the entire length of such a channel or flow path or guiding duct, which is coextensive with and defined by the geometric centerline of the direction of any bulk fluid which would flow through the channel or flow path should such channel or flow path be configured for a fluid to flow therethrough or, in case of a guiding duct, which is coextensive with and defined by the geometric centerline of the direction in which a fiber contained in said guiding duct could slide along said guiding duct.

A "longitudinal axis" of a fiber as used herein refers to an axis essentially following the 2D barycenters of consecutive cross-sections of said fiber.

As opposed to the longitudinal axis, a "lateral" direction or axis is any direction transverse to the longitudinal axis. In particular, a direction of axis perpendicular to the longitudinal axis of a channel, guiding duct or fiber, is said "lateral".

Open flow path or channel: by "open" we designate a flow path or channel, in which a fluid can be transported as a whole, without being separated in many ramifications. An open flow path or channel can be defined as a space, advantageously but not necessarily with a longitudinal shape, surrounded by walls, said space being free of any material except possibly fluids. This corresponds for instance to tubes or pipes, in contrast with e.g. channels filled with a porous material, or a wicking material. The open flow path or channel can present, at its extremities, or along its length, openings that connect the inside of the path or channel to another fluidic element or to the outside of the fluidic device.

By contrast, we designate by "wicking flow path", a path that contains a wicking material for a fluid, and said path can be followed by a fluid thanks to capillary action.

By "porous flow path", we designate more generally a path for fluids constituted by a porous material contained in a channel. A porous material can be wicking for a given fluid, if it has good wetting properties with regards to such fluid, or non-wicking, if pressure is needed to push said fluid in said material. Wicking flow paths are encompassed in porous flow paths, of which they are a subcategory. It must be noted that the property of being "wicking" is relevant to a specific fluid, whereas the property of being "open" or "porous" is intrinsic to the path and to the material in said channel, and does not depend on the fluid.

Typically, the flow in an open flow path or channel obeys Poiseuille's law, whereas the flow in a porous flow path obeys Darcy's law.

By "partly open", we designate a channel or a flow path, which is of the open type on part of its length. It may be filled on other parts of its length either by porous material, or by a wicking material, or by a solid, impermeable material. In the latter case, the solid impermeable material is at least partly mobile with respect to the channel.

By "Minifluidic chip", or more tersely "chip", or "minifluidic component", we designate an object comprising at least one channel, or at least one combination of channels, said channel or combination of channels being embedded at least in part in a matrix, said channel being a minichannel. However, for the sake of simplicity, in the following we shall encompass in the designation "minifluidic" chips or devices that are either microfluidic chips or devices, i.e. comprise at least one microchannel, millifluidic chips or devices, e.g. that comprise at least one millichannel, or nanofluidic chips or devices, i.e. that comprise at least one nanochannel, or chips comprising any combination of millichannels, nanochannels or microchannels.

By "chamber", we designate a channel, or a part of a channel, integrated into a fluidic chip, with one dimension, call the "thickness", significantly smaller than the two other dimensions. Such chambers can be millichambers, microchambers, or nanochambers, if at least one of the other dimensions is millimetric, micrometric, or nanometric, respectively. Millichambers, microchambers, and nanochambers are encompassed under the common name of "minichambers".

By "fluid drop area", we designate a part of the device which is at least in part at the surface of the device, or open to the exterior of the device, and where a fluid can be deposited. Generally, a fluid drop area is connected to at least a channel or a chamber, possibly through a valve or a connector. It can be a slightly curved surface, or a surface treated with a coating that has an affinity with the drops, like a hydrophilic surface in case of an aqueous fluid. It can be an open chamber.

By "reservoir", we designate a volume that can contain fluids. In the invention, reservoirs can be integral to the component or chip, or be separated from said chip. In all cases, however, reservoirs as designated here, involve at least one fluidic connection means allowing to put them in fluidic connection with at least one channel of the invention, continuously or at some specific times during the operation of the device.

Typically, drop zones, chambers or reservoirs in the invention, in consistency with the current use of the term "reservoir", are intended to be able to contain a larger volume of fluid by unit length, than the channel with which they are in fluidic connection. This is achieved by having, for instance at least one lateral dimension larger than the smallest lateral dimension of said channel. In some preferred embodiments, said one lateral dimension of the chamber, drop zone or reservoir, is smaller than all lateral dimensions of said channel.

Instrument: by «instrument», we designate an integrated device that is able to perform at least one function without the addition of additional components other than components available in the operational environment, such as for instance an energy source, or consumables. In our description, instruments are thus a subcategory of integrated device.

Device: by "device", we designate any of a chip, a component, an instrument, or a system.

By "system", we designate a combination of instruments associated to exert one or several tasks.

By "Minifluidic device" (resp. Microfluidic, millifluidic, nanofluidic), we designate a device comprising at least one minichannel (resp. Microchannel, Millichannel, Nanochannel), but optionally comprising other components, wherein said other components are not necessarily fluidic or minifluidic in their nature or function. Minifluidic devices of the invention may involve different levels of integration. For instance, they can be restricted to a single minifluidic chip or component, integrating one or several functionalities. Minifluidic devices of the invention may also comprise all other kinds of elements and components, some of which explicitly described here, such as pumps, valves, sensors, actuators, detectors, and many others known in the art, which are encompassed within the field of the invention. In particular, minifluidic devices of the invention may also be full instruments, and integrate for instance any of holders, housings, power sources, control software and hardware, communication means, storage means, manipulation means, human-machine interfaces. In the description, when the word "component" is used without any specifying adjective such as "textile component", or additional component", it is intended to designate a minifluidic component of the invention.

Integrated minifluidic device: We designate by the term «integrated device», a device comprising a minifluidic chip or minifluidic component of the invention, and at least one additional component.

By "electric power generator", we designate any device or component able to deliver to at least one electrode, or to at least one electrically conducting element, electric energy. Said delivery may be in any form, such as current, potential, or a combination thereof. Also said power, current, potential, may have any temporal characteristics, i.e. it can be AC, DC, or have more complex time-dependent structure.

We define a conducting element as "in electric connectivity" with a first fluid or a volume, if it can, thanks to the overall configuration of the device, transmit electric energy to said fluid or volume. For example, this can be achieved by putting said conducting element in direct contact with said fluid or volume. In other embodiments, this can be achieved by placing said conducting element in the vicinity of said fluid or volume, and separated from them by a dielectric layer with a permittivity and thickness suitable for allowing said transmission of energy. This suitability will depend on various factors, such as the frequency of the electric field applied to the conducting element, relative conductivity of the fluid and the dielectric layer at such frequency, the amplitude of the potential difference, and the global geometry of the system. Engineers know various means to determine in each case the parameters, for instance the thickness of dielectric layer, suitable for achieving such transmission of electric energy, by application of the laws of electrokinetics and electrostatics. In some preferred embodiments, said dielectric layer may have a thickness comprised between 10 nm and 100 nm, or between 100 nm and 1 µm, or between 1 µm and 10µ, or larger than 10 µm. In other embodiments, this can be achieved by creating a contact between said conducting element and a conducting second fluid, for instance an electrolyte, said second fluid being in continuous fluidic connection with said first fluid or volume.

Additional component: By "additional component," we designate components that are not integral part of the minifluidic chip or minifluidic device of the invention, but may be necessary or advantageous for operating the invention, or for exerting some advantages of the invention. Said components may comprise for instance mechanical manipulators or holders, fluid containers, ducts or mobilization means, electric components or optical components or information treatment components, user interfaces, housings, and the like. As a common characteristic, additional components of the invention are in connection or in relation with the invention's minifluidic chip or minifluidic device or minifluidic channel or actionable fiber by some means, for instance mechanical, electrical, electromagnetic, optical, fluidic, and are involved in at least one potential way of operation of the invention's device.

Using the above definition, we now provide a detailed description of some exemplary embodiments, which will help understand better the nature and advantages of the invention.

Guiding Ducts

Guiding ducts in the invention can have a multiplicity of shapes, topologies and sizes. As non limiting examples, they can have circular, square, parallelepipedal (cuboid), ribbon-like shapes, or have more complex shapes.

In a particularly preferred embodiment, at least one guiding duct has a circular section on at least part of its length.

Having a circular section may have, for instance, the advantage of allowing the use of many commercial fibers, and also not require the need of orientation positioning.

Having non circular section, in contrast may be advantageous to better control the positioning of the fibers, in particular in embodiments in which fibers comprise via. The shape and cross-section of guiding ducts are advantageously chosen in correlation with the shape and/or cross-section of the fibers, in order to provide accurate guiding, without too much friction.

In some preferred embodiments, said guiding duct has a uniform cross-section along at least part of its length.

In some other preferred embodiments, the cross-section of said guiding duct is not circular, for instance parallelepipedal, or ellipsoidal, on part of its length.

In preferred embodiments, the cross-section of said guiding duct is similar to the cross-section of the movable fiber, along at least some part of the length of the said guiding duct, and along at least some part of the length of the said movable fiber.

In some preferred embodiments, the axis of said guiding duct is linear.

In some other preferred embodiments, though, the axis of said guiding duct is not linear.

This provides a lot of flexibility in the design of the chip or minifluidic component.

Indeed, an advantage of the invention is to provide devices with a wide variety of shapes and properties, including thin and/or flexible or semi-flexible fluidic components or chips, such components comprising integrated valves or compartmentalization means, without expensive fabrication.

The efficiency of the invention to compartmentalize a chamber is demonstrated e.g. in example 7: when the fiber is in place, in configuration "closed", neurons can be seeded on one side of the chamber, without penetrating the other side. After adhesion of the cells, the fiber can be removed, and axons from the cell bodies can invade the other side of the chamber, without contamination with cell bodies.

Guiding ducts in the invention may also have all kinds of dimensions, notably, they can be micrometric, or millimetric, or nanometric.

In some particularly preferred embodiments, guiding ducts are micrometric, i.e. at least one dimension of their section is comprised between 1 µm and 1 mm.

In some other preferred embodiments, guiding ducts are millimetric, i.e. at least one dimension of their section is comprised between 1 mm and 1 cm.

In some other preferred embodiments, guiding ducts are nanometric, i.e. at least one dimension of their section is comprised between 1 nm and 1 µm.

In some preferred embodiments said dimension is along some part of the guiding duct is comprised between 10 µm and 1 mm, and more preferably between 20 µm and 100 µm, or between 20 µm and 200 µm, or between 20 µm and 500 µm, or between 50 µm and 200 µm, or between 50 µm and 500 µm, or between 50 µm and 1 mm, or between 50 µm and 2 mm, or between 100 µm and 500 µm, or between 100 µm and 1 mm, or between 100 µm and 2 mm, or between 100 µm and 5 mm.

In some preferred embodiments, devices of the invention comprise several guiding ducts as described above.

In some preferred embodiments, said guiding duct comprises at least one port to the outside of the device.

In some preferred embodiments, said guiding duct can be deformed.

In some preferred embodiments, said deformation is a change in length.

In some preferred embodiments, said deformation is a change in the path of said duct, e.g. a bending, or a twisting, along at least part of the length of said duct.

In some preferred embodiments, said deformation is reversible

Also, an advantage of the invention, as compared to prior art devices, is to allow the imposition of mechanical actions or effects, remotely, inside minifluidic devices. This is allowed by several features of the invention, including the possibility to have guiding ducts with non-linear axes, but also the possibility to have guiding ducts with high aspect ratios.

By aspect ratio, we mean a parameter growing extensively with the ratio of the duct's length, measured along its main axis, to another characteristic of the duct characterizing its lateral size. In some embodiments, it is preferable to define the aspect ratio as the ratio of the guiding duct's length to the square root of its cross-sectional area. When the guiding duct does not have a constant cross-sectional area, it may be more conventional to define the aspect ratio as the ratio of the guiding duct's length to the square of its smallest cross-sectional area.

In some other embodiments, it may be more convenient to define the aspect ratio as the ratio of the guiding duct to its average transverse size, the transverse size being measured along any axis perpendicular to the guiding duct's main axis. In yet some other embodiments, for instance if the above average lateral dimension is not easy to measure, it may be more convenient to define the aspect ratio as the ratio of the guiding duct to its smallest transverse size, the transverse size being measured along an axis perpendicular to the guiding duct's main axis.

In some preferred embodiments, the aspect ratio of guiding ducts in the invention is at least 10, preferably at least 20, preferably at least 50, or at least 100, or at least 200, or at least 500, or at least 1000.

There is no real limit to the maximum aspect ratio achievable in the invention, but there is a compromise between said aspect ratio, and the ease of manipulation. Thus, depending on the application, aspect ratio of the guiding duct may not exceed 10000, or may not exceed 500, or may not exceed 200, or may not exceed 100, or may not exceed 50.

Movable Fibers

In some preferred embodiments, a movable fiber of the invention is an actionable fiber.

As for the materials constituting movable or fibers, they can be constituted by any kind of material. This comprises, as a matter of example, polyester, viscose, rayon, cotton, silk, linen, wool, jute, sisal, polyaramide, all kinds of modified cellulose, polyolefins, such as polyethylene, polypropylene. However, due to the specificities of the invention, it may also use, alone or in combination with the common types of fibers used in the textile or fiber industry, other types of fibers, and notable metal, or more advanced materials, or fibers used in the technical industry, such as glass fiber, kevlar, carbon fiber, metal wires, ceramic fibers, fluoropolymers such as polyvinylidene fluoride, fibers drawn from liquid crystals, and the like, and more generally any kind of organic, synthetic, mineral, material, having properties that make them amenable to shaping in the form of fibers.

Essentially all kinds of fibers can be used to prepare movable fibers, or textile components entering the fabrication of the invention, some of which can be found for instance in http://www.apparelsearch.com/fibers.htm, or in http://en.wikipedia.org/wiki/List_of_textile_fibres.

In particularly preferred embodiments, said movable fiber is made totally or in part, of an organic material.

In some preferred embodiments, said movable fiber is rigid.

This may be advantageous, for instance if the length of the guiding duct is relatively large, and/or if its cross-section is relatively narrow, to allow said movable fiber to be manipulated without too much deformation. This is particularly the case, in particular embodiments in which movable fibers must be rotated or pushed.

In some preferred embodiments, said movable fiber is flexible, or semi-flexible. To fix ideas, in some preferred embodiments, said movable fiber can be bent without breaking or irreversible deformation with a radius of gyration smaller than five times the fiber thickness along the axis bearing the radius of gyration of the bending. More generally, for instance for fibers with complex shapes in which said axis cannot be defined easily, in some preferred embodiments, said movable fiber can be bent without breaking or irreversible deformation with a curvature smaller than five times the fiber thickness perpendicular to the axis along which the main deformation induced by the bending occurs.

In some other preferred embodiments, said movable fiber can be bent without breaking or irreversible deformation with a radius of gyration larger than one time, or larger than two times, or larger than five times, or larger than ten times, or larger than 20 times, or larger than 50 times, the fiber thickness along the axis bearing the radius of gyration of the bending, and smaller than the length of the fiber, or smaller than the length, or one half of the length, or one fifth of the length, or one tenth of the length, or one twentieth of the length of the fiber comprised in the matrix.

In some other preferred embodiments, said movable fiber can be bent by at least 30°, or by at least 90°, or by at least 180°, on its total length without breaking or irreversible deformation.

More generally, in some other preferred embodiments, said movable fiber can be bent, without breaking or undergo irreversible deformation, with a radius larger than one time, or larger than five times, or larger than ten times, or larger than 20 times, or larger than 50 times, the fiber thickness in the direction perpendicular to axis along which the main deformation induced by the bending occurs, and smaller than the length of the fiber, or smaller than the length, or one half of the length, or one fifth of the length, or one tenth of the length, or one twentieth of the length of the fiber comprised in the matrix.

This flexibility, or semi-flexibility may be advantageous, in particular if the guiding duct is non-linear, in order to avoid too much stress to be transmitted to the guiding duct or matrix during the actuation of the fiber.

In preferred embodiments movable fibers in the invention can be made of a monolithic material. This prevents their wicking by the matrix, and thus facilitates their motion.

In some other embodiments, movable fibers can keep some porosity, or be made of multiple fibers.

As will become more apparent below, this can be advantageous for instance for using movable fibers to control the transport of fluids or species.

In this case, mobility is preferably facilitated by conferring to said actionable fibers interfacial properties that prevent their adhesion or absorption of the matrix.

In some other preferred embodiments, movable fibers may be constituted on part or all of their length from a multiplicity of fibers, encompassed in, or enducted with, a material that does not adhere strongly to the matrix.

In some preferred embodiments, movable fibers preferably present a smooth surface on at least part of their length.

In some preferred embodiments, they present a uniform cross-section to facilitate their sliding.

These different embodiments may be useful to facilitate the motion or deformation of the movable fibers, notably if the guiding ducts are long, or nonlinear, or narrow, or a combination thereof In various preferred embodiments, movable fibers in the invention can have different types of cross-sections, circular, square, parallelepipedal (cuboid), ribbon-like, or have more complex shapes.

In a particularly preferred embodiment, at least some of movable fibers have a circular cross-section on at least part of their length.

In some other embodiments, movable fibers may present a non uniform cross-section.

In yet some preferred embodiments, movable fibers present on some part of their length properties facilitating their motion, such as a smooth surface, a uniform cross-section, a non-wicking property or non-wetting property with regards to the matrix, a monolithic character, or providing a lubrication layer on the surface of the fibers, or a combination thereof.

In yet some preferred embodiments, movable fibers present on some part of their length properties preventing their motion, such as a rough surface, a non-uniform cross-section, a wicking property or wetting property with regards to the matrix, a multi-fibers character, or a combination thereof.

In some other preferred embodiments, movable fibers of the invention may have along some part of their length, properties facilitating their motion inside a guiding duct, and in some other part of their length, properties preventing their motion inside said guiding duct, or making said motion more difficult.

For instance, movable fibers may present on some part of their length properties facilitating their motion, such as a smooth surface, a uniform cross-section, a non-wicking property or non-wetting property with regards to the matrix, a monolithic character, or a combination thereof, and in another part of their length preventing their motion, such as a rough surface, a non-uniform cross-section, a non-circular section, a wicking property or wetting property with regards to the matrix, a multi-fibers character, or a combination thereof.

Thus, in some embodiments, movable fibers in the invention have the property of being actionable on part of their length within the device, and do not have this property on another part of their length within the device.

In some other embodiments, movable fibers of the invention may present in continuity at least two portions, one in which they are immobilized in the matrix, and another one in which they are mobile with regard to the matrix.

In some other embodiments, movable fibers may be wickable by some fluids on part of their length, and non-wickable by the same fluid on another part of their length or section.

In some other embodiments, movable fibers may be porous to some fluids on part of their length, and non-porous to the same fluid on another part of their length or section.

In some other preferred embodiments, movable fibers in the invention present a section that decreases continuously or stepwise, from the entrance of the fiber into the matrix of the device.

In some other preferred embodiments, movable fibers in the invention present several increases and decreases of section along their length.

All these embodiments, in which movable fibers have properties varying along their length, can produce different technical effects and advantages. For instance, as will become more apparent below, the presence of some changes in cross section, or in porosity, or in shape, may help to control transport properties between two channels or channel portions or chambers, by acting on the fiber.

In other embodiments, this may be used to "hold" on side of an actionable fiber while manipulating another side, in order to deform it, e.g. by stretching or twisting.

In yet other embodiments, this can be useful to exert forces on the matrix, and for instance to deform the device.

In some other preferred embodiments, movable fibers are elastic, which may be interesting e.g. to induce change of diameter upon pulling.

In some preferred embodiments, movable fibers can change shape or diameter upon mechanical action. Changes of shapes can be used to control transport, or to effect diverse actions in devices of the invention, such as cell manipulation or positioning, or sensing, notably mechanical, optical or electrical sensing.

In some preferred embodiments, actionable fibers can be fully removed from the guiding duct in which they are contained.

In some other embodiments, movable fibers can be removed from said guiding duct only partly. This can be useful for instance in pumping operations, or valving operations, as will become clearer in the following of the description.

In yet other embodiments, movable fibers can slide along a guiding duct of the invention, without freeing any section of said guiding duct. This can be useful for instance for deforming the device locally, e.g. for pinching another channel, or for deforming the device globally, for instance for chip bending.

According to a favorite embodiment, the movable fiber and the guiding duct cooperate to make a fluid-tight closing of at least a part of the guiding duct. This can be achieved by varied means:

According to one embodiment, the movable fiber and the guiding duct have approximately the same shapes.

In other embodiments, they present dimensions such that the movable fiber has at least one of its lateral dimensions, and in some embodiments all of its lateral dimensions, comparable to, or preferably slightly larger than, those of the guiding duct, on at least part of the length of said guiding duct and/or part of the length of said fiber. Thus, in some preferred embodiments, said fiber lateral dimension or dimensions are larger than the lateral dimension or dimensions of said duct by a factor comprised between 0% and 10%, or comprised between 10% and 50%, or comprised between 0% and 20%, or comprised between 0% and 30%.

In other embodiments, at least one of the movable fiber and the guiding duct is made of an elastic material. Thus, the movable fiber is introduced into the guiding duct and can be forced into the guiding duct to make a tight sealing. For example, the movable fiber and the guiding duct are approximately conical, and at least one of the movable fiber and the guiding duct is made of an elastic material.

According to one embodiment, the movable fiber or the guiding duct presents a circular seal made of an elastic material.

In other embodiments, a sealing agent, such as a liquid, an oil, a grease, is disposed between the guiding duct and the fiber; said sealing agent may advantageously have also lubricating properties.

In some preferred embodiments, change of shape or position of movable fibers may be used to exert within a device of the invention, mechanical or electrical actions on materials, fluids or species contained in said device. As non exhaustive examples, this can be useful for instance for displacing cells, or performing local electrical or optical measurements, or for delivering fluids or species locally within the device.

In some other preferred embodiments, change of shape or position of movable fibers may be used to perform inside said device a local sensing.

For instance, if the movable fiber is elastic, its deformation can be a reporter of some force or shape.

If the movable fiber is electrically conducting, its displacement or deformation may be used to perform local sensing of a potential, or conductivity.

If the movable fiber is magnetic, it can be used to collect or record magnetic material in the chip, or more generally to exert an action on magnetic material contained in the device.

Alternately, if the movable fiber is magnetic, the application of an external magnetic field can be used to displace or deform said magnetic fiber within the device.

If the movable fiber is optically conductive, for instance is an optical fiber, its manipulation can be used to shine light at specific positions within the device, or to record light emission at specific positions in the device, or a combination thereof.

An advantage of the invention, is that all the above operations consisting in applying mechanical or electrical or optical stimuli, or measuring mechanical, optical, electrical or magnetic properties, can be performed very locally, and at multiple positions that can be selected and changed after the fabrication of the chip, Devices of the invention, comprising magnetic movable fibers, may advantageously comprise or be operated together with, additional magnetic field generating elements.

Also, devices of the invention, comprising electrically conducting movable fibers, may advantageously be operated together with at least an external power source.

—Protrusion

In some preferred embodiments, at least a movable fiber in the invention has at least one part protruding from said guiding duct, outside of said matrix.

These protrusions are useful in particular to manipulate said fibers by external means.

In some preferred embodiments, said protruding part is a dangling end

In some preferred embodiment, said protruding part is a loop.

Preferably said protrusion occurs from said one port of said guiding duct.

In some preferred embodiments, devices of the invention comprise a multiplicity of guiding ducts, and a multiplicity of fibers at least partly contained in said guiding ducts It is indeed an advantage of the invention, to allow for varying widely the number of guiding ducts and/or movable fibers, and thus to perform highly multiplexed operations, or oppositely simple operations, while remaining in a common format, or in similar format.

More specifically, in some preferred embodiments, devices of the invention may comprise only one, or at least two, or at least 5, or at least 10, or at least 50, or at least 100, or in some cases at least 200, or at least 500, or event 1000 or more guiding ducts.

In some preferred embodiments, devices of the invention may comprise only one, or at least two, or at least 5, or at least 10, or at least 50, or at least 100, or in some cases at least 200, or at least 500, or event 1000 or more movable fibers.

When a device of the invention comprises a multiplicity of movable fibers, in some embodiments, at least some of them may be actuated together. In some other preferred embodiments, movable fibers are actuated as several subsets, wherein fibers in a subset are actuated simultaneously, and fibers in another subset are actuated at different times or differently. This allows for the implementation of complex and/or high throughput protocols.

In some preferred embodiments, said multiplicity of fibers are connected to each other. For instance this may help to move more easily said fibers together.

In some exemplary embodiments, said multitplicty of fibers can be connected to each other by any combination of knotting, braiding, entangling, gluing, or by additional components able to maintain the fibers together, more generally by any means known in the art to assemble objects. In some other embodiments, said multiplicity of fibers may be prepared as a single component, e.g. in the shape of a comb In some preferred embodiments said comb, or more generally said multiplicity of fibers are attached to a handle. By actuating the handle, one actuates all of the movable fibers. The length of all the fiber do not need to be the same, providing additional flexibility on the positioning of the functional elements associated with said fibers.

In some preferred embodiments, said comb or said multiplicity of fibers connected together is essentially two dimensional: This embodiment is interesting for its simplicity, and also for its compatibility with conventional imaging methods such as microscopy, and also for its compatibility with conventional microfabrication methods such as embossing, microlithography, molding, and the like. However, said two dimensional comb may not necessarily be flat: it may for instance consist in a series of movable fibers, attached to a handle along a line, but following guiding ducts with axes with all kinds of topologies and shapes.

Indeed, in many preferred embodiments, the ducts are non linear. This not only allows to chose freely the orientation of the functional elements with regards to that of the means suitable to induce motion or deformation to the fiber(s), but it also allows overcrossings and undercrossings of guiding ducts, in order to create complex topologies. All of these advantages can be obtained in the invention, while keeping handles, or actuation means, that are simple to fabricate and operate.

In other embodiments, said comb or said multiplicity of fibers connected together can have a more complex 3D shape, comprising a multiplicity of movable fibers that are nor all on the same plane. This family of embodiments, which are new and advantageous features of the invention as regards to former minifluidic systems, notably former microfluidic systems with integrated functionalities, allows to prepare and actuate simply complex 3D networks of channels. This can be useful for higher multiplexing and higher compacity. This type of embodiment is advantageous for instance in combination with methods of preparation of the device, involving additive microfabrication or 3D printing In some preferred embodiments, in which the matrix of the invention embeds some support fibers in the form of a textile, the connection between said multiplicity of fibers may be prepared within the same preparation method as used for preparing said matrix embedding the support fibers. This provides a simple way to prepare in one single process both the matrix comprising the channel, and the means to actuate the movable fibers.

In some preferred embodiments, devices of the invention may also comprise more than one comb as described above. This can be advantageous, for instance, to operated different subsets of movable fibers at different times, and thus to implement more complex protocols than possible with one single comb, or with devices of prior art. An example of such embodiments is described in example 12.

—Fiber Manipulation

In some preferred embodiments, a movable fiber of the invention can be pulled from a guiding duct in which it is at least partly enclosed.

In some preferred embodiments, said fiber can be pulled from said guiding duct in part.

In some preferred embodiments, said fiber can be pushed into said guiding duct.

In some preferred embodiments, said fiber can be pushed into said guiding duct in part.

In some yet preferred embodiments, said fiber can be pulled and pushed within said guiding duct.

In some preferred embodiments, said fiber can be rotated in said guiding duct.

In some preferred embodiments, said fiber can be twisted in said guiding duct.

In some preferred embodiments, said fiber can be stretched or compressed in said guiding duct.

These different ways of manipulating movable fibers can be chosen within the invention, depending on the action to perform. For instance, but not exclusively, moving a fiber back and forth, i.e. pulled or pushed, may be interesting either for pumping, using said fiber as a piston, or to displace a via, or a zone bearing some ligands, in contact of different channels or chambers. Rotation can be used e.g. to modify the orientation of a via, and thus to change fluidic connectivity between channels. Twisting or stretching may be used to change the shape or cross-section of a fiber, and thus its transport properties, or to expel liquid from a wicking zone.

Channel

In particularly preferred embodiments, device chip or device of the invention additionally comprises at least a channel, partly embedded in the matrix.

In some preferred embodiments, said channel is at least partly open.

Preferably, channels of the invention are minichannels.

Channels in the invention may also have all kind of dimensions, notably, they can be microchannels, or millichannels, or nanochannels.

In some particularly preferred embodiments, channels are microchannels, i.e. at least one dimension of their cross-section or, equivalently, one of their lateral dimensions, is comprised between 1 µm and 1 mm.

In some other preferred embodiments, channels are millichannels, i.e. at least one dimension of their cross-section or, equivalently, one of their lateral dimensions, is comprised between 1 mm and 1 cm.

In some other preferred embodiments, channels are nanochannels, i.e. at least one dimension of their cross-section or, equivalently, one of their lateral dimensions, is comprised between 1 nm and 1 µm.

In some preferred embodiments said dimension is along some part of the channel comprised between 10 µm and 1 mm, and more preferably between 20 µm and 100 µm, or between 20 µm and 200 µm, or between 20 µm and 500 µm, or between 50 µm and 200 µm, or between 50 µm and 500 µm, or between 50 µm and 1 mm, or between 50 µm and 2 mm, or between 100 µm and 500 µm, or between 100 µm and 1 mm, or between 100 µm and 2 mm, or between 100 µm and 3 mm, or between 100 µm and 5 mm.

In some preferred embodiments, devices of the invention comprise several channels as described above, embedded in the same matrix, the ensemble of said channels constituting a fluidic network.

In some embodiments at least some channels of said network can be interconnected.

In some other embodiments, at least some channels of said network may not be interconnected In yet some other embodiments, said fluidic network may comprise a combination of interconnected and non-interconnected channels.

In some preferred embodiments, channels in the invention or channel networks of the invention, are non-linear, or curved, or three-dimensional Channels in the chips and devices according to the invention can have a multiplicity of shapes, topologies and sizes, which results from the method for making the chips.

Channels in the chips and devices according to the invention are delimited by walls, at least along part of their length. Said walls may consist in the boundaries of a void left in the matrix material by the removal of a fiber. Alternately, they may consist in the walls of a tube of a plastic material that has been interwoven with the textile fibers.

In a particularly preferred embodiment, at least one channel has a circular section on at least part of its length. Circular sections are interesting in numerous cases. For instance, they are very efficient for preventing leakage, for allowing stable flow of droplets, or for modeling a vascular system.

In many preferred embodiments, channels in the chips and devices according to the invention have a constant cross-section. This is interesting in particular if species must be flown at constant velocities, or also for many applications involving movable fibers.

In some other preferred embodiments, channels may have a non-uniform or non-constant cross-section. This can be instrumental, for instance for reserving in a channel chamber-like areas, or detection zones, or for trapping movable fibers in order to induce their deformation.

In general, too, channels in the chips and devices according to the invention comprise at least a part in which they are elongated in at least one direction, said direction defining a main axis, in order to transport fluid along their main axis.

In some preferred embodiments, though, channels in the invention may also be chamber-like, or comprise a chamber-like zone, or comprise a reservoir or a reservoir-like zone, or be connected to a reservoir or a reservoir-like zone. This can be useful e.g. to cultivate cells, or to perform detection, or to perform reactions, or to store or load reagents.

In some preferred embodiments, especially for sheet-like devices, said chamber-like channel or chamber-like zone or reservoir-like zone may be essentially flat, i.e. have a smaller dimension in the direction perpendicular to the plane tangent to the sheet, than in a direction tangent to said plane.

Channels in the chips and devices according to the invention may also have all kind of dimensions, notably, they can be microchannels, or millichannels, or nanochannels.

In some particularly preferred embodiments, channels in the microfluidic components or chips or devices according to the invention are microchannels, i.e. at least one dimension of their cross-section is comprised between 1 µm and 1 mm The invention is particularly interesting for creating devices with microchannels, because known prior art methods to create microfluidic devices are expensive, and thus reduce the field of potential applications.

In some other preferred embodiments, however, channels are millichannels, i.e. at least one dimension of their cross-section is comprised between 1 mm and 1 cm. The invention there is particularly interesting in its possibility to prepare complex and self-sustained devices, still at low cost, as compared e.g. with prior art devices, based on tubes.

In some other preferred embodiments, channels are nanochannels, i.e. at least one dimension of their cross-section is comprised between 1 nm and 1 µm. As for microchannels, this is interesting for instance for cost reasons, or also for preparing systems difficult to make by photolithography, using e.g. nanofibers, for instance carbon fibers, as movable fibers.

However, in some other preferred embodiments, channels in the invention can have intermediate ranges of sizes. In some preferred embodiments, for instance, at least one dimension of their cross-section is comprised between 10 µm and 2 mm, or between 20µ and 5 mm.

In some preferred embodiments, chips and devices of the invention comprise several channels as described above, embedded in the same matrix, the ensemble of said channels constituting a fluidic network, in which channels can have various states of interconnection or insulation.

The invention is indeed very interesting for preparing networks, and notably complex networks, thanks to its potential to prepare simply and at low cost devices with complex architectures with undercrosses and overcrosses thanks to its potential to precisely position and hold non linear channels.

Indeed, it is another advantage of the invention, to allow the easy fabrication of microfluidic devices comprising crossing non-interconnected channels, since channels can be separated from each other by some fibers within the textile, directly in the fabrication process.

It is thus another object of the invention, to provide a fluidic device wherein channels are separated from each other at a crossing point by at least one fiber of a textile.

It is thus another object of the invention, to propose fluidic devices comprising crossing channels that are not fluidically connected at the crossing point.

In the embodiment wherein removable fibers are entangled with support fibers, directly resulting in the entanglement of channels with support fibers, it is easy to create connection, or oppositely crossings without connection, or a combination thereof.

In addition, the invention provides the possibility to modify dynamically the state of connection between channels in a fluidic network comprised in a device of the invention, by action on a movable fiber, thus avoiding the need of complex integrated valves, pressure control, and the like, used in prior art.

Said change of fluidic connectivity may, depending on the embodiment, comprise for instance an action of putting in communication at least two elements of the network, or insulating at least one element of the network, or changing the flow rate in an element of the network, or changing the flux of a species in an element of the network, or any combination thereof.

It is another object of the invention to propose a minifluidic device comprising at least:
 a/ a guiding duct
 b/ a fluidic network comprising at least two channels or two chambers fluidically connected to said guiding duct, or at least two parts of a channel or two parts of a chamber separated by said guiding duct
 c/ a movable fiber contained in part in said guiding duct, wherein the actuation of said movable fiber within said guiding duct modifies the fluidic connectivity, or at least one fluidic resistance, within said network.

Said change of fluidic connectivity may, depending on the embodiment, comprise for instance an action of putting in communication at least two elements of the network, or insulating at least one element of the network, or changing the flow rate in an element of the network, or changing the flux of a species in an element of the network, or any combination thereof.

—Content of Channels

In some preferred embodiments, channels of the invention can be open on the totality of their length, or can be open on a part of their length, and contain some other components, along some part of their length, or any combination thereof In some preferred embodiments, said other components, may be porous material, non porous material, packed colloidal material, powders, solid material, or more generally any material restricting the motion of fluid, and impairing open flow path in said channel.

In some preferred embodiments, channels of the invention may comprise, in their volume or at their surface, different types of compounds or species.

In some preferred embodiments, said compounds may be any of polymers, microparticles, nanoparticles, metals, molecules, catalysts, colloids, ions, molecular assemblies, antibodies, nucleic acids, proteins, polysaccharides, proteoglycans, antibodies, viruses, bacteria, cells, mammals cells.

In some preferred embodiments said compounds may be present in specific portions of said channel. This can be useful e.g. to induce in said channel a localized chemical reactor, or bioreactor, or sensing zone, or concentrating microcolumn, or to create some biological or biomimetic structure.

In some preferred embodiments, advantageously combined with embodiments in which the matrix is a hydrogel, said compounds are mammal cells. This embodiment is advantageous in order to prepare a device of the invention that is a bioreactor, or a tissue on chip, or an organ on chip, or an implantable device.

In some preferred embodiments, said compounds are disposed along said channel as a layer surrounding a lumen, or as a layer adherent to at least one wall of said channel, thus retaining the open character of the channel.

In some other preferred embodiments, said compounds are adsorbed or grafted onto a fiber, or a porous pad, partly filling a channel of the invention. This can be advantageous, for instance for doing functionalization in a batch process prior to the making of the chip.

In other embodiments, said compounds can be immobilized or adsorbed or grafted in the channel, or on the movable fiber, by any of temperature, light, chemical reaction, electrostatic forces, magnetic forces, packing, adhesion, biological adhesion, affinity, after of during the fabrication of the channel.

Said treatment may also be performed on some parts only of a movable fiber, or on some part only of a channel. Also, different treatments may be achieved at different places along a movable fiber, or along a channel, or different treatments may be achieved in different channels.

Also, in some embodiments useful e.g. for multiplexed operations, different types of species can be grafted onto different places along a movable fiber, or onto different places along a channel, or more generally at different places within a device of the invention.

Also, the invention offers a lot of flexibility regarding the content of the channel or channels. In some preferred embodiments, channels in the invention contain an aqueous medium, or an oil, or a hydro-organic medium, or a fluorinated medium In some other preferred embodiments, the channel or channels of the invention contain a multiphasic system, notably a biphasic system. In some embodiments, said biphasic system combine two immiscible fluids. In some preferred embodiments, said immiscible fluids are an aqueous fluid and an oily fluid. In some preferred embodiments, said oily fluid is a fluorinated fluid.

This has several advantages. First, this opens the possibility to perform in the chips of the invention numerous protocols already developed in more conventional systems, but with the advantage of the additional functionalities of the invention, such as pumps, valves, patterning and the like. Also, using biphasic systems, for instance, may help to transport inside devices of the invention, some liquids without contact with the wall. For instance, water-based droplets can be carried by an oil fully wetting the walls of the channel, so that species in said droplets cannot touch the walls. This provides thus additional flexibility in choosing the material of the device. Devices of the invention may also be used to insulate in separate chambers different droplets.

In some other embodiments, which can be combined with the above, a fluid contained in a channel of the invention is a colloidal suspension.

This can be interesting, for instance to introduce in devices of the invention the possibility to perform miniaturized heterogeneous phase reactions or extractions.

In some embodiments, guiding ducts may also contain some liquid. This may be interesting e.g. for lubrication, for better sealing, or for transmitting volume changes to channels. In some preferred embodiments, said fluid is miscible with the fluid contained in at least one channel. In some other embodiments, said fluid is non miscible with the fluid contained in at least one channel.

—Intersection

In some preferred embodiments of the invention, a channel is intersecting with said guiding duct.

In preferred embodiments comprising a chamber or a chamber like section on a channel, said chamber or chamber like section is located along said channel at a location different from said intersection with said guiding duct. In this type of embodiments, actuation of an actionable fiber contained at least in part in said guiding duct can be used to insulate a chamber from another section of the channel, as demonstrated e.g. in example 15 below.

In some other preferred embodiments, said chamber is located along said channel at the location of intersection with said guiding duct, as demonstrated for instance in example 6 below.

—Active Zone in the Fiber

In some preferred embodiments, said movable fiber presents within said guiding duct either an end, or a change in shape or composition.

In some preferred embodiments, at least an end, or a change in shape or composition of said movable fiber, can be positioned at or in the vicinity of the intersection between said guiding duct and a channel.

In some yet preferred embodiments, said end or change in shape or composition can be moved to or moved from the intersection between a first channel and the guiding duct, by a motion of said fiber along said duct.

In some preferred embodiments, the displacement of said fiber within said guiding duct changes the fluid transport properties between the two portions of said channel comprised on each side of the intersection of said channel with said guiding duct.

In some preferred embodiments, said fiber creates in said channel a complete or partial obstruction within said channel, when it is positioned at a specific first position, or in a specific first orientation along the length of the guiding duct. In some other preferred embodiments, said fiber can additionally create in said channel a level of obstruction different from the level of obstruction obtained in said first position, when said fiber is positioned at a second position, or in a specific second orientation, along the length of the guiding duct, different from said first position.

In some preferred embodiments advantageously combined with the previous one, said fiber presents at the intersection with said channel a non-cylindrical section, so that its translation or rotation changes the level of obstruction created in said channel.

In some preferred embodiments, said fiber presents along its length at least one via, able to allow fluid passage from one side of the channel to the other at the point of intersection of the guiding duct with said channel, when said via is positioned at such intersection.

By this we mean any particular structure onto said fiber, able to allow, or to facilitate, transport of fluid or species, from one side of the fiber to another, as compared as the transport achievable across said fiber at a place where such a via is not present. Via within the invention may be of different natures, and take for instance the form of a change of shape, or a change of composition, or a combination thereof. Said change of shape can be for instance a through-hole or window or any shape, or a change of section along at least one direction, or an indentation, or a recess. Said via may also take the form of a porous zone, or of a through-hole or recess filled with a porous medium. By "transverse", we mean that said via allows transport of species of liquid along a direction that does not follow the axis of the fiber. By "via", we also mean that at the level of said via, fluid or species can be transported by said via from a space that does not belong to the fiber, towards another space that also does not belong to the fiber. Said spaces that do not belong to the fiber may be, for instance, chambers, or channels, or different areas within a chamber or a channel, separated by said fiber. A transverse via may, for instance, allow transport perpendicular to the axis of the fiber. It may also, however, permit transport in another direction tilted with regards to the axis of the fiber. In some embodiments, a via in the invention can be seen as a void or porous volume along the fiber, connecting one side of said fiber with another side of the fiber. By "side" we also do not signify that the transport should necessarily occur between two spaces that are opposite with regards to the axis of the channel. For instance, a via as considered here, can allow transport from a channel impinging sideways onto the guiding duct containing the fiber with a given angle, to another channel impinging on said guiding duct at any other angle. Some examples of vias are given in FIG. 15

In some embodiments, movable fibers in the invention may also comprise on part of their length, a longitudinal lumen. This may be instrumental, for instance, in helping the transport of fluids or of species from one channel intersected by one guiding duct to another channel intersected by the same guiding duct at another place. However, in preferred embodiments, movable fibers typically do not comprise a lumen fluidically connecting the inside of the device to the outside of the device, and notably they do not comprise a lumen connecting the inside of the chip to the outside of the chip. This way, there is no need to connect movable fibers to any source of fluid or pressure, and there is no risk of leaks. Also, this allows complete independence of fluid source means and manipulation means.

In some preferred embodiments, said fiber can be twisted in said guiding duct along some part of its length. Preferably, said part is positioned, or can be positioned, at the intersection with said channel, or in the vicinity of said intersection.

In some preferred embodiments advantageously combined with the previous one, said twisting changes the cross-section of said fiber. In some preferred embodiments, said twisting changes the level of obstruction created in said channel These different embodiments are useful in order to change fluidic connection between channels conveniently. For instance, In some preferred embodiments, said pulling and/ or pushing, and/or rotation, and/or twisting, is induced onto said fiber by mechanical means.

—Dimensions Fiber Versus Channel

In order to favor optimal flow control, it is also interesting that the dimensions of the movable fibers be connected to the dimensions of the channels upon which they are planned to act. Thus, in some preferred embodiments, said fiber has on at least part of its length, at least one of its lateral dimensions along a first axis, equal or close to the lateral dimension of said channel along said first axis. In some preferred embodiments, said fiber lateral dimension is larger than the lateral dimension of said channel by a factor comprised between 0% and 10%, or comprised between 10% and 50%, or comprised between 0% and 20%, or comprised between 0% and 30%. When such part of the actionable fiber is positioned at the intersection with the channel, it can create a high or complete obstruction of the channel: in the following, we call this a «closed» state.

In some preferred embodiments, said fiber has on another part of its length, at least one of its lateral dimensions along a first axis, smaller than the dimension of said channel along said first axis. When such part of the actionable fiber is positioned at the intersection with the channel, it can create a weak obstruction of the channel: in the following, we call this an «open» state.

In some preferred embodiments, said fiber may also be fully removed from said intersection, thus creating a «fully open» state.

In some preferred embodiments, said fiber may have along its length a progressive change in dimension along at least one axis, so that the longitudinal displacement of said fiber, with the progressive change in dimension moving with regards to the intersection with the channel, will create a progressive change in the obstruction created by said fiber in said channel. This allows the creation of a progressive valve.

Matrices

—Different Matrices

The invention is also interesting, thanks to its power to prepare microfluidic devices in a variety of materials not always easy to use in conventional microlithography, or even in soft lithography, while keeping the advantage of these microlithography techniques, such as the possibility to have inside devices microstructures with high resolution and possibly complex structures, or the possibility to have planar structures to facilitate visualization or manipulation. Finally, the possibility offered by the invention, to operate by molding rather than lithography, allows the possibility to prepare flexible or semi-flexible devices with sliding elements. These properties of the devices are, in particular, provided by the matrix.

In some preferred embodiments, the matrix or the component or chip of the invention is sheetlike In some preferred embodiments, said matrix or component or chip is flexible or semi-flexible.

In some preferred embodiments, said matrix or component or chip is elastic, elastomeric, flexible or semi-flexible.

In some preferred embodiments, said matrix or component or chip is rigid.

Essentially, all types of materials can be used to prepare matrices of the invention.

In some preferred embodiments, said matrix is made of, or comprises any or any combination of a thermofusible material, a thermoplastic material, or a resin, or an elastomer, or a glass, or a thermopolymerizable material, or a photopolymerizable material, or a chemically crosslinkable material, or a hot melt, or a gel, or an adhesive, or a vitrimer.

Some exemplary materials usable as matrix within the invention are silicones, rubbers, polyenes, polyanes, materials based on epoxys, polyurethanes, norbornenes, polyesters, polyethers, polystyrene, polyacrylates, polymethacrylates, polyvinyls, thermoplastic polyolefins.

Naturally or artificially sourced materials, or biodegradable materials, such as various gums, waxes, inks, hardenable oils, siccatives, glues, or materials derived from natural products, such as Ecovio® or Ecoflex®, and more generally materials derived from cellulose, starch, polylactic acid, lignin, may also be used, notably in order to prepare devices of the invention that are environment friendly, biodegradable.

Biocompatible materials, or biodegradable materials, may also be used advantageously, notably for applications involving the culture or analysis of living cells in devices of the invention. Said materials may also be advantageous notably for usage of the invention in implantable devices, or for the use of the invention to prepare implantable devices, of for the preparation of «tissues or organ on chips», or more generally for applications in regenerative medicine, or biotechnology. As a non-exhaustive list, one can mention collagen, agarose, agar gum, polylactic acid, polyglutamic acid, gelatin, matrigel.

Preferably too, especially in applications related with implantable devices, regenerative biology, or cell culture, said material is non toxic or weakly toxic, or releases only non toxic or weakly toxic products during its biodegradation.

Thus, in some preferred embodiments, matrices in the invention are biocompatible.

In some other preferred embodiments, matrices in the invention are biodegradable.

As a non-exhaustive list, one can mention collagen, agarose, agar gum, polylactic acid, polyglutamic acid, gelatin, matrigel.

In some preferred embodiments, matrices of the invention may comprise biomolecules, or living cells. This can be useful, for instance for preparing organs on chips, or devices for modeling biological processes, for drug discovery or screening for cell biological studies, for preparing implants, systems, components or devices useful in regenerative medicine.

Matrices of the invention may also have in at least part of their volume various ranges of mechanical properties.

In some embodiments, matrices of the invention are rigid, for instance they have in at least part of their volume a young modulus, or a bending modulus, comprised between 100 and 10 000 MPa. In some other embodiments, matrices of the invention are hard elastic materials, i.e. said modulus is typically comprised between 100 kPa and 100 MPa, or between 200 kPa and 3 MPa, or between 1 MPa 100 MPa.

In some other embodiments, matrices are moderately hard elastic materials, i.e. said modulus is comprised between 20 and 500 kPa, or preferably between 20 and 100 kPa.

In some other embodiments, said matrices are soft elastic materials, as is the case for instance for gels, i.e. said modulus may be comprised between 50 Pa and 100 kPa, or between 50 Pa and 50 kPa, or between 50 Pa and 20 kPa.

In some embodiments, said matrices may combine several parts with different properties so matrices may comprise any combinations of the different types of properties recited above.

—Patterning:

Depending on the embodiment, the term «matrix», may not necessarily mean that this matrix is uniform all over the component, chip or device of the invention. On the contrary, in many preferred embodiments, devices of the invention may involve a matrix that is patterned and/or multi-materials, and present different compositions or properties at different places of the device.

In some embodiments, said patterning involves the presence on the surface of said matrix of reliefs, for instance protrusions, recesses, ridges, posts, wells, and the like.

In some other embodiments, said patterning involves the creation on the surface or in the volume of the matrix of different properties, such as optical properties, wetting properties, chemical properties, adhesion properties, electric properties, magnetic properties.

If the component or chip of the invention is essentially sheet-like, said pattern may involve variations of said properties along the sheet, or across it.

Typically, variations along the sheet may be used in order to provide specific properties at such places. For instance, a window may be interesting to allow optical observation, in devices that cannot be transparent at other places.

Matrices of the invention may also involve differences of composition across its thickness, everywhere or in some places, for instance to insulate an internal material from the outside environment. However, even in such embodiments, and in contrast with prior art, the matrix as a whole, i.e. at least one of the inner and outer constituents or parts of said matrix, is embedding the textile and mechanically cohesive with it.

—Additional Properties of the Matrix:

Matrices of the invention may be monolayer, or multilayers, in order to give to said matrices different properties across its thickness. For instance, when the matrix comprises a hydrogel, it may be advantageous to insulate such hydrogel by an external layer of the matrix impermeable to water.

In some preferred embodiments, said matrix is transparent to light in at least some places, or translucent in some places.

In some preferred embodiments in which said matrix additionally embeds a textile, said transparency is combined with a zone of the textile made at least in part of transparent fibers.

In some even more preferred embodiments, said matrix and said support fibers, or said movable fibers are index matched in at least some places.

In some also preferred embodiments, the matrix is transparent in a zone where the textile presents no fibers, or a lower density of fibers, or in a zone devoid of movable or support fibers, or in a zone with a lower density of fibers or movable fibers.

In some preferred embodiments, said matrix is transparent at a place traversed by at least one channel of the invention.

In some other preferred embodiments, said matrix is opaque in at least some places All these different variants provide flexibility in preparing devices of the invention with different optical properties for various functions.

Matrices of the invention may also have different properties regarding different fluids.

In preferred embodiments, matrices of the invention are impermeable and resistant to a fluid, notably to a fluid that will be transported along a channel of the invention.

In preferred embodiments, said fluid is an aqueous fluid. In some other embodiments, it can be an organic, or a hydro-organic, or a fluorinated solvent.

In some preferred embodiments, said matrix is hydrophilic in at least some places.

In some preferred embodiments, said matrix is hydrophobic in at least some places.

In some embodiments combining the two above, matrices of the invention may comprise a hydrophilic zone surrounded by hydrophobic material.

In other embodiments, matrices of the invention may involve on parts of the device some porous zone. In such case, it is often, but not always, preferred that said porous zone is enclosed by a non-porous layer, so that the fluid contained in some porous zone does not leak out of the device.

Said porous zones may be interesting e.g. to help fluid loading by capillary action, or to preload in the device some reagents.

Matrices of the invention may also be, in full or in part, made of a gel.

In different types of embodiments, said gel may be swellable, or swelled by some specific fluids, or permeable to some specific fluids.

In some preferred embodiments, said gel is a hydrogel.

Exemplary preferred embodiments of hydrogels advantageous in the invention are acrylamide based, such as substituted or non substituted polyacrylamides, functionalized polyalkoxydes, such as Polyethylene glycol diacrylate, polysaccharides, polypeptides, and the like.

In preferred embodiments, combinations of different materials may be used in the invention for specific applications. Such combination may be at the micro or nanoscale, e.g. as a mixture or composite.

The above differences in composition can provide devices of the invention the possibility to manipulate, contain and process all kinds of fluids. More generally, devices of the invention may advantageously involve different types of materials at different places. As a non-limitative example, devices of the invention may involve in some places a matrix that is rigid or with a higher modulus than the rest, e.g. to provide stable dimensionality, or for holding. Oppositely, devices of the invention may also involve in some places a low modulus or high elasticity zone, to induce localized and controlled deformability, such as stretchability, or bendability, or a septum effect.

In yet other embodiments, devices of the invention may involve in some places a heat conducting, or an electrically conducting, matrix.

In yet other embodiments, devices of the invention may involve in some places a meltable, or dissolvable matrix. This can be useful for instance to open a valve or port at a selected time e.g. the role of a check valve.

In yet other embodiments, devices of the invention may involve in some places a transparent matrix, to allow for an optical window. In yet other embodiments, devices of the invention may involve in some places a heat conducting, or an electrically conducting, matrix.

In preferred embodiments, the matrix of the invention is made by the hardening of a hardenable material.

This embodiment is particularly interesting, when one wants to prepare devices of the invention by a molding process, or by a photolithography process.

—Textile

In some preferred embodiments, devices, and notably chips, of the invention may comprise a textile embedded in said matrix.

It is thus also an object of the invention, to provide a minifluidic component or chip comprising at least:
a/ a solid matrix,
b/ a textile component, embedded in said matrix,
c/ at least one guiding duct, embedded in said matrix and interwoven with said textile, said guiding duct containing partly or fully a movable fiber, said movable fiber being mobile inside said channel with respect to said textile component, or with respect to said matrix.

Preferably, said textile is mechanically cohesive with said matrix.

Essentially, all types of textiles (also named «fabric», or cloth in the common language) can be used within the invention.

As a non-limiting series of examples:
http://en.wikipedia.org/wiki/List_of_fabric_names, or «http://en.wikipedia.org/wiki/Category:Technical_fabrics» provides some examples of known types of textiles that can be used in the invention. However, in many embodiments, the invention may involve other, more specific designs, while retaining its advantages, and notably the possibility to use the structural properties of textile type materials, and the industrial production methods of the textile industry.

Textiles used in the invention may also be prepared by any of the textile fabrication methods and instruments known in the art, or modifications of said methods or instruments. For instance, said instruments may include, but not be limited to, jacquard looms, dobby looms, bracelet looms, power looms, and the like. Example of looms and weaving methods usable in the invention are described e.g. in http://en.wikipedia.org/wiki/Loom.

Jacquard type textiles and looms are particularly interesting, since they can help to easily confer specific properties in different areas of the device, and also to generate specific complex paths to specific threads, or to specific channels by removal of specific movable threads, within the textile.

In other embodiments, textiles used in devices of the invention may be prepared with knitting, Non limited examples can be found in http://en.wikipedia.org/wiki/Knitting_machine, or in http://en.wikipedia.org/wiki/List_of_knitting_stitches.

In other embodiments, textiles used in devices of the invention may be prepared with felting, for instance and non limitatively wet felting, needle felting, carroting, nano felting, and others.

Essentially any ways to prepare textiles, and to embed them in a matrix, are known in the textile industry, and can be used within the invention.

In some preferred embodiments, textiles in the invention are prepared by any of means known in the art to prepare textiles, such as, non limitatively, weaving, felting, knitting, sewing, knotting, braiding, plaiting, stitching, interlock, 3D weaving, filament winding, or multiaxes filament winding.

In some preferred embodiments, textiles in the invention can be composite, and be prepared by any combination of means known in the art to prepare textiles, such as, non limitatively, weaving, felting, knitting, sewing, knotting, braiding, plaiting, stitching, interlock, 3D weaving, filament winding, or multiaxes filament winding.

In some preferred embodiments, textiles in the invention are woven textiles.

In some preferred embodiments, textiles in the invention are knitted textiles.

In some preferred embodiments, textiles in the invention are felts.

Preferably, but not necessarily, textiles used in the preparation of the invention are flexible.

Also, textiles used within the invention may involve any kind of shapes and structures, they can be single layer, multilayer. They can involve any conventional but also any non-conventional or technical textiles. Also, textiles used in the invention may involve all kinds of structural specificities that will be useful to impart to the devices of the invention specific advantages or functionalities.

In some preferred embodiments, a textile component used in the invention may involve fibers of different diameters, and/or of different elasticities. This can be useful, for instance to define on the final device zones with specific shapes, such as bends, protrusions, recesses, grooves, ridges, holes, windows. In other embodiments, this can be useful to prepare in the final device zones with different mechanical properties, for instance zones of preferred bending, or alternatively zones with a higher rigidity or thickness for instance for holding said device.

In some preferred embodiments, textiles of the invention may involve at least some areas with no fibers, or a lower density of threads: this can be useful, for instance, for preparing in the device a window for observation or detection, or a zone of bending, or a recess.

In some preferred embodiments, said zone with no fibers or a lower density of fibers is traversed by at least one channel.

In some preferred embodiments, textiles of the invention may involve at least some areas with no fibers, or a lower density of threads traversed by at least one channel.

In some preferred embodiments, textiles of the invention may involve at least some areas with a higher density of fibers. This can be useful for instance to impart to the device a more rigid or thicker zone, for mechanical properties, or holding, or for loading material, or any kind of required structural property.

A large number of ways to impart to textiles such structural specificities are known in the textile industry, and can be used within the invention, as will be made clearer in the detailed description In some preferred embodiments, which can be combined with the above, textiles involved in the invention are based at least in some parts of said devices, on textiles with a semi-transparent or open appearance, such as tulle, illusion, voile, lace, net, English net, French net, birdcage, chiffon, organza, However, other types of textiles may also be used, such as, non limitatively, Bengaline, Faille, Brocade, Chiffon/Georgette, Cloque, Crepe, Embellishments, English Net, Eyelet, Linen, Matalasse, Organdy, Peau de Soie, Point d'Esprit, Pongee, Satin, Shantung, Sheer Stretch, Taffetas, Velvet.

In some preferred embodiments, textiles used in the invention are advantageously obtained by textile preparation technologies used for the preparation of lace, or textile with a semi-transparent texture, or textiles with fiber-free-areas. This corresponds, for instance, and non limitatively, to techniques such as Leavers, Heathcoat, Bobin, William Cotton, crochet, knitting. embroidering.

In some preferred embodiments, textiles used in the device according to the invention are made with technologies currently used for knitting, or for making lace, or socks, or stockings, such as, and non limitatively: weft knit, warp knit, using machines based e.g. on the principles of Leavers, Heathcoat, Bobin, William Cotton, Raschel, crochet.

Notably, in some preferred embodiments, textiles used in the invention may have on at least part of their surface an "open" texture, i.e. fibers only cover a part of the area of the textile. This is reflected in the fact that, in said part of their surface, said textiles have a percent coverage by fibers, that is lower than 100%. This percent coverage is measured in a plane parallel to the main plane of the textile. This is advantageous notably for reducing fibers consumption, and to allow easy observation of the channels created within the matrix and having overpasses and underpasses with the textile.

Also, in some preferred embodiments, the above coverage properties of textiles used as components of the invention may differ in different areas of the textile, to provide the final device different properties at suitable places. For instance, a low coverage may be used at some places where observation is needed, or "window", and high coverage may be used at places where the device must have stronger mechanical properties, e.g. and not limitatively, for handling, or for creating connection with the outer world.

Thus, it is also an object of the invention, to propose devices in which the textile has different percentages of fiber coverage at different places of its area.

All the above features, regarding for instance percent coverage by fibers, or regularity of pattern, or inducing different mechanical properties, and notably higher or lesser resistance to deformation, at different places of the device, or changing the flow resistance along a channel, or more generally achieving different properties at different places of a device comprising at least a textile and at least a channel, can be achieved, by using as a support a textile that has, at different places of the device, or in different areas of the device, different patterns of weaving, or different patterns of knitting.

—Different Textile Fibers

In various preferred embodiments, fibers constituting textile components in the invention, called support fibers, can have different types of sections, circular, square, parallelepipedal, ribbon-like, or have more complex shapes.

However, said support fibers may not necessarily have the same section or size all over their length.

In some preferred embodiments, said support fibers have a non uniform section, or are corrugated along their length, or a corrugated surface, in order to strengthen their adhesion to the matrix.

In some other preferred embodiments, however, this is not necessary, and the interweaving of the support fibers is sufficient to ensure this adhesion Said support fibers may also be monofilament, or multifilament. In some preferred embodiment, said fibers are multifilament, in order to facilitate their intimate embedding in the matrix, and the cohesion with it.

In some other preferred embodiments, said support fibers may be monofilament.

Good embedding of the textile into the matrix can be obtained in some embodiments by having wetting properties between the support fibers and the matrix, that allow the support fibers to be wicked or wetted by the matrix.

In other embodiments, this can be obtained by having some adhesion between the support fibers and the matrix. Many ways to tune the adhesion between a support fiber and a matrix are known from those in the art, for instance surface treatment by chemicals or radiation, or playing with the relative hydrophilic/hydrophobic character of the matrix and support fibers, respectively.

Devices

Different Shapes and Properties of the Devices:

Devices, and notably chips, of the invention, may have all kind of properties, as for instance:

In some preferred embodiments, the devices of the invention are rigid.

This may be interesting, for instance for allowing accurate relative positioning of different parts of the chip In some other preferred embodiments, devices of the invention are flexible or semi-flexible.

In some other embodiments, the devices have some rigid and some non rigid areas.

This may be interesting, for instance if different parts of the device must be in register with different supporting elements, that can be mobile with respect to each other.

More generally, devices of the invention may combine any combination of rigid, hard elastic, moderately hard elastic, and soft elastic parts.

In some embodiments, the devices of the invention are planar.

In some other embodiments, the devices of the invention are non planar and developable.

In such a was, devices of the invention may be prepared from planar masters, by roll to roll process. They may also be used and positioned by rotation. However, more complex shapes can also be interesting for some applications, e.g. when high level of integration or compacity is needed. It is indeed and advantage of the invention, to allow remotely guided actions within devices of complex shapes.

In some other embodiments, the devices of the invention are non planar and non developable.

In yet some other embodiments, the devices of the invention are fully three dimensional.

In some preferred embodiments, devices of the invention comprise at least one protrusion, or at least one recess, usable for accurate positioning In some preferred embodiments, the devices of the invention may be bendable, foldable, or stretchable.

Again, it is an advantage of the invention, and notably the possibility of guiding flexible or semi-flexible fibers which confers the invention this unique possibility, allowing much flexibility regarding storing, positioning, and manipulation. Guiding ducts themselves may also be flexible or semi-flexible In some preferred embodiments, said properties may be localized, i.e. systems are flexible, semi-flexible, bendable, foldable or stretchable in a preferred direction, or along at least one predefined line.

In some preferred embodiments, deformation of the devices of the invention may be induced by external mechanical manipulation.

In some other preferred embodiments, deformation of the devices may be induced by injecting pressurized air or a pressurized fluid in at least one channel within the device.

In some other preferred embodiments, deformation of the devices is induced by a mechanical action on an actionable fiber comprised in the device.

For instance, if a fiber is less elastic than the matrix in which its guiding duct is embedded, pulling on one protruding end a fiber that is attached at the other end, will tend to straighten the matrix, whereas pushing on it will alternately tend to bend it.

In some preferred embodiments, said actionable fiber presents a section where it is not embedded in the matrix, and that can be pulled or manipulated in order to induce said deformation to the device.

In some preferred embodiments, said deformation is a bending, or a stretching, or a folding, It is also another object of the invention, to provide a multiplicity of minifluidic devices or chips, in the form of a roll, or in the form of a sheet, or in the form of a stack, or in the form of a folded stack.

In some preferred embodiments, said roll or sheet, or stack, may present some predefined zones for cutting.

In some preferred embodiments, said predefined zones are devoid of matrix.

This latter embodiment is interesting in preparation, since it will leave dangling ends for manipulation directly available, while preparing a multiplicity of chips in a single process.

—Functionalities:

The invention allows the easy implementation of functionalities within minifluidic devices. A first family of functionalities relates to fluid transport.

Ports:

In some preferred embodiments, devices of the invention comprise at least a channel with at least one end open to the exterior of the device, or «port».

In some preferred embodiments, in which the device is sheet-like, said port can be on the side of the device. In some other preferred embodiment, said port can be at the top, or at the bottom, of the device. By "top" or "bottom", or "side", we mean that ports can be on different limiting surfaces of the device, and notably but not necessarily, on two opposite surfaces, for convenience of visualization and not with any specific reference to any orientation in space, with regards to the chip holder, or the vertical direction; in general, indeed, the invention can exert its advantages in any orientation.

In some other embodiments, said port is constituted by a tube, or more generally a piece of material with a lumen, embedded at one of its side in the matrix with its lumen fluidically connected with the channel, and protruding from the system at the other side.

This latter design is convenient, for instance for sucking fluid from an outer vial, or in contrary for delivering fluid from the device to an outer vial, or for connecting a channel in the device to an outer pump, or other means for fluid circulation.

In some other preferred embodiments, said port is a septum in connection with the channel. In some preferred embodiments, said septum is integrated in the matrix.

Connector:

In some preferred embodiments, devices of the invention advantageously comprise a connector, allowing the connection of fluidic tubings between at least a port of a channel of the device, and a reservoir, or a pump, or a valve.

Reservoirs:

In some preferred embodiment, devices of the invention comprise reservoirs or chambers. In some preferred embodiments, at least one of said reservoirs or chambers are integral to the device, or to the chip. In some other preferred embodiments, at least one of said reservoirs or chambers is an additional component fluidically connected or fluidically connectable with at least one channel of the chip or the device.

The choice between these different configurations will depend, for instance, on the volume of fluid to be manipulated, as compared to the dimensions of the device or of the channels. For instance, integrated reservoirs will be preferred for volumes of less than 1 ml, preferably less than 500 µl or less than 200 µl, or less than 100 µlm, or less than 50 µl, or less than 20 µl, or less than 10 µl. Oppositely, external reservoirs may be preferred for volumes larger than 10 µl, preferably larger than 50 µl, preferably larger than 100 µl, or larger than 200 µl or larger than 500 µl, or larger than 1 ml, or larger than 5 ml.

Fluidic Connection:

The invention also provides new ways to implement fluidic connection, or fluidic isolation, between channels.

In some embodiments said fluid connection is performed by an open fluidic path between said channels.

In some other preferred embodiments, channels of the invention can be fluidically connected by a capillary bridge, i.e. with a wicking element, or by a porous element.

More generally, devices of the invention may involve capillary wicking for some functionalities, and notably to induce flow Thus, in some embodiments, channels in the invention can be in fluidic contact with at least one wicking element, wherein said element is wetting for fluid contained in said channel. Said wicking element can be a pad, a paper piece, a yarn, a porous material, or a gel, and the like. This can be useful, for instance for using the wicking element as an integrated pump, as known in prior art, or for increasing surface area, e.g. for creating inside the device a microreactor in connection with the channel.

In some preferred embodiments, said wicking element is also surrounded by the matrix.

In some other embodiments, said wicking element is only partly embedded in the matrix, or not embedded in the matrix.

In some preferred embodiments, said wicking element is a porous fiber, or a porous part of a fiber.

In some preferred embodiments, said porous element is a gel.

In some preferred embodiment, said wicking element or porous element is part of a movable fiber, and notably an actionable fiber.

Valves:

It is also an object of the invention, to provide minifluidic devices with at least one valve integrated in the device or chip.

In yet some other embodiments, the device comprises at least one and optionally a series of sliding valves made of movable fibers.

In some preferred embodiments, the invention comprises a check valve. In some other embodiments, it is a progressive valve, allowing the control of flow in a continuous manner. In some other embodiments, it is a bi-state valve, presenting an open and a closed state. In some other embodiments, it is a selection valve, able to direct fluid in one channel or another As will be shown in some examples below, it is indeed an advantage of the invention, to provide means to integrate valves that can be actuated externally, and operate at essentially any place within devices of the invention, thanks to the positioning and guiding effect of the guiding ducts, on the one hand, and thanks to the possibility to impart some specific transport properties at some places along movable fibers contained in said guiding ducts. Various embodiments make use of these possibilities In some preferred embodiments, said valve involves a first channel intersecting a guiding duct, said duct containing at the point of intersection a movable fiber, and means for pulling or pushing or rotating or twisting said fiber.

In some preferred embodiments, said fiber has an end, that can be moved past the intersection between said channel and said guiding duct.

In some other preferred embodiments, said fiber can change diameter upon pulling or twisting, at the intersection between said channel and said guiding duct.

In some preferred embodiments, said valve involves a first channel intersecting a guiding duct, said guiding duct containing a movable fiber comprising a change of properties along its length, and means to move the location of this change of properties to or from a point of intersection between said channel and said guiding duct.

In some embodiments, said means comprise any of pulling, pushing, bending or twisting of the movable fiber.

In some preferred embodiments, said change of properties is a change in section, or a change of shape.

All kinds of changes of shapes can be used in the invention, for instance and non limitatively, a change in the section, or the presence of pores, or through-holes, or holes, across the fiber, or the presence of bumps, and the like . . . .

In some particularly preferred embodiments, said change of shape involves the presence across the fiber, of through-holes or windows.

In some other preferred embodiments, said change of shapes involves the presence across the fiber, of a porous material connecting one side of the fiber to the other side, In some other preferred embodiments, said change of shape involves a flattened zone, or a recess, or an indentation.

In some other embodiments, said change of properties is a change in wicking properties, or porosity.

In some preferred embodiments said change of shape or properties have the consequence of allowing, or facilitating, the passage of fluid or species from one side of the fiber to the other side, as compared to another place along the fiber where said change of shape is not present.

Thus, in some preferred embodiments, at least one of the movable fibers of the invention presents along its length at least a transverse via.

In some other embodiments, devices of the invention involve at least one integrated pinch valve along a channel.

In some preferred embodiments, said pinch valve involves a zone in which the device is bendable, said zone being traversed by said channel.

In some preferred embodiment, said bendable zone is a line transverse to the axis of the channel.

In some preferred embodiment, the above is facilitated by preparing during the preparation of the matrix, a weaker zone, which crosses the path of the channel. This way, upon bending, the device will make a sharper angle at the weak zone, and pinch the channel.

The weak zone may have different shapes. In some preferred embodiments, it is elongated along a direction transverse to the channel axis.

In some preferred embodiments, the device also comprises means to selectively bend the component or chip or matrix, at a zone traversed by said channel.

In some preferred embodiments, said bending is achieved by a mechanical action on an actionable fiber in the device.

In some other embodiments, the device comprises means for compressing the device, in a zone traversed by the channel. In some preferred embodiments, said zone is a zone of reduced elastic modulus of the device.

In some other embodiments, said zone comprises no textile fibers, or a lower density of textile fibers.

In some preferred embodiments, said means for compressing the device comprises at least a moving piston, or a solenoid actuator.

In some preferred embodiments, said means for compressing the device comprises a braille display.

In other preferred embodiments, actionable fibers are used to pinch the channel at preferred location, without overall deformation of the device. This can be achieved, for instance by wrapping the actionable fiber around the channel at the point of valving, or by squeezing the channel between two actionable fibers.

In some other preferred embodiments, said valve comprises at least an actionable fiber, or a combination of actionable fibers, surrounding said channels, and means to pull or twist or rotate or push said actionable fiber or said combination of actionable fibers.

This configuration may be interesting, for instance if it is needed to avoid direct contact between the movable fiber, and the content of the channel.

In some other embodiments, devices of the invention comprise at least one shot valve. This can be achieved for instance by intersecting a first channel with a guiding duct comprising an actionable fiber, wherein said actionable fiber is either breakable, or fusible at a temperature at which the matrix is not fusible.

In some other preferred embodiments, devices of the invention may also involve any kind of valves known in the art, as additional components in fluidic connection or fluidically connected to at least one channel of the device.

In some other embodiments, integrated devices of the invention may comprise at least one valve non-integral to the chip or component. Said valve may be of any kind known in the art, such as pinch valve, solenoid valve, manual, electric, at least one of said non-integral valve being an additional component fluidically connected or fluidically connectable with at least one channel of the chip.

As another major advantage, as opposed to prior art such as in Lab on Chip 2009, 9,79-86, using e.g. valves attached to the device, in the invention the effect, and for instance the valving effect, can be positioned at any place in the chip thanks to the guiding duct, irrespective of the position of the actuation means. This has numerous advantages. For instance, this allows to perform valving directly at a place at which imaging must be done. It also avoids the risk of heating or deformation at the place of valving, by the actuation element. Also, in the case of complex designs with several valves, this allows to concentrate the location of actuation on one side of the chip, and position the valves or functionalities freely on the chip. Also, a single mechanical element can be used to move several movable fibers, and thus to perform a multiplicity of actions.

Pump:

Some Preferred Devices of the Invention Involve at Least One Integrated Pump

In some preferred embodiment, said pump comprises a guiding duct open on one side to a fluid source, and containing on the other side an actionable fiber actionable by external means. In some embodiments, said guiding duct may also play the role of a channel, i.e. it may transport fluid.

For instance said external means may be an actuator able to pull or push a part of said movable fiber protruding from the device. Said movable fiber thus acts as a piston pump.

In the embodiment described in example 1 for instance, the invention can be used for pumping. This is achieved by creating at one end of a guiding duct a port, such as a protruding tube dipped in a reservoir, or a reservoir in direct contact with said port. When pulling a movable fiber along said guiding duct, fluid can be pumped from said reservoir into said guiding duct, and optionally into a channel in fluidic connection with said guiding duct. In some embodiments, said guiding duct may also be itself provided with some functionalities, and serve both as a guiding duct and as a minifluidic channel.

Of course, this is only a demonstration example, and more complex architectures, with several pumping elements and valves, can be constructed, in order to achieve more elaborate operations. Example 12, for instance, describes an embodiment that can be used for pumping arbitrarily large volumes of liquid from a source port to an exit port.

—Fiber Manipulation:

In some other preferred embodiments, devices of the invention comprise a fiber manipulation means.

Thanks to this, in combination with the possibility to deport the mechanical action onto the fiber to any place or along any path within the device, complex protocols can be implemented with simple means, and for instance fluidic operations can be induced mechanically.

In some preferred embodiment, said fiber manipulation means comprises a movable tweezer, or holder, or hook, with such specification and position as to grab at least one movable fiber protruding from the invention's matrix, and to pull, push or twist said fiber.

In some other preferred embodiment, devices of the invention comprise a multiplicity of said fiber manipulation means, able to act differently on different fibers protruding from the invention's matrix.

Instrument

Of course, the invention's advantage become more fully evident, when the chip comprising the matrix, and at least a guiding duct and a movable fiber, is integrated in a full apparatus to achieve some aims, and perform some operations. Thus, in some preferred embodiments, microfluidic devices of the invention constitute an instrument.

The invention can be useful for the construction of various types of instruments, preferably miniaturized instruments. Many miniaturized instruments have already been implemented in microfluidics, but in a more complex or less effective fashion, than allowed by the invention.

In some preferred embodiments, said instrument is a capillary electrophoresis or microchannel electrophoresis instrument.

In some preferred embodiments, said instrument is an analytical instrument.

In some preferred embodiments, said instrument is able to analyze any or any combination of biological, physical or chemical agents. Said agents may be any of atoms, ions, molecules, macromolecules, molecular assemblies, living organisms, chemical or biological compounds, species or molecules or molecular assemblies or organelles issued from living organisms, microparticles, nanoparticles.

In some preferred embodiments, said instrument is a nucleic acid analysis instrument.

In some preferred embodiments, said instrument is a protein analysis instrument.

In some preferred embodiments, said instrument is a chemical or biochemical analysis instrument.

In yet some other preferred embodiments, a system of the invention, and notably an instrument of the invention, is a production instrument capable of transforming at least one raw material into at least a transformed product.

In yet some other preferred embodiment, a system of the invention, and notably an instrument of the invention, is a medical instrument In some preferred embodiments, a system of the invention, and notably an instrument of the invention, constitutes, or is part of, a functional clothing, or a wearable instrument, or an implantable instrument.

This family of devices is also a specific advantage of the instrument, notably in the subset of embodiments in which the matrix is embedding a textile. The possibility to effect various operation, and notably fluidic operations, within the matrix and thus directly within the textile component, is of course a strong advantage of the invention, as compared to other wearable devices, such as e.g. FR2942041 to Revol-Cavalier.

Said functional clothing or systems of the invention, and notably an instrument of the invention, may be implantable or non implantable. Said system or instrument may be for instance and as a non limiting list of examples, instruments for monitoring of certain body fluids, for monitoring of a certain condition or illness of the wearer, or for monitoring of physical activity, or for monitoring of certain environmental factors, of a chemical, physical or biological nature.

Functional clothing, wearable systems, implantable systems of the invention may also be delivery instruments: as non limiting examples, they may deliver to an organism some active compounds. In some preferred embodiments, said delivery is transdermal. In some other preferred embodiments, said delivery is by direct diffusion; in yet some other embodiments, said delivery is made by microneedles; in yet some other embodiments, said delivery is done by a catheter.

These different functions can be advantageously combined. For instance, a functional clothing, wearable system, or implantable system of the invention, may combine the function of monitoring a biological biomarker, for instance sugar content, and delivering some active compound, for instance insulin, in response to said measure.

In some other preferred embodiments, systems of the invention may be, or be part of, environment monitoring instruments. In various preferred embodiments, the environment parameters monitored may be any, or any combination of biological, physical or chemical agents. Said agents may be any of atoms, ions, molecules, molecular assemblies, living organisms, chemical or biological compounds, species or molecules or molecular assemblies or organelles issued from living organisms, microparticles, nanoparticles.

In some preferred embodiments, systems of the invention, and notably environment monitoring instruments functional clothing, wearable instrument, or implantable instrument of the invention are autonomous.

In some preferred embodiments, systems of the invention, and notably functional clothing, wearable systems, or implantable systems of the invention comprise a power source. Said power source can have its energy embarked, such as in batteries, or draw its power from mechanical action, or draw its power from electromagnetic radiation.

In some preferred embodiments, systems of the invention, and notably environment monitoring systems, functional clothing, wearable or implantable systems of the invention comprise a wireless communication means.

In some other embodiments, systems of the invention may be used as implantable devices, for regenerative medicine, or as a step for the preparation of an implantable device. In such cases, matrices of the biocompatible type, or of the biodegradable type, or matrices that are biocompatible and biodegradable, are particularly advantageous. Also, matrices or channel may advantageously contain cells, and/or biological substrates suitable for stimulating cell adhesion and/or growth, such as for instance matrigel, growth factors, laminin, fibronectin, and the like.

In some other preferred embodiments, the system of the invention is a cell culture system.

As for the cells usable in devices of the invention, they can be any cells or combinations of cells, notably mammal cells, for instance neural cells, glial cells, cardiomycetes, endothelial cells, epithelial cells, fibroblasts, chondrocytes, hepatocytes, and more generally any differentiated cells involved in mammals organs.

In some preferred embodiments, cells used in devices of the invention are stem cells, Pluripotent Embryonic Stem Cells or reprogrammed adult somatic cells (iPS cells), from animals, and notably from humans.

Generally speaking devices of the invention are very suitable to cultivate cells, because they can be made from biomaterials, or biocompatible materials, which are very difficult to structure accurately by conventional methods, whereas still providing means to compartmentalize channels, transport fluids, position cells, and the like.

In some preferred embodiments, systems of the invention comprise at least two zones, such as two channel sections or two chambers, or two portions of a chamber, or two portion of a channel, said two zones containing either cells of a different type, or cells in a different state, or cells at a different concentration, or different fluids, and a movable fiber able to modify the fluidic communication between said two zones.

From the above, it can be seen that many advantages of devices of the invention may be produced by specificities of any of or any of the matrix, movable fiber(s) or channel(s) of the invention, i.e. be integral to the invention's chip or component.

In some other preferred embodiments, however, said functionalities may be produced by a combination of specificities integral to the invention's chip, and of one or several additional components acting together with the invention's chip or component, thus being part of an integrated device of the invention.

In some embodiments, devices of the invention may also involve additional pumping elements, not directly using movable fibers of the invention.

—Electrokinetic Pumping:

For instance, devices of the invention may comprise means to drive fluids or species by electrokinetic actuation.

—External Pump:

In some other preferred embodiments, devices of the invention may also comprise at least one pump that is not integrated into the chip, said at least one pump being an additional component fluidically connected or fluidically connectable with at least one channel of the chip. Said pump may be of any type known in the art, such as peristaltic pump, syringe pump, pressure pump, gear pump, piston pump, centrifugal pump, electroosmotic pump.

In some preferred embodiment, devices of the invention, or integrated devices of the invention, comprise at least a vibrating pump.

Other types of functionalities, listed below as a non-limiting and non-exhaustive examples, can also be associated advantageously within devices of the invention.

—Optical:

In some preferred embodiments, devices of the invention comprise at least a window transparent to some radiation, like visible light, UV light, infrared light, X rays.

Preferably, said window is traversed by at least a channel.

Preferably, said window is associated with a zone, in which the matrix is transparent or translucent.

In some other preferred embodiments, devices of the invention can comprise at least one light-conductive element, such as an optical fiber, able to bring light at predefined positions inside the device, or collect light from the device, or a combination thereof.

In other preferred embodiments, devices of the invention may comprise at least one optical assembly. Said assembly can be used, for instance, to condition light to be impinged in the at least one channel, or to condition and analyze light collected from said at least one channel of the invention. Said assembly can comprise, for instance, any or any combination of lenses, mirrors, filters, prisms, chromatographic elements, gratings, light-emitting devices, light sources, light-sensitive devices, diodes, photodiodes photomultipliers, cameras, light intensifiers, waveguides, microscope objectives, optical fibers, polarizers, and more generally any of optical components known in the art.

Windows or light conducting elements, or optical components allow observation by optical imaging or detection means, or photostimulation, inside of channels, and thus open for the invention a multiplicity of applications, such as optical imaging, fluorescence, luminescence, photostimulation, light absorption, crystallography, scattering, spectroscopy, chemiluminescence, electrochemiluminescence, or all kinds of optically activated chemical or biological reactions, such as light-induced transconformation, uncaging, polymerization, degradation, optogenetics, electro-optic surface modifications, and the like.

—Electrical:

In some other preferred embodiments, devices of the invention, or integrated devices of the invention, may comprise electrically conducting elements associated in the invention's device. In some preferred embodiments, said electrically conducting elements are in electric connectivity with the interior of the channel.

In some preferred embodiments, said conducting elements are in direct electric contact with at least one channel.

In some other preferred embodiments, said electrically conducting elements are insulated from channels in the device by a dielectric layer.

In some preferred embodiments, said conducting elements may comprise, or be part of, or be connected to, any electronic device, or any device involving the measure of a current, or the measure of a potential. As a non exhaustive list of examples, said conducting elements may comprise pH sensors, ion-sensitive sensors, biosensors, chemical sensors, electrochemically active electrodes, piezoelectric elements, deformation sensors, position sensors, components of an impedancemetric sensor, temperature sensors, field effect transistors, and the like.

In some preferred embodiments, said electrically conducting element is a heating element.

In some other preferred embodiments, said electrically conducting element is a solenoid, or a spire, generating a magnetic field.

In some preferred embodiments, too, said conducting element is also a movable fiber. This provides much flexibility, not known in prior art, to change conduction properties, or more generally to change the electric actions within devices of the invention, thanks to a manipulation.

—Magnetic:

In some other preferred embodiments, devices of the invention, or integrated devices of the invention may involve at least a magnetic element.

In some preferred embodiments, said magnetic element is a wire of a magnetic material.

In some preferred embodiments, said magnetic element is a magnetic core of soft magnetic material, or a magnet.

In preferred embodiments, said electrically conducting elements, or said magnetic elements, or said light conducting elements, may be embedded at least in part in the matrix.

In some preferred embodiments, said magnetic element may be a movable fiber, or may be attached to a movable fiber, or may be part of a movable fiber.

In a direct way, is the magnetic element bears a permanent magnetic polarization this may allow to perform a magnetic action directly within devices of the invention, with accuracy and simplicity. In other embodiments, said magnetic elements may be magnetizable elements, such as superparamagnetic, or soft ferromagnetic elements, and modify locally within the device the value and geometry of a magnetic field imposed from outside by a supplementary magnetic device.

—Mechanics:

In some preferred embodiments, devices of the invention may comprise at least one mechanical additional component.

In some preferred embodiments, said additional component may be a chip holder.

In some preferred embodiments, devices of the invention comprise a chip manipulation means.

In some other preferred embodiments, advantageous in combination with devices of the invention provided in the form of rolls, stacks or folds, said additional element may comprise a dispenser of individual fluidic systems from said roll, stack or fold.

In some other preferred embodiments, advantageous in combination with devices of the invention provided in the form of rolls, stacks or folds, integrated devices of the invention comprise means for automatic positioning of chips, or means for automatic positioning of electric, optic or fluidic connections to the chip, or a combination thereof.

In some other preferred embodiments, advantageous in combination with devices of the invention provided in the form of rolls, stacks or folds, integrated devices of the invention comprise means for refolding or re-winding and storing chips.

Said manipulation means may be different from the manipulation means used to manipulate the movable fibers. In some embodiments, though, manipulating means for the chip, and for the movable fibers, may be part of a single mechanical device.

Numerous devices for manipulating fibers are known in the textile industry, and can be used, as directly commercially available, or as a construction concept to be implemented with regards to the specific size and geometry of devices of the invention; within said invention. Some of these instruments, such as for instance Jacquard or other type of looms, have been cited above in the context of means usable to prepare fabrics to be embedded in the matrix, or usable to integrate mobile fibers in such textile, but they may also be used to manipulate movable fibers, once the device has been prepared.

—Electric:

In some preferred embodiments, devices of the invention comprise at least one additional component that is an electric power generator. Said embodiments are particularly interesting in order to perform electrokinetic displacement within the device, or electrochemical or impedancemetric detection.

In some preferred embodiment, devices of the invention or integrated devices of the invention comprise, or are connected to, a digital or analogic signal processor.

In some preferred embodiments, devices of the invention or integrated devices of the invention comprise, or are able to exchange information with any of information processing systems, such as microprocessors, microcontrollers, computers, smartphones, tablets, and the like. In various preferred embodiments, said exchange of information may be wireless, or through electronic connection.

Of course, in preferred embodiments, any of the above features, chips, additional components or functionalities can be combined in a device of the invention, in order to achieve a given function, or to implement a selected protocol.

Methods

Another advantage of the invention is the possibility to prepare minifluidic devices with integrated elements, for instance integrated functional elements, in a way simpler than in prior art, and notably without microfabrication means, or with simplified use of microfabrication means.

Movable fibers, either available commercially or prepared by any methods known in the art, some of which have been recalled above, can have very accurate sizes and shapes, in a wide range of diameters. The size of fibers can be tuned down to micrometers, or even nanometers. Thus, the invention allows ways to prepare minifluidic devices with accurately defined elements, such as movable fibers, valves, pumps, chambers, reservoirs, sensors, electrodes, optical elements and more generally functional or structural elements and the like, without the need, or with more limited need, of expensive microfabrication.

It is thus also an object of the invention to propose a method of preparing a functional minifluidic device, comprising the steps of a/ providing a matrix comprising at least a guiding duct embedded at least in part in said matrix, with at least one port to the outside of the matrix, b/ providing a movable fiber, with non adhesive or weakly adhesive properties with regards to said matrix c/ embedding at least in part in part said movable fiber within said guiding duct, Wherein said ensemble of the matrix, the guiding duct and the fiber partly or fully enclosed in said guiding duct is operational without full removal of said movable fiber from said guiding duct.

In some preferred embodiments, the preparation of the guiding duct is achieved by first positioning said movable fiber within a molding vial, and second casting said matrix in said molding vial with said movable fiber within.

This method is particularly interesting if one wants to avoid, or do not have access to, conventional microfabrication means In some other preferred embodiments, the preparation of the guiding duct is performed in the absence of movable fibers, and said movable fiber is inserted in the precast guiding duct, after fabrication of the matrix with its embedded guiding duct.

Said precast guiding duct may be prepared by any of the microfabrication means used in prior art to create channels in a material, and notably by "soft lithograpy". This way is more convenient for some applications, for instance if a movable fiber is to be inserted in a space that has dimensions significantly different from the dimensions of said fiber, and must then be prepared separately In some preferred embodiments, said method additionally comprises the preparation of a channel intersecting said guiding duct. In some preferred embodiments, said channel is prepared simultaneously with the guiding duct, by any microfabrication means used in prior art to create channels in a material, and notably by "soft lithograpy".

In some other preferred embodiments, said channel is prepared by positioning in said molding vial a second removable fiber in contact with said movable fiber, then embedding the movable and removable fiber in a matrix precursor material, then hardening said material, and finally removing said removable fiber after the matrix hardening.

In some other preferred embodiments, a matrix comprising at least a channel is first prepared, and a guiding duct intersecting said channel is then prepared by punching or drilling, or any means able to remove material from the matrix.

In some preferred embodiments, the movable fiber is displaced within said matrix without creating a channel.

In this latter embodiment, the motion of the movable fiber can be used for various functions, for instance for actioning a valve, actioning a pump, or deforming the microfluidic device.

In some other preferred embodiments, the movable fiber is partly removed from the matrix, thus creating a partly open channel. This can be used for instance for pumping.

In some other preferred embodiments, the movable fiber, or preferably an additional movable fiber, is fully removed from the matrix, thus creating a channel. Thus, in some preferred embodiments, the method involves at least two movable fibers, one of which is a removable fiber, and is fully removed after creation of the device to create an open or a partly open channel, and another one is an actionable fiber.

In some preferred embodiments, removal of the removable fiber is performed by pulling.

In some other preferred embodiments, removal of the removable fiber is performed by melting or by dissolving. Thus, in some preferred embodiments, said removable fiber is constituted in a material with a melting temperature lower than the melting temperature of the matrix, and lower than the melting temperature of the textile. In some preferred embodiments, said movable fiber is soluble in a solvent that does not dissolve the matrix. Said property is particularly interesting for removable fibers, in order to create in said matrix a channel.

By "being operational", we mean that said chip, comprising the at least movable fiber can for instance be placed in such state in a packaging for commercialization, or in a chip holder, or in an instrument, without removal of said fiber from said matrix. By this, we also means that, for instance, fluid, and notably aqueous fluids or mixtures or emulsions comprising aqueous fluids, can be flown in said device, without full removal of said fiber.

We also mean that said chip, optionally in combination with a chip holder, or an instrument, or more generally various types of additional components, is suitable to perform a variety of functions, such as analyzing any of a biological, a physical or a chemical agent, or monitoring a process, an environment, a living species, a condition of a patient or for producing a product, or discovering or testing a drug or an active product.

In some preferred embodiments, a textile embedded in the matrix is used to help the positioning of the guiding duct. Thus, the method of the invention additionally involves a step of preparing a textile component comprising support fibers, and embedding said textile component within the matrix.

It is thus another object of the invention, to provide a method to prepare a minifluidic device with integrated functionalities, comprising the steps of:

a/ Providing a textile component comprising at least a movable fiber interwoven or entangled with said textile b/ Embedding at least part of said textile and part of said movable fiber in a matrix, wherein said movable fiber can slide within said matrix, and said textile component is mechanically cohesive with said matrix.

These methods using movable fibers interwoven or entangled with textile may be interesting for several reasons. First the textile can impart the chip additional mechanical properties, such as shear resistance and mechanical stability. Second, by interweaving or entangling the movable fiber with the support fibers, it is possible to guide the movable fibers, and optionally the channels if they are prepared from removable fibers, along well-defined and potentially complex paths, without any need for microfabrication means In some preferred embodiments, said movable fiber may be directly integrated into the textile component during its preparation. In some other embodiments, the movable fiber may be interwoven or entangled with said textile after a first step of preparation of the textile, for instance and non limitatively, by sewing, or stitching.

Thus, it is an object of the invention to propose a method for preparing a microfluidic device, comprising the steps of:
a/ Providing a textile component
b/ interweaving or entangling a movable fiber with said textile component.
c/ Embedding at least part of said textile and part of said movable fiber in a matrix,
wherein said movable fiber can slide within said matrix, and said textile component is mechanically cohesive with said matrix.

—Different Modes of Creation of Microchannels:

In some preferred embodiments, methods of the invention also provide a step of embedding in said matrix at least a second movable fiber, called a removable fiber, and removing completely said removable fiber from said matrix after the hardening or casting of said matrix.

In some preferred embodiments, said step of removing said removable fibers create a channel embedded in said matrix.

Preferably, the movable fiber or movable fibers are different from at least one of the support fibers constituting the textile. Thus, it is also an object of the invention to provide a method for preparing a minifluidic device, comprising the steps of:
a/ Providing a textile comprising a first type of support fibers, and at least one movable fiber interwoven with said textile,
b/ Embedding at least part of said textile and part of said movable fiber in a hardenable matrix precursor material, and hardening said material to create a matrix,
wherein said movable fiber can slide or rotate within said matrix after the hardening of said matrix, and support fibers cannot slide within said matrix after the hardening of said matrix.

Of course, these methods to prepare channels are advantageously with the simultaneous integration in the chip of movable fibers, preferably intersecting with said channels. This way, both the channels and chambers in which the transport and operations of interest are performed, and the flow control means themselves, can be prepared in a single step with a unified technology.

—Different Types of Interweaving or Entangling Methods:

Textile components used in the invention may be made by many manual, mechanical or automated way of interweaving or entangling fibers.

In various preferred embodiments, textile component is prepared by any of, or any combination of, weaving, tag weaving, multilevel weaving, knitting, sewing stitching, interlock, 3D weaving, felting, mixing, knotting, braiding, plaiting, filament winding, multiaxes filament winding.

In some other preferred embodiments, entangling can be achieved by less conventional means, such as electrospinning, a combination of mixing and pressing, sputtering.

In some embodiments, the method for preparing the textile may comprise any combination of the above.

—Different Modes of Interweaving or Entangling Movable Fibers:

In some preferred embodiments, advantageous for simplicity and cost, as well as accuracy of positioning, the movable fiber or movable fibers are interwoven or entangled within the textile by the same process as use for preparing said textile.

In some other preferred embodiments, advantageous to provide additional versatility in the fabrication method, at least one movable fiber is or entangled with the textile component after preparation of said textile component, and possibly with a different technique.

Depending on the embodiment, said different technique may be any of the techniques for interweaving already recited with regards to the fabrication of the textile In some preferred embodiments, said movable fiber is interwoven by sewing, or by stitching.

In some embodiments, it may also be useful to electrically connect devices of the invention with additional elements. In some preferred embodiments, this can be done by various methods, and notably any combination of electronics printing, wire bonding, sewing, soldering, wave soldering, and the like.

In some preferred embodiments, channels may be filled with a metal that is liquid at room temperature, or at a temperature lower than the melting temperature of the matrix and of the textile.

—Different Ways of Treating Fibers:

In some preferred embodiments, support fibers or mobile fibers used in the invention are advantageously treated prior to their integration in the device, in order to give them some properties or combination of properties. Said treatment may be any kind of treatment, chemical, physical or biological.

In some preferred embodiments, said treatments impart to said fibers properties on their surface that are different from the volume properties. The relevant surface or volume properties may be for instance, texture, hydrophilic/hydrophobic balance, adhesion, color, transparency, biocompatibility, reflectivity.

Said treatments may involve, as a non limiting list, chemical treatment in liquid or vapor phase, light irradiation, plasma treatment, printing, screen printing, spraying, electrospray, corona treatment, heating, flash heating, cooling.

Said treatments may be performed on individual fibers, or in parallel on many fibers.

Said treatments may also be performed on support fibers before their assembly into a textile, or after said assembly, on the textile as a whole.

Said treatments may also be performed on mobile fibers before their interweaving or entanglement into the textile, or after said assembly.

Also, fibers in the invention may not be treated uniformly along their length or surface. In some advantageous embodiments, said treatment imparts along the length of a fiber different zones with different properties.

—Textile and/or Support Fibers Embedding in the Matrix:

The invention may also use various means, for combining a textile, or more generally support fibers, and a matrix, in order to achieve the objective of embedding said textile or support fibers in the matrix, and/or creating between said textile or support fibers and said matrix mechanical cohesion.

In some embodiments, said means may involve methods already known in the art for the enduction of textiles, such as spraying, painting, direct coating, transfer coating, online coating, melt coating, calendering, rolling, lamination, printing, screen printing.

In preferred embodiments, said embedding comprises the step of providing the matrix in a liquid, gel, pasty of fluid form, embedding the textile or support fibers in said matrix by various means, and then letting said matrix harden.

Said fluid form of the matrix may be obtained by melting, by dissolution of a solvent, or by providing the matrix with not yet reacted reactive function.

Hardening of the matrix may be achieved by drying, solvent removal, solvent evaporation, heating, cooling, or by triggering a chemical reaction by heating, by electromagnetic radiation.

In some embodiments, said enduction is achieved in a single step. In some other embodiments, said enduction is achieved in several steps.

In some embodiments, enduction is combined with a process in which the matrix is patterned.

In some embodiments, said patterning involves the creation on the surface of said matrix of reliefs, for instance protrusions, recesses, ridges, posts, wells, and the like.

This creation of reliefs is advantageously obtained by applying during the device preparation any or any combination of step of embossing, of molding, of roll embossing, of injection molding, of microcontact printing, of microlithography.

In some other embodiments, said patterning involves the creation on the surface or in the volume of the matrix of different properties, such as optical properties, wetting properties, chemical properties, adhesion properties, electric properties, magnetic properties.

Said properties may be obtained by any step of, or any combination of, printing, light insulating, spraying, screen printing, photographic printing, offset, lithography, microlithography, irradiation.

The methods described above, for embedding a textile or support fibers in a matrix, may also be used advantageously for embedding movable fibers in said matrix.

In some embodiments, said embedding of movable fibers is performed simultaneously with the embedding of support fibers or textile, preferably in a state in which said movable fibers and said textile or support fibers are entangled.

In some other embodiments, said embedding of movable fibers may be performed without the presence of textile or support fibers, or in a state in which said movable fibers are not entangled with the support fibers or textile, although this latter embodiment has a more limited range of applications, since it cannot benefit from the advantages brought by the entanglement. It may be interesting, however, in some cases, for instance when one wishes to have the structural reinforcement of the matrix by the textile or support fibers, but keep the movable fibers in a zone free of support fibers, for instance for easier sliding, or for visualization on large areas.

—Preparation of Movable Fibers:

As mentioned above, fibers in the invention may be made of any kind of materials, and indeed various types of materials already shaped as fibers may be purchased and used as provided. This is demonstrated for instance in example 6: the movable fiber is a nylon fiber, and the guiding duct is prepared by punching with a needle, a PDMS chip that already contains a microchannel. This PDMS chip was prepared by conventional soft lithography.

In some cases, however, it is necessary in the invention, to alter the shape of a pre-existing fiber, or to constitute de novo a fiber with a predefined shape. In some embodiments, methods of the invention additionally comprise the step of modifying the shape of the actionable fiber on part of its length. A non limited list of means comprise:

A: Compressing the fiber in one direction
B: Locally stretching the fiber
C: locally casting on the fiber an additional material
D: locally eroding the fiber by mechanical or thermal or chemical means In example 8, for instance, one shows that one can also modify locally the shape of a commercial cylindrical fiber, in order to have a "leaking" zone. When this leaking zone is positioned out of the intersection of the guiding duct with the channel, there is no flow, and flow is allowed by moving the leaking zone of the fiber at the intersection.

In other embodiments, the same effect could be achieved by stretching the fiber to reduce its diameter, or to rotate it to orient the leaking zone along or perpendicular to the flow path.

However, if needed, e.g. for preparing some more complex shapes, movable fibers of the invention can be prepared de novo, by molding, or casting, or by additive methods, such as 3D printing, or by microlithography, or by micromachining.

For instance, example 9 describes an embodiment, in which a fiber with a multiplicity of vias, is prepared by 3D printing, and then inserted inside a guiding duct prepared by conventional microlithography. In that case the fiber and the guiding duct are rectangular, so that the fiber cannot rotate, and the vias always keep the right orientation. The vias can be moved towards the intersection of the guiding duct with a channel, thus creating a fluidic conduction between the two sides of the channel. In example 9, said channel comprises a chamber at the point of intersection, and thus the motion of the movable fiber can be used in order to compartmentalize said chamber in two subchambers, reversibly.

In some other embodiments, movable fibers can be prepared in situ, by the process of a/ preparing a minifluidic chip with at least one guiding duct, and optionally additional channels. Said preparation may be performed by any method known in the art for preparing minifluidic chips.

b/ filling at least said guiding duct with a fiber precursor material. Typically, a fiber precursor material is a hardenable material, which may compositions and properties similar to those of hardenable materials used as matric precursor material, but with the additional property that once hardened, it does not adhere, or adhere only weakly, to the material of the matrix.

c/ Hardening said fiber precursor material inside said guiding duct, in order to create the fiber.

In some preferred embodiments, step c is performed under a photomask, or under a patterned illumination. This can be useful for instance to create microstructures, or via, onto the fiber.

In some preferred embodiments, too, said guiding duct may present in at least one of its ports an enlarged zone, in order to create a handle mechanically cohesive with the movable fiber, simultaneously with the preparation of said fiber.

More generally, when the movable fiber is prepared in situ, and in contrast with the prior art, the presence on the guiding duct, of a port to the outside of the matrix allows to provide the movable fiber with mechanical access from the outside of the chip, and thus to allow its manipulation.

More generally, in preferred embodiments, movable fibers of the invention comprise at some place along their length, or at one end, a surface in contact with the exterior of the chip, or a part that can be mechanically manipulated from the outside of the chip.

This method is useful for instance for the preparation of fibers with small lateral dimensions, typically smaller than 100 µl, or complex shapes, or for the preparation of devices with a multiplicity of movable fibers in a multiplicity of guiding duct.

The invention is also directed to a method of making a minifluidic device said method including the steps of:
a/ Providing at least a movable fiber,
b/ Providing a microfluidic network molding support,
c/ Filing the microfluidic network molding support with a matrix precursor material and simultaneously embedding at least part of said moving fiber in the matrix precursor material,
d/ applying a treatment to the matrix precursor material of step c in order to obtain a solid matrix,
e/ removing at least in part said movable fiber from said matrix, in order to create a guiding duct.

According to another embodiment, the invention is directed to a method of making a minifluidic device said method including the steps of:
a/ Providing at least a solid guiding duct, wherein a movable fiber is present at least in part in the guiding duct,
b/ Providing a microfluidic network molding support,
c/ Filing the microfluidic network molding support with a matrix precursor material and simultaneously embedding at least part of said guiding duct in the matrix precursor material,
d/ applying a treatment to the matrix precursor material of step c in order to obtain a solid matrix, According to an embodiment, the invention is directed to a method of making a minifluidic device as above disclosed, said method comprising providing a mini fluidic device comprising at least:
a/ a matrix,
b/ an elongated guiding duct embedded at least in part in said matrix, with at least one port to the outside of the matrix,
c at least one zone in fluidic connection with said guiding duct, said zone being selected from: a fluid drop area, a reservoir, or a chamber,
d/ introducing into said guiding duct a movable fiber able to undergo within said guiding duct, and at least along some part of said fiber, at least one action selected among a sliding, or a deformation, or a rotation.

According to an embodiment, the invention is directed to a method of making a minifluidic device as above disclosed, said method comprising providing a mini fluidic device comprising at least:
a/ a matrix,
b/ an elongated guiding duct embedded at least in part in said matrix, with at least one port to the outside of the matrix,
c at least one zone in fluidic connection with said guiding duct, said zone being selected from: a fluid drop area, a reservoir, or a chamber,
d/ introducing into said guiding duct a movable fiber precursor material,
e/ applying a treatment to the movable fiber precursor material of step d in order to obtain a solid movable fiber able to undergo within said guiding duct, and at least along some part of said fiber, at least one action selected among a sliding, or a deformation, or a rotation.

The invention is directed to a method of making a minifluidic device as above disclosed, said method including the steps of:

a/ providing a textile component comprising support fibers and comprising at least a movable fiber entangled with at least one support fiber of said textile,
b/ embedding at least part of said textile and part of said movable fiber in a matrix precursor material,
c/ applying a treatment to the matrix precursor material of step b in order to obtain a solid matrix,
wherein at least part of said movable fiber can move within said matrix, and at least part of said textile component is mechanically cohesive with said matrix.

—Methods of Monitoring Analysis, Etc:

It is also another object of the invention to provide methods taking advantage of devices of the invention.

In some embodiments, the method of the invention is a method for analyzing any of biological, physical or chemical agents, wherein analysis is performed using a device of the invention. Said agents may be any of atoms, ions, molecules, macromolecules, molecular assemblies, living organisms, chemical or biological compounds, species or molecules or molecular assemblies or organelles issued from living organisms, microparticles, nanoparticles, explosives, chemicals, gases, toxins, drugs, nucleic acids, polypeptides, metabolites, drugs, polysaccharides, proteoglycans.

In some other embodiments, the method is a method of monitoring any of a process, an environment, a living species, a patient, wherein monitoring is performed using a device of the invention In some other embodiments, the method is a method for producing a product, wherein said production is performed using at least one device of the invention In some other embodiments, the method is a method for discovering a drug or an active product, wherein said discovery is performed using at least one device of the invention.

In some other embodiments, the method is a method for testing a drug or an active product, wherein said test is performed using at least one device of the invention In some preferred embodiments, the method is a method for cultivating cells, or tissues, or organs, or organisms, or parts of tissues, organs or organisms.

In some preferred embodiments, said cells comprise stem cells, or dedifferentiated cells, or iPSCs Kits:

The invention is also directed to a kit for making a minifluidic instrument, said kit comprising at least:
—a minifluidic device as above disclosed, and
at least one component selected among:
a fluid,
a chemical product or a biological product,
a disposable fluidic component.

The kit is a collection of parts, generally disposable parts, or consumable parts, that can be inserted in a fluidic instrument, and are appropriate for the uses and methods that have been above disclosed.

Notably, the kit can comprise a fluid that can be introduced into the fluidic network. The fluid can be a solvent, like water, or an organic solvent, it can be an aqueous saline solution, a buffer, an oil, an emulsion (Oil-in-Water or Water-in-Oil), a dispersion. The fluid can be a solution of a chemical reactant in a solvent. Alternately, the kit can comprise solvents in a first conditioning, and reactants, of biological or chemical nature, in a separate conditioning.

Among reactants, one can mention any reactant of interest for making chemical reactions, colorants for observing fluidic flow in the fluidic network. One can also mention mediums appropriate for cells culturing, buffers, probes of any type, antibodies, antigens, proteins, peptides, fluorescent markers etc . . . .

The kit can comprise several of these components, separate or combined. Reactants or fluids can be presented in any type of container, like for example a reservoir, a syringe, a cone. Chemicals can be grafted on a chip or located in the wells of a titration plate. Cells can be provided directly on a chip or in a micro titration plate.

Kits generally have the advantage of providing the components necessary for performing a reaction or a culture or any other type of experiment. Kits generally have the advantage of providing these components in amounts appropriate for achieving these reactions or cultures or experiments.

FIGURES

It will be convenient to further describe the invention with respect to the accompanying figures which illustrate preferred embodiments of the three dimensional microfluidic system according to the present invention. Other embodiments of the invention are possible, and consequently, the particularity of the accompanying figures is not to be understood as superseding the generality of the preceding description of the invention.

Figure 15:
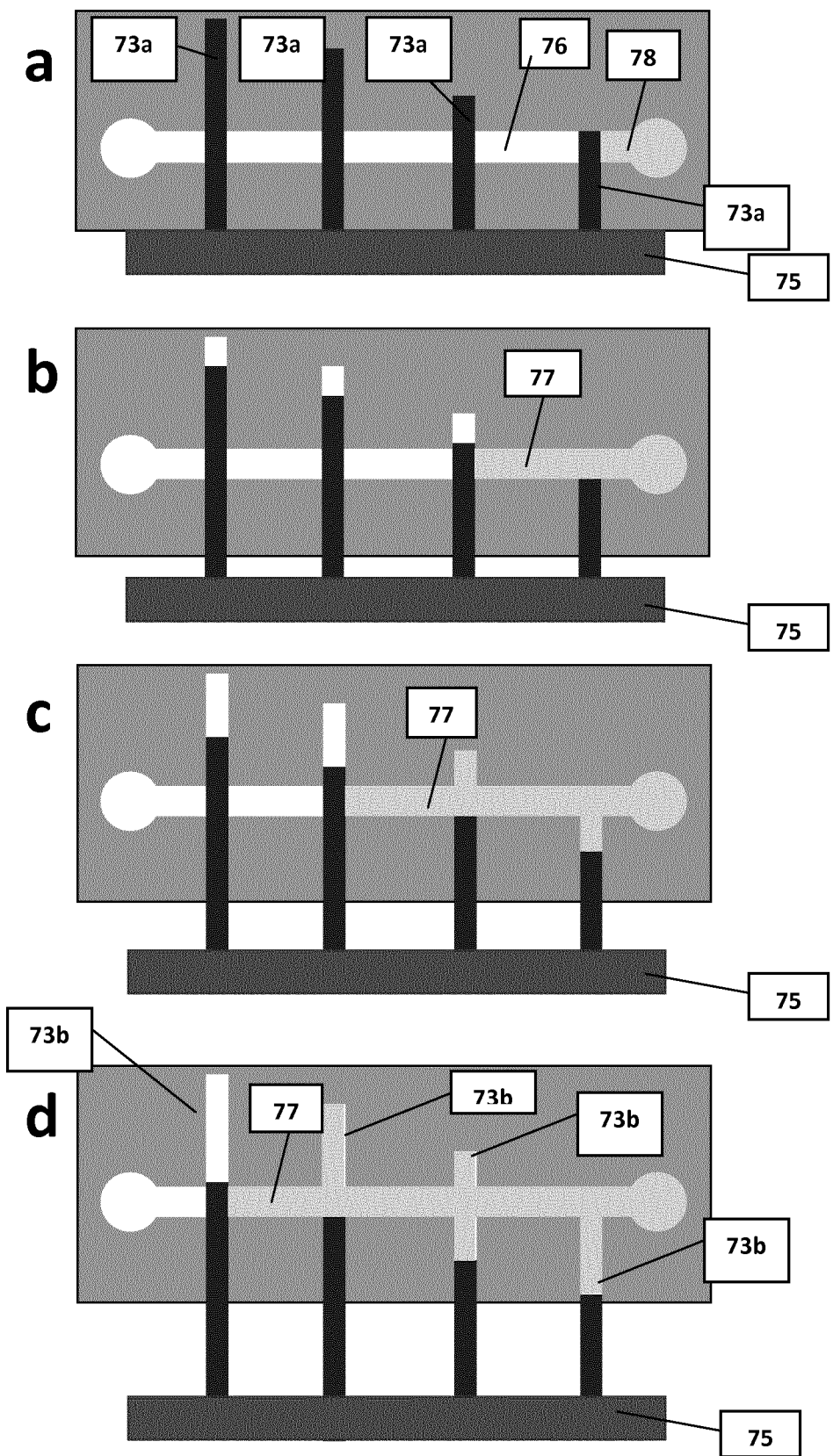

FIG. 15 provides a schematic illustration of an example of a multiple valve for sequential filling of a channel, constituted using 4 movable fibers of the invention, connected together.

Figure 16:
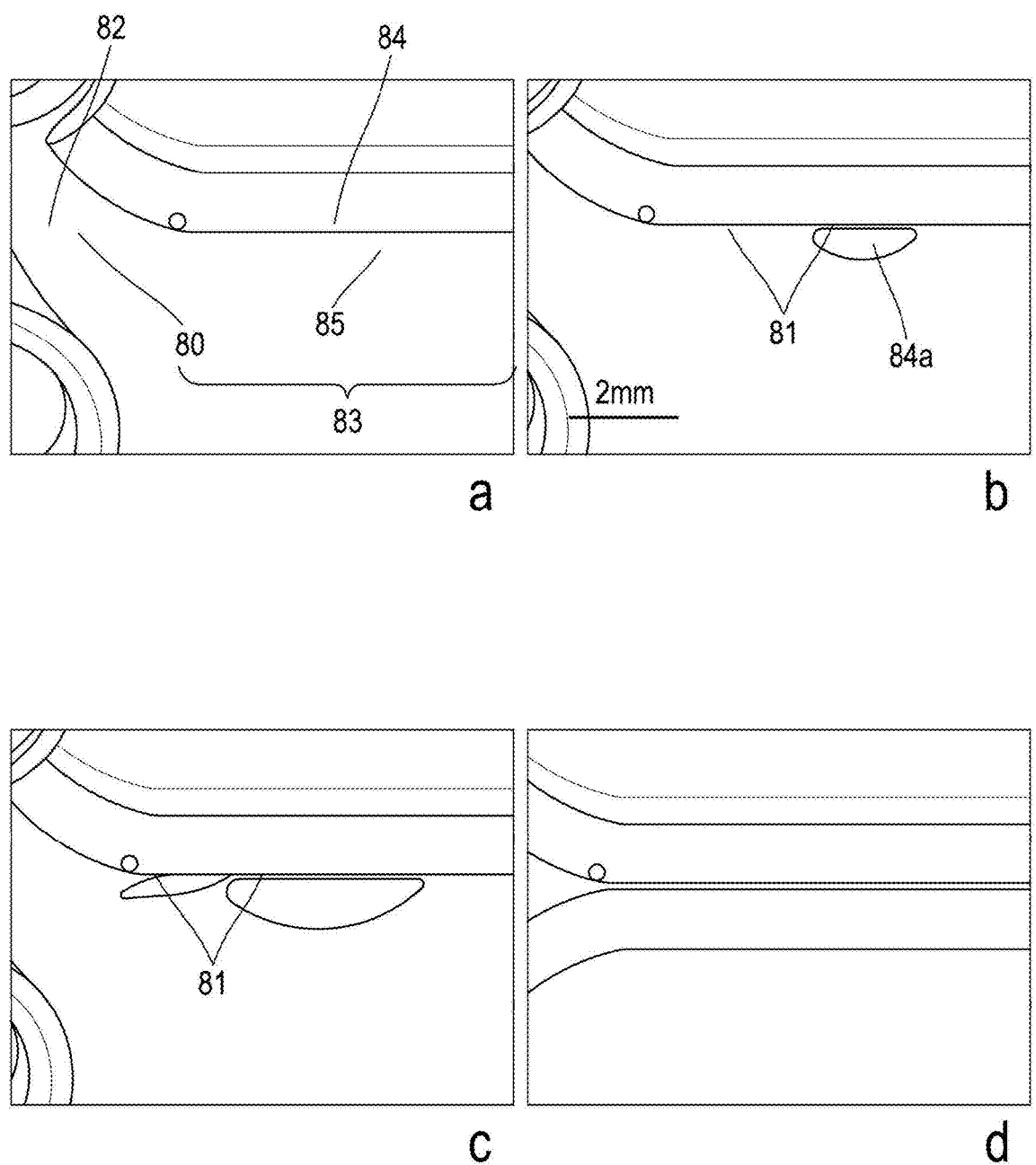

FIG. 16 shows the use of a movable fiber with a flattened part, as a valve allowing opening and closing of transport of species and fluids between two parts of a chamber.

Figure 17:
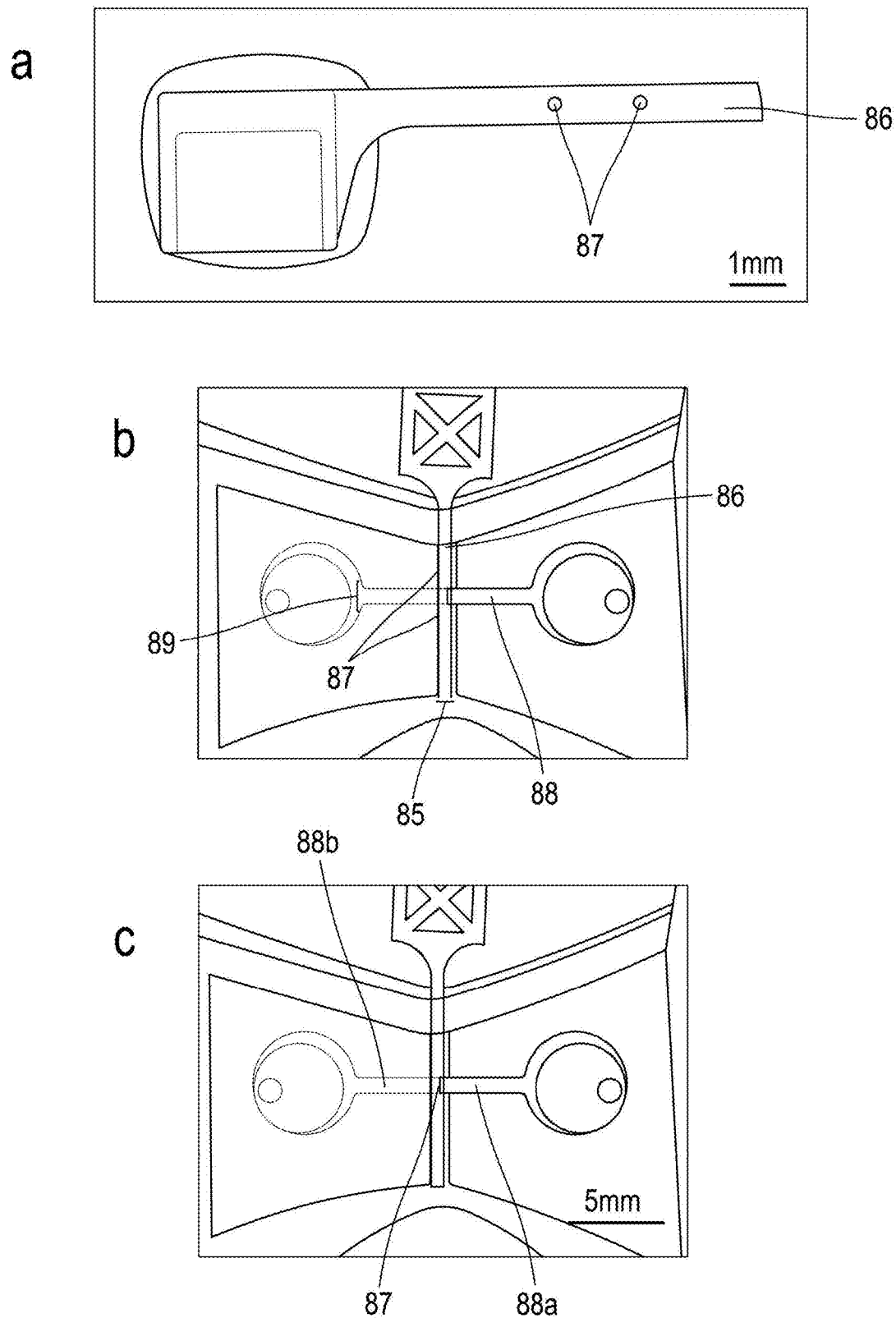
Figure 18:
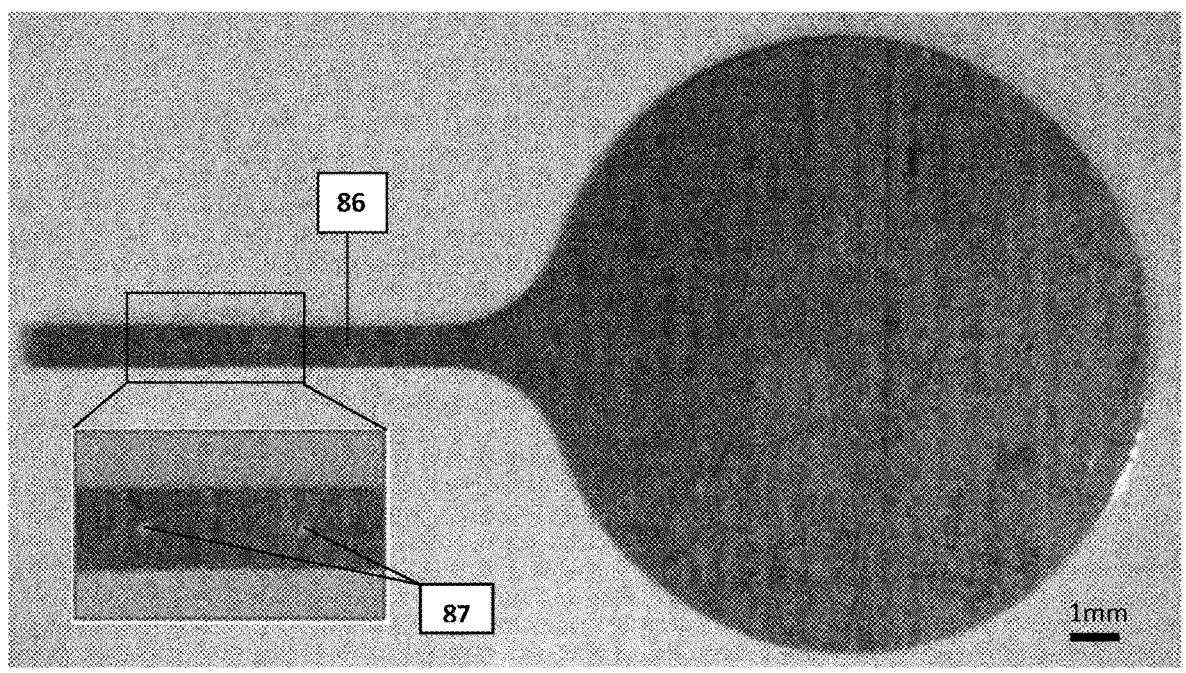
Figure 19:
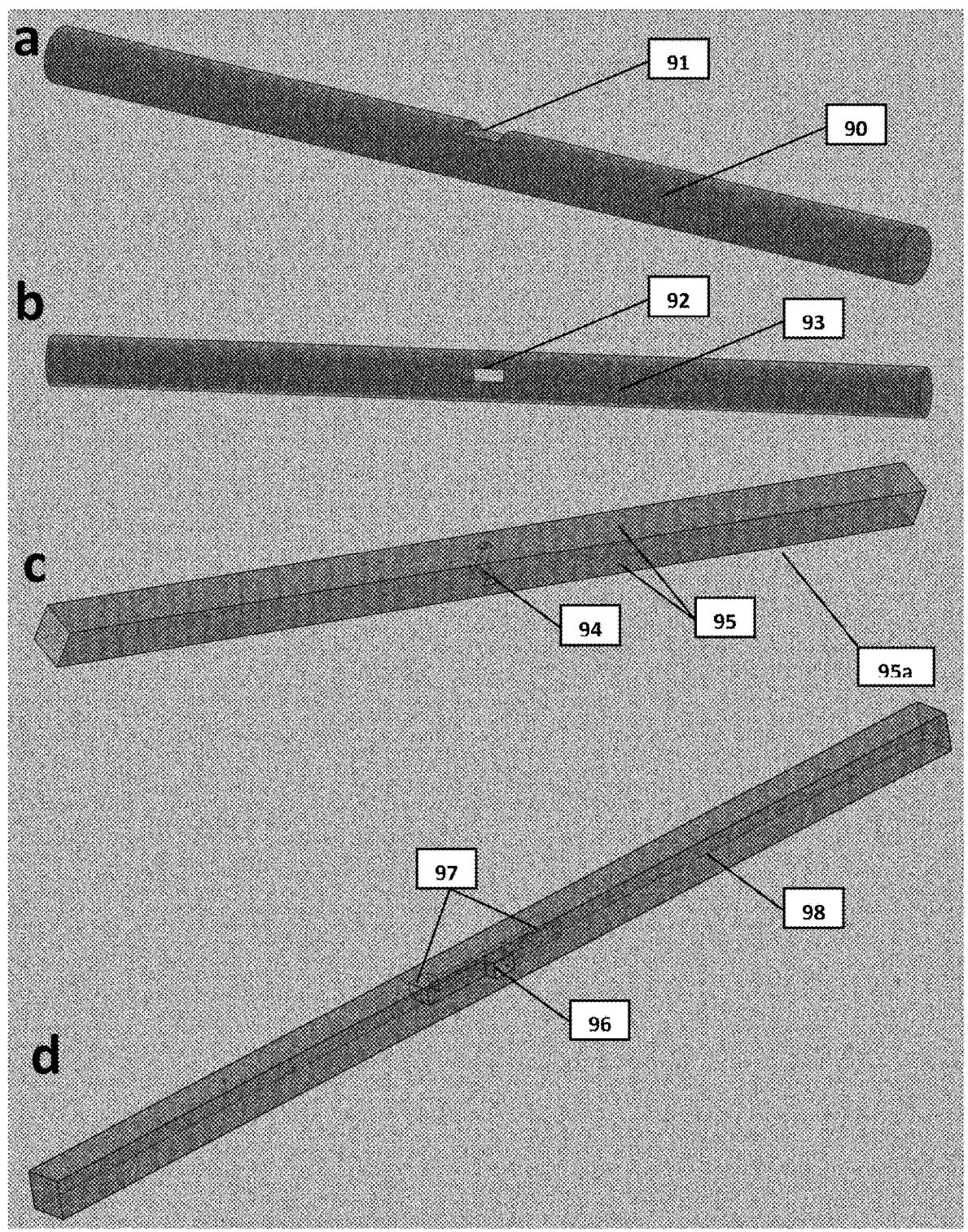

FIG. 17 provides examples of via usable along movable fibers of the invention with two via in the shape of through-holes, and their use to connect two parts of a channel FIG. 18 presents example of another movable fiber with via, prepared by micromilling FIG. 19 presents a few exemplary embodiments of movable fibers, with via of different shapes.

Figure 20:
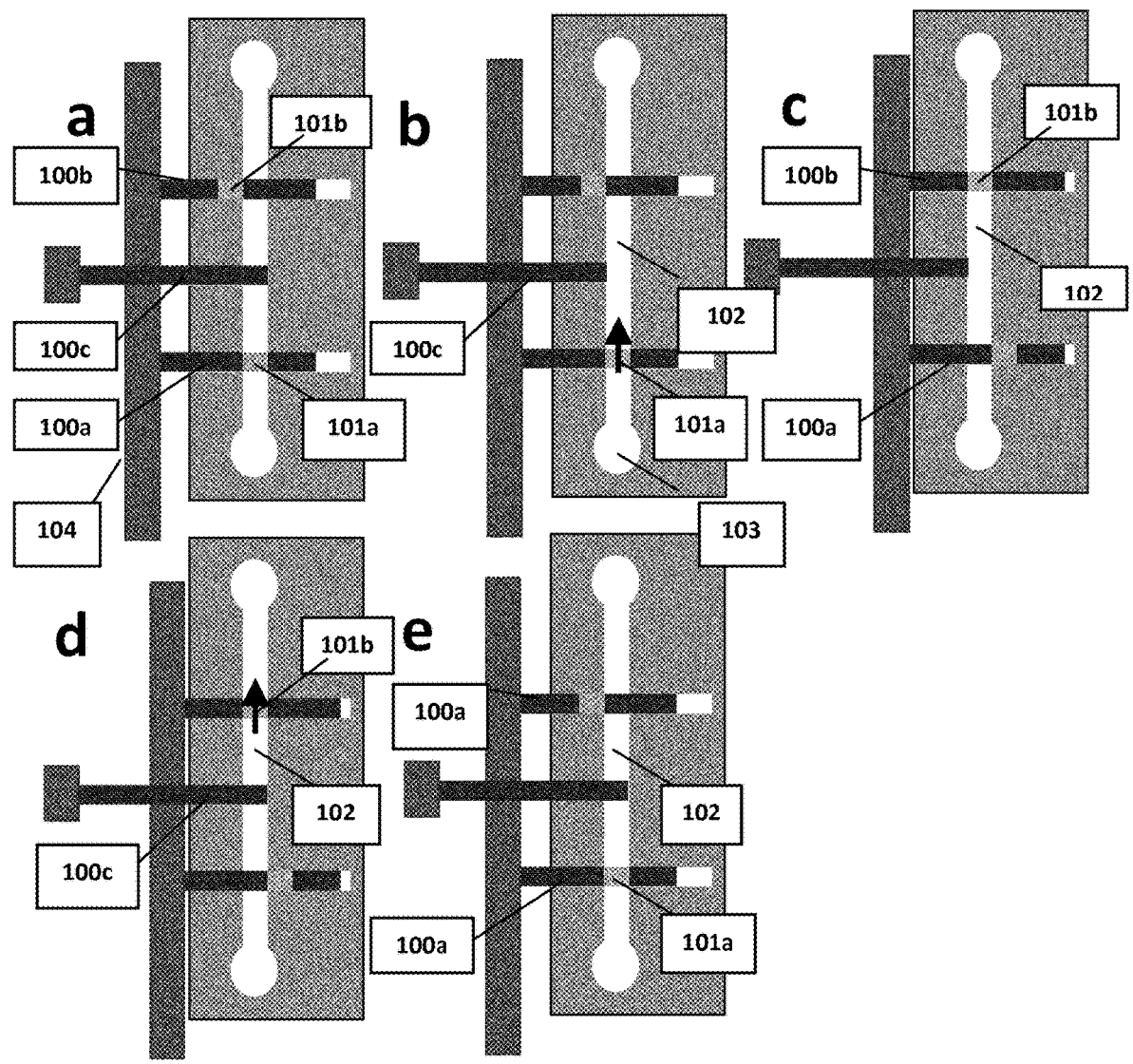

FIG. 20 presents the schematic operation of a device of the invention comprising an integrated pump based on three movable fibers, two of which are connected together, and the third actuated synchronously with the first two.

Figure 21:
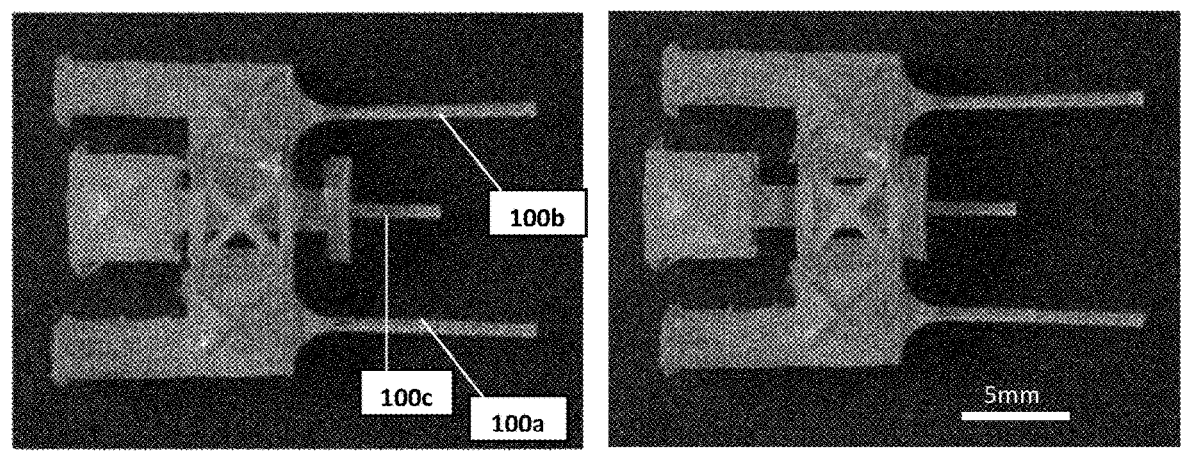
Figure 22:
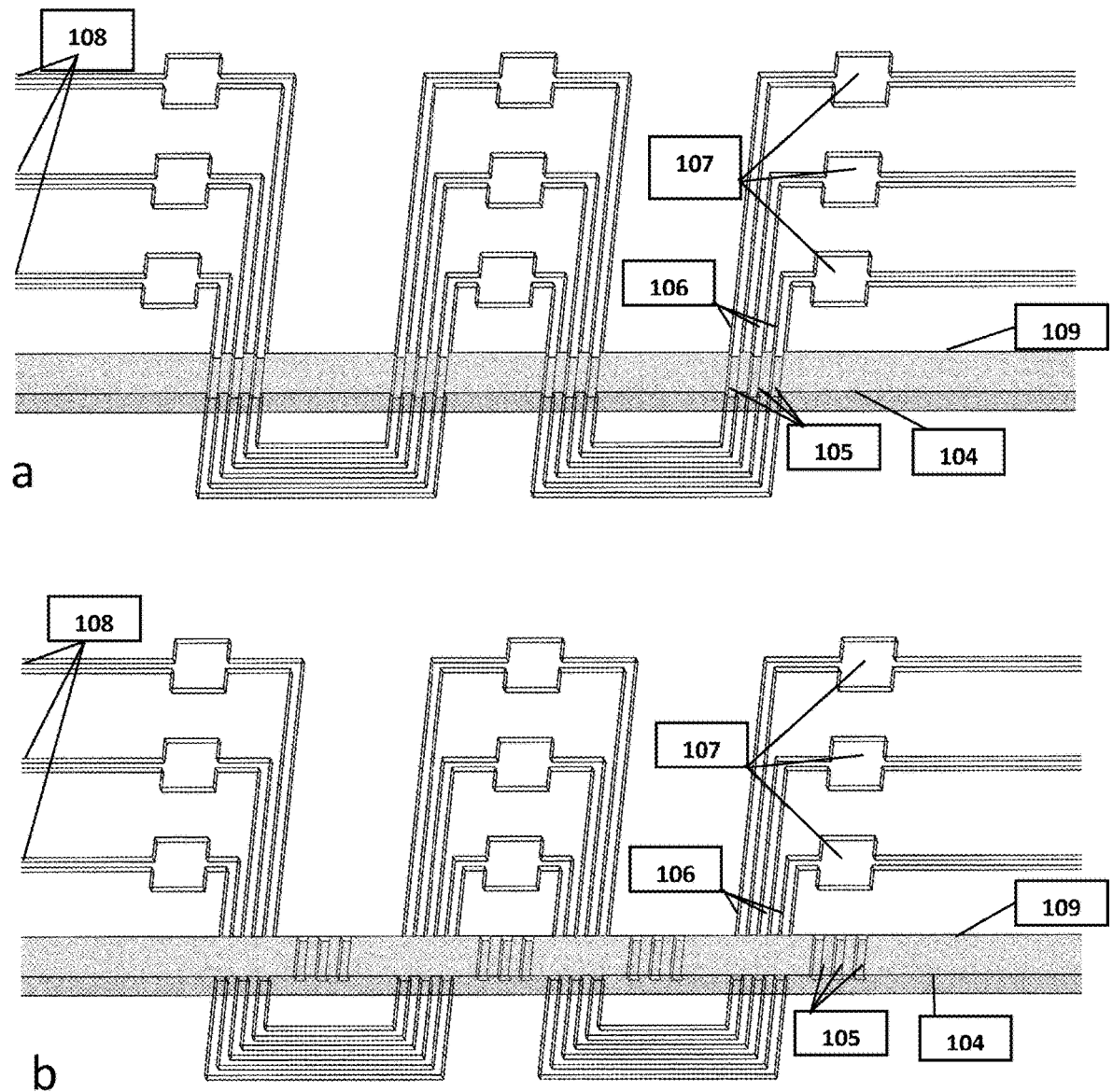

FIG. 21 presents embodiments of movable fibers used to operate the device presented in FIG. 20, prepared by 3D printing FIG. 22 presents a schematics of a microfluidic network or instrument according to the invention and the schematic operation this device.

In the figures, a same object is designated with a same reference on distinct figures.

EXPERIMENTAL PART

Example 1

Figure 1:
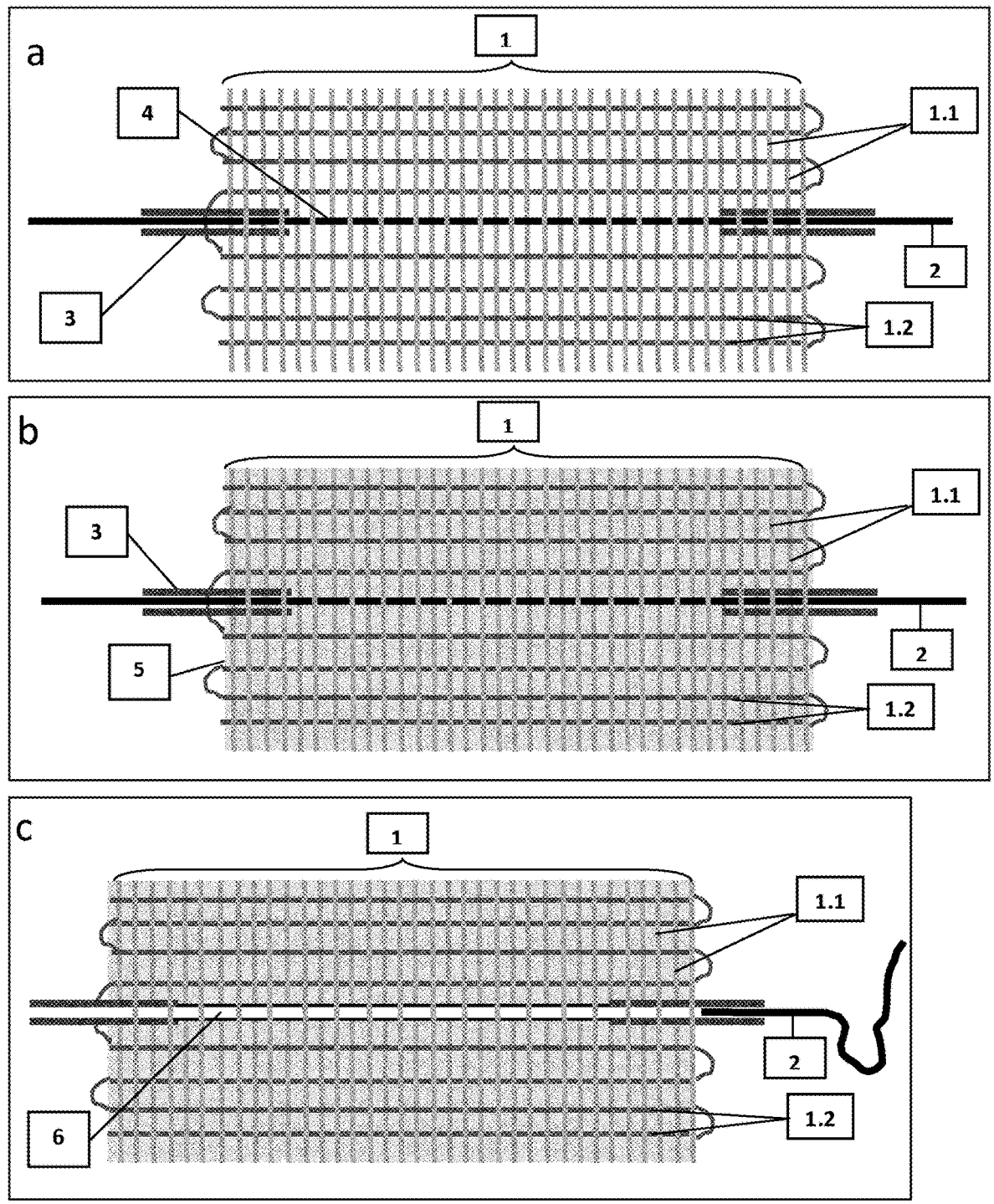
FIG. 1 shows a schematic fabrication protocol for a microfluidic chip with a single straight microchannel, taking advantage of support fibers embedded in the matrix.

The first example, shown in FIG. 1, illustrates one of the fabrication methods employed to create a component or chip of the invention, using a textile support [1], and containing one single straight guiding duct [4] comprising a movable fiber [2], and the motion of said movable fiber. First, a fabric [1], made with support fibers [1.1] is halfway woven with a loom (Ashford, NZ). Apart from the looming, a movable fiber [2] is inserted into two short silicone tubings [3], which serve as external ports in the resulting chip. Together with the tubings [3], the movable fiber [2] is then added at the end of the half woven fabric along the weft support fiber [1.2] by replacing one passage of the weft fiber, and the other half of the fabric is continued to be woven as shown in FIG. 1a.

After completion of the weaving the fabric [1] is detached from the loom and immerged into a matrix precursor material [5]. The matrix precursor material wicks the support fibers [1.1, 1.2] prior to be hardened and its spatial extension is limited to the fabric [1], as shown in FIG. 1b.

The movable fiber [2] can then be moved within the matrix [5] and the embedded fabric [1], as shown in the FIG. 1c. In FIG. 1c, the guiding duct [6] defined after removal of the movable fiber [2] remains empty.

Example 2: Use of the Invention as an Integrated Pump

Figure 2:
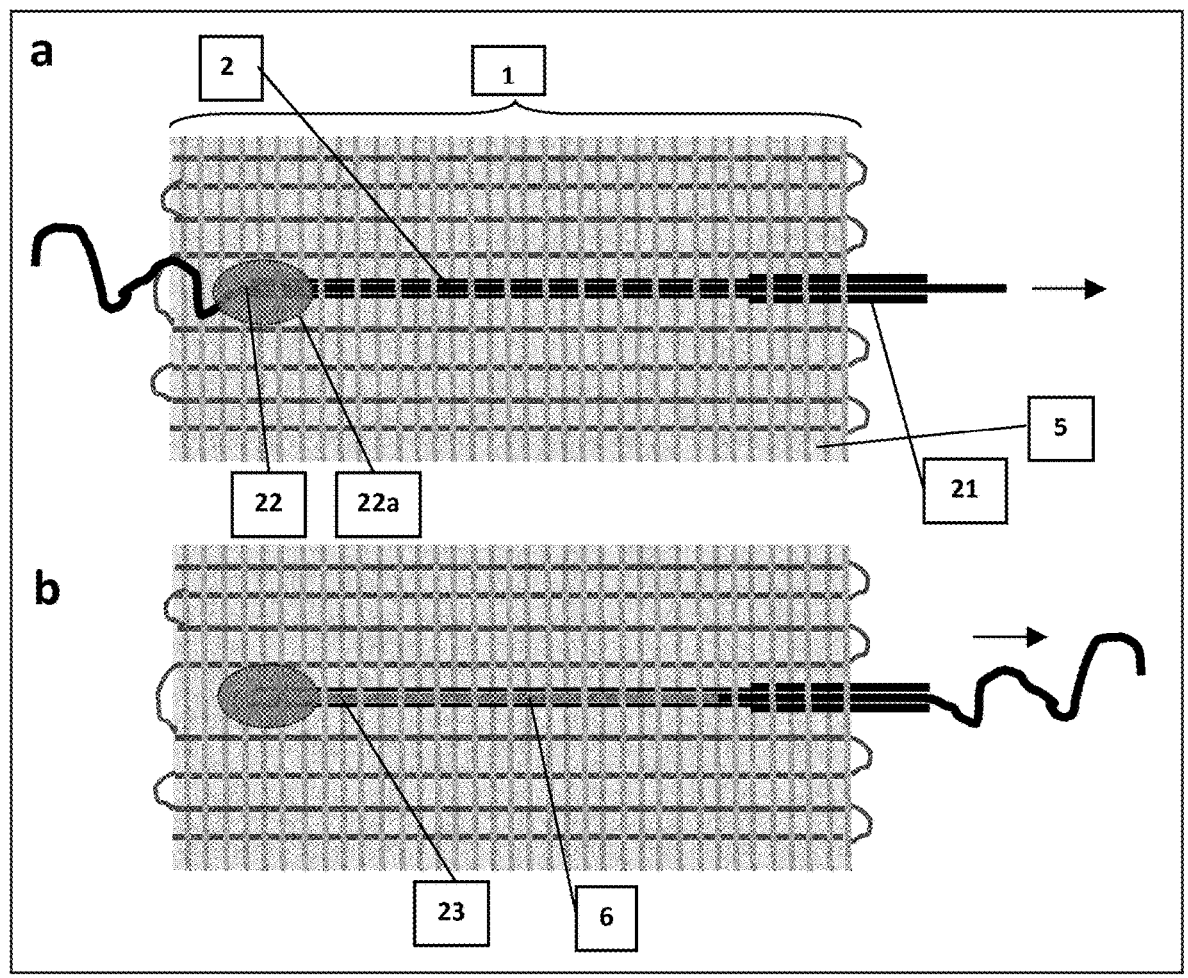
FIG. 2 shows a schematic illustration of the use of a chip of the invention as an integrated pump.

The device of FIG. 2 is prepared the same way as for example 1, except for two features:

First, only one end of the movable fiber [2] is inserted into a silicone tubing [21]. The other end is partially inserted into the shed during the picking, and is thus protruding from the surface of the textile [1]. After the matrix [5] hardening, the movable fiber [2] protrudes from the matrix [5]. A drop of colored water [22a] is put on the fabric, at the place [22] where the movable fiber [2] exits the fabric, and this place defines a fluid drop area [22]. Then, the movable fiber [2] is pulled and partly removed, which makes the liquid enter into the guiding duct [23], i.e. a space created by the fiber [2], like a microsyringe would (see FIG. 2b).

For this example, the support fibers of the textile [1] are white cotton threads (n° 7, Phildar, FR). The movable fiber [2] is a fluorocarbon monofilament fishing line (Varivas Super Tippet, 3X, Morris Co, JP) with a 200 μm diameter. The matrix [5] used is a 10:1 (weight par weight) mix of polydimethylsiloxane (PDMS) base and its curing agent (Sylgard 184, Dow Corning, USA). The fabric [1] is immerged into a fresh mix of the base and the curing agent, then put under a vacuum belt for 1 hour, and then suspended in an oven at 65° C. for 5 h.

Example 3

Figure 3:
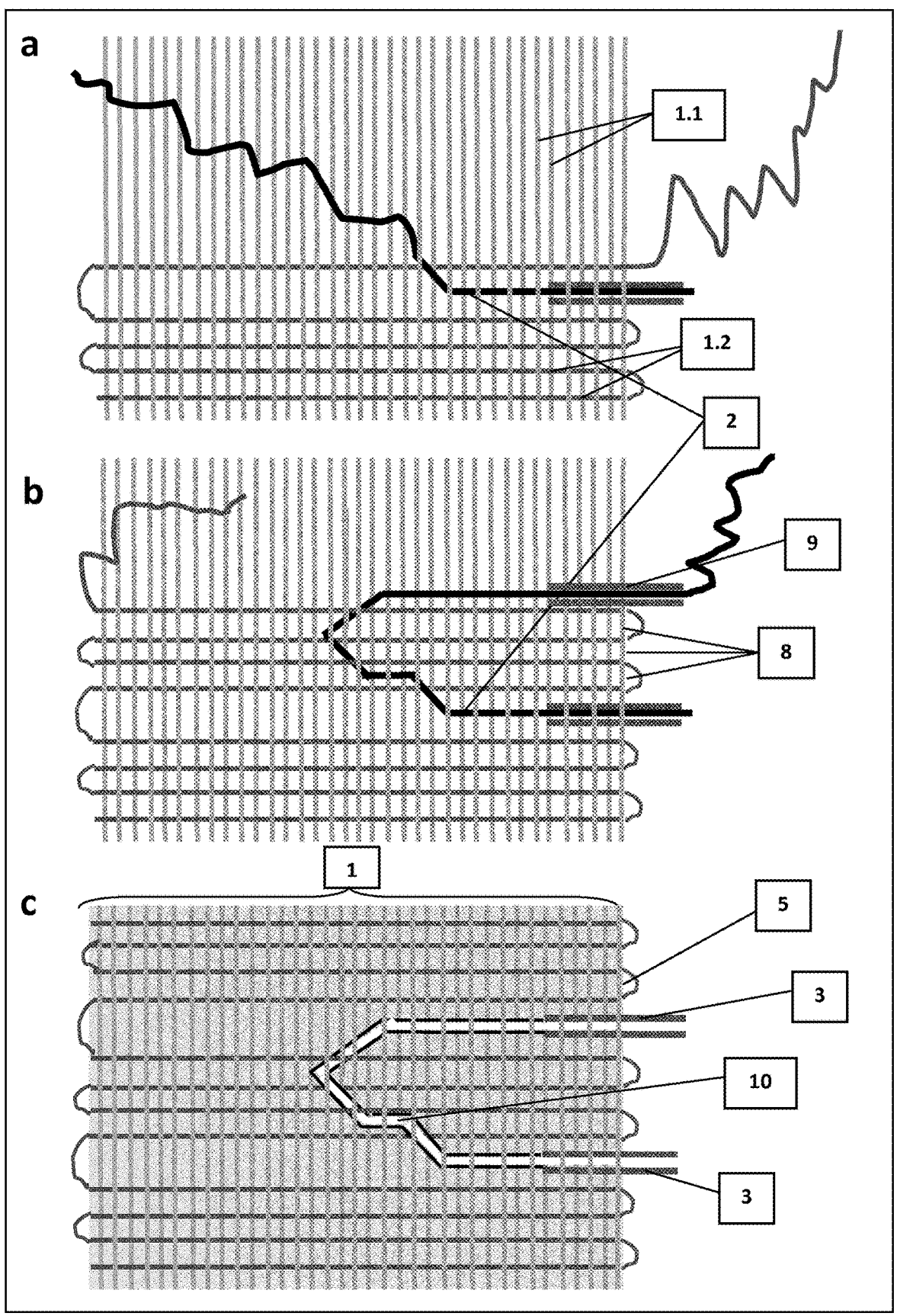
FIG. 3 shows a schematic illustration of a chip of the invention with a nonlinear guiding duct, and a method to prepare it.

The third example of the invention illustrates the possibility to create a guiding duct with a tortuous design, as shown in FIG. 3. The fabrication process remains identical to the one described in the first example, except that entangling of the movable fiber [2] with the support fibers [1.1] and [1.2] is performed in two steps. During the picking, the movable fiber [2] doesn't go through the entire shed as shown in FIG. 3a. FIG. 3b shows that the movable [2] fiber is partially reintroduced into the next sheds [8], until it reaches one extremity of the fabric [9]. Of course this process can be performed manually, or in an automated manner, using machines of the textile industry such as Jacquard loom. After impregnation with a matrix precursor material [5], matrix solidification and retrieval of the movable fiber [2], the guiding duct [10] has a path that folds back by 180°, as shown in FIG. 3c. Two ports [3] are located at the extremities of the guiding duct [10], parallel to an axis of the fabric [1]. The ports [3] are constituted of silicon tubings coaxial with the extremities of the guiding duct [10].

Example 4

Figure 4:
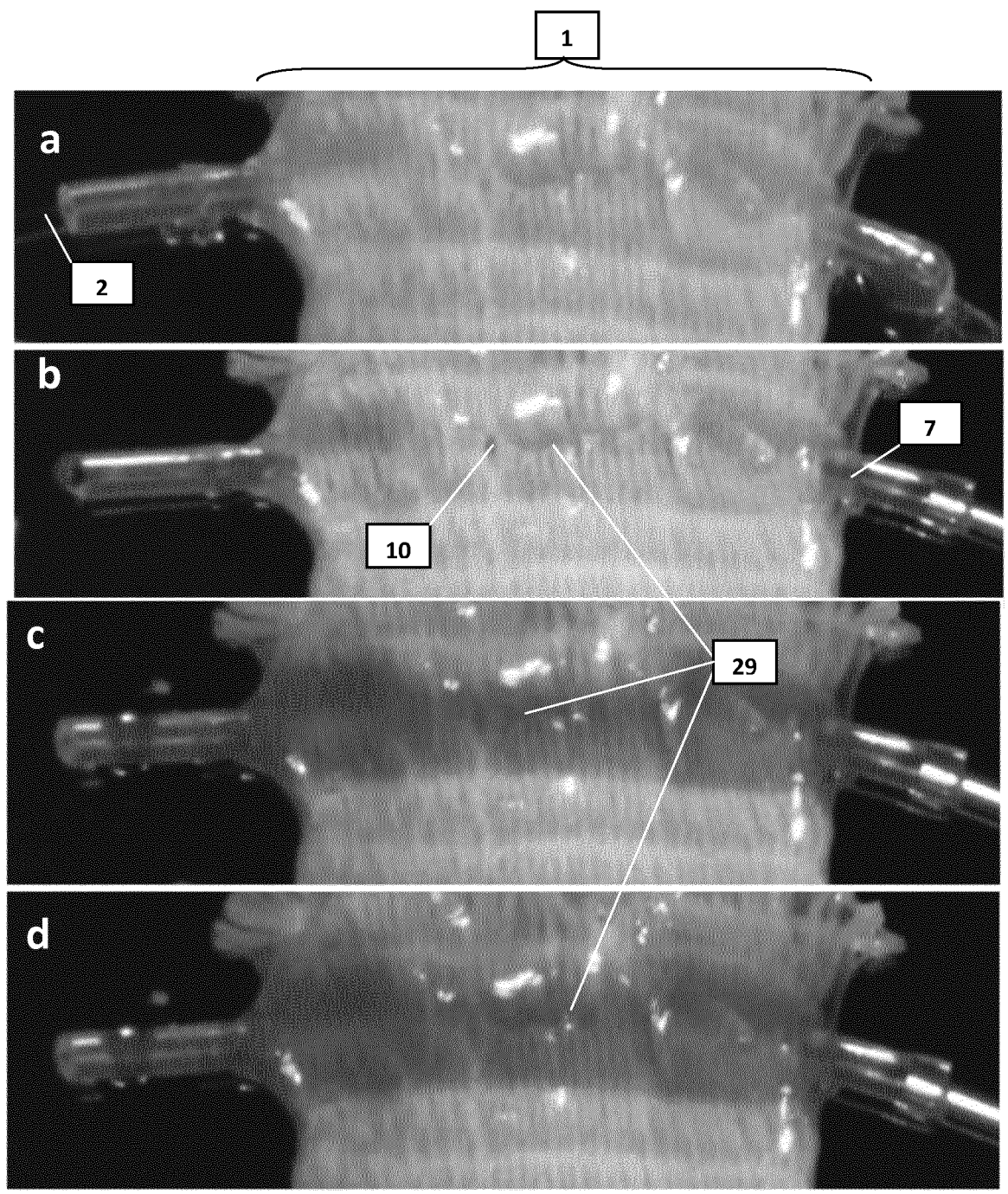
FIG. 4 shows four time-lapse pictures of the same microfluidic chips made with a matrix made of a hydrogel and naturally sourced material: agarose.

Example 4 illustrates the ability to use a hydrogel as matrix. For this example, the matrix is made of a 4% agarose gel, as shown in FIG. 4a. A mix of 2 g of agarose (UltraPure Agarose, Invitrogen) and 50 ml of water is heated until the agarose is dissolved. The fabric [1] described in Example 1, with a movable fiber [2] interwoven in it, is immerged rapidly into the agarose solution until the solution wicks through the fabric [1], and left at room temperature for 20 minutes to gelify the agarose. The movable fiber [2] is then removed, in order to create a guiding duct [10].

When a drop of colored water [7] is introduced in the microchannel by a micropipette tip connected to a micropipette, the solution follows first the microchannel [29] as shown in FIG. 4b. After some time, the solution diffuses slowly into the hydrogel matrix as shown in FIG. 4b-d. These three pictures are taken with an interval of 5 minutes between each other.

Example 5

Example 5—Part a

Figure 5:
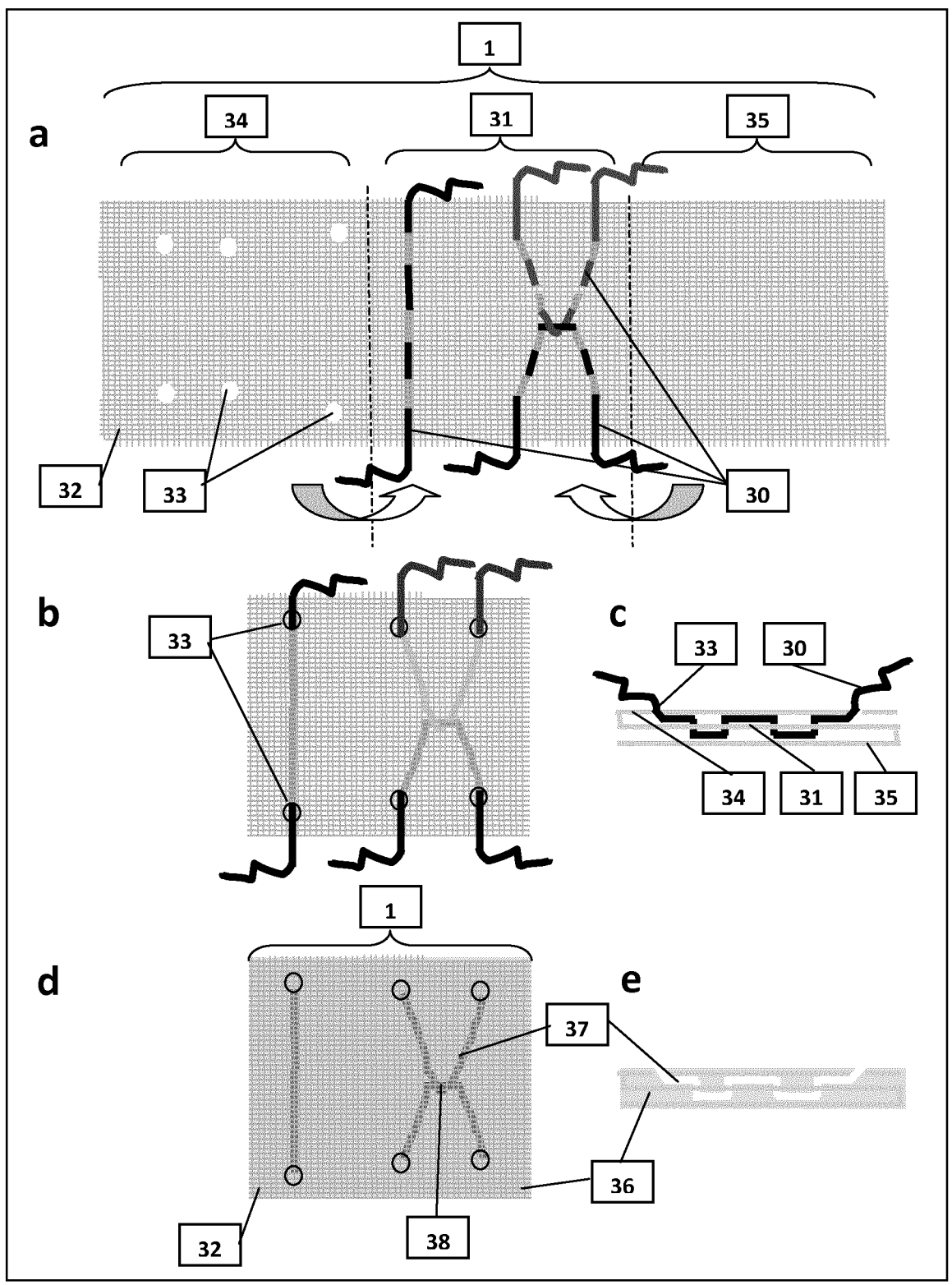
FIG. 5 shows another schematic fabrication protocol for a microfluidic device of the invention with non-linear guiding duct.

First, movable fibers [30] are sewn into the central part [31] of a fabric [1] made with support fibers [32]. Holes [33] are punched in an adjacent part [34] of the fabric [1], as seen in FIG. 5 a. This part is then folded above the central part [31] of the fabric [1] and the ends of the movable fibers [30] are passed through the holes [33]. The last third of the fabric [35] is folded under the central part [31] as shown in the FIGS. 5 b and 5 c.

The fabric is then immersed into a matrix precursor material [36]. The matrix precursor material [36] wicks the support fibers [32] and its spatial extension is limited to the fabric [1]. The matrix precursor material [36] is hardened to a solid in a known manner.

To obtain a microchannel network [37] inside the matrix-impregnated fabric, the movable fibers [30] are retrieved from the fabric [1] as shown in FIGS. 5 d and 5 e.

An embodiment of the microfluidic chip was made with this protocol. For this example, the fabric used [1] is a microfiber sheet. The movable fiber [30] is a fluorocarbon monofilament fishing line (Varivas Super Tippet, 3X, Morris Co, JP) with a 200 μm diameter. The matrix precursor material used [36] is a 10:1 mix of polydimethylsiloxane (PDMS) base and curing reagent (Sylgard 184, Dow Corning, USA). The fabric [1] is immersed into a fresh mix of base and curing reagent, then put under a vacuum belt for 1 hour, and then suspended in an oven at 65° C. for 5 h. The microchannels created [37] are easily filled with a fluid by following the protocol of example 5 and the two crossing microchannel [37] and [38] which can acting as guiding ducts are connected together.

Example 5—Part B

Figure 6:
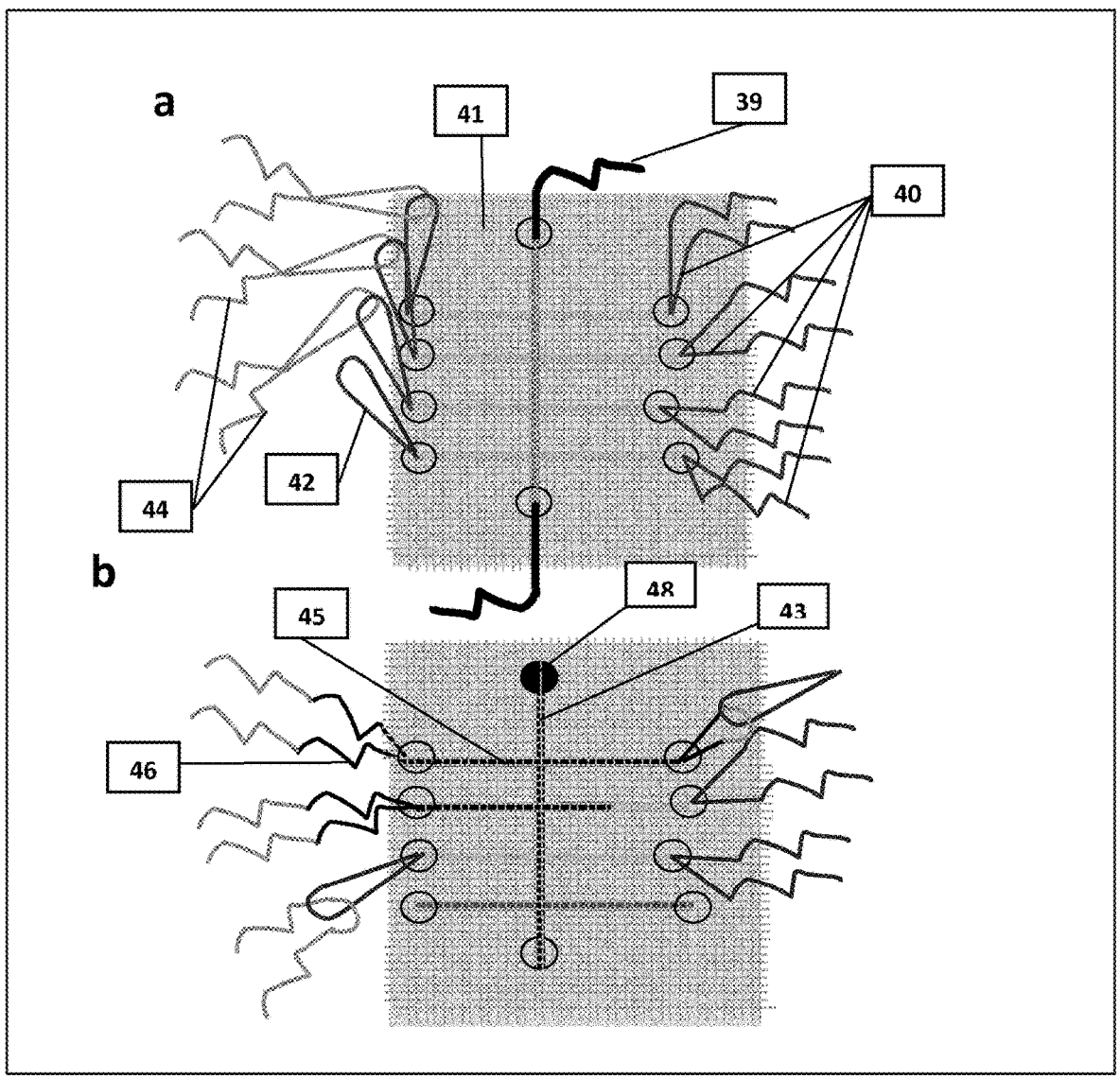
FIG. 6 shows a schematics of the fabrication of a microfluidic chip of the invention using a "hybrid" structure comprising microchannels partly open and partly filled with a wicking material.

This example, depicted in FIG. 6, illustrates embodiments of the invention comprising partly open flow paths, comprising microchannel arrays in part fluidically open, and in part filled with a porous material, defining a wicking flow path. This also illustrates the possibility to use capillary wicking as a driving force within devices of the invention. For this example, we use a sewn chip described in Example 5A. This microfluidic chip contains a first movable fiber [39], here a nylon fishing line with a diameter of 200 μm, and four movable fibers [40], here nylon fishing lines with a diameter of 100 μm. Each of the latter movable fibers [40] is embedded twice in the microfiber sheet [41] making a loop [42] on one side of the chip, as shown in FIG. 6a.

After embedment of the microfluidic chip with a matrix precursor material, here a PDMS matrix, and hardening of the matrix, the first movable fiber [39] is removed from the microfluidic chip, and colored water is introduced in the created channel [43], for instance by following the protocol presented in example 5, or thanks to an external pumping means. Four polyester threads [44] (Gütermann, 110 yds/vgs), which have wicking properties for water and aqueous solutions, are then passed in the loops of the 4 nylon fishing lines [42]. Pulling on these nylon fishing lines [42] allow the polyester thread to enter inside the channels [45] created by the removal of the 100 μm nylon fishing lines. These channels [45] thus play the role of guiding ducts for the fishing lines [42] and the polyester threads [44] (FIG. 6).

Figure 7:
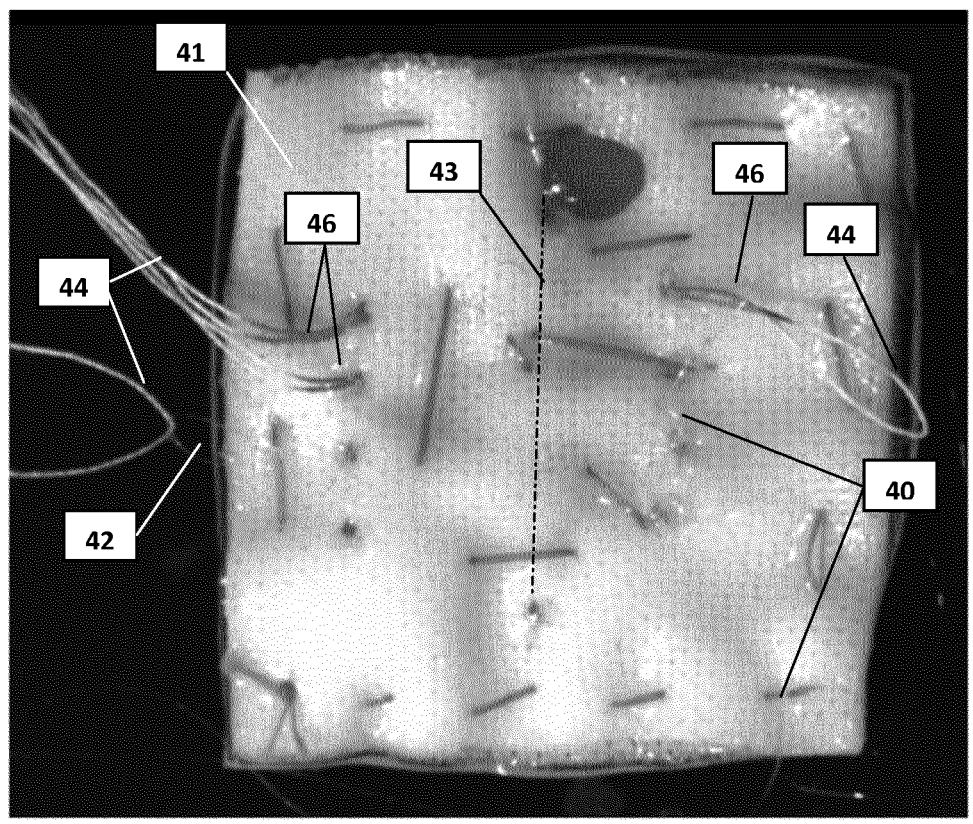
FIG. 7 is a picture that shows a particular realization of an embodiment structure comprising microchannels partly open and partly filled with a wicking material.

FIG. 7 shows the operation of an embodiment prepared by this method. The PDMS embedded textile [41] supports the device. Colored water [48] is introduced in channel [43], thanks to the "pumping" effect previously explained in example 5. When the liquid contacts the polyester threads [44], it is wicked by capillary effect, and is transported by wicking along said threads [44], until it can be seen as a darker zone on the threads protruding from the chip, at location [46] on FIG. 17.

Example 6

This example describes a microfluidic chip of the invention prepared without support fibers or textile. The first embodiment of the invention is shown in FIGS. 8 and 9 in which a movable fiber is used in order to separate a microchamber into two compartments.

Figure 8:
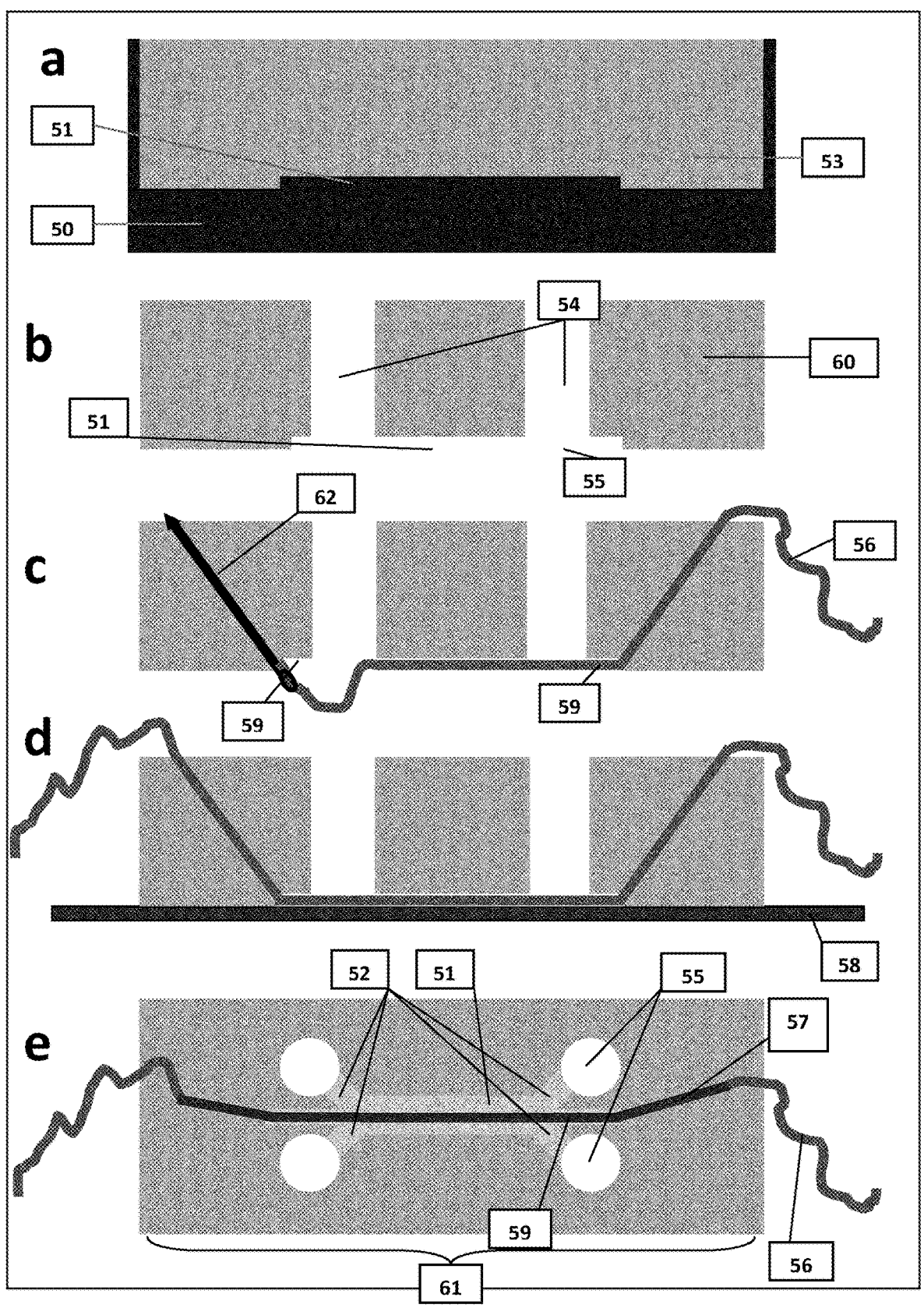
FIG. 8 shows a schematic fabrication protocol for the microchip with one movable fiber combined with a microchannel prepared by microlithography.
Figure 9:
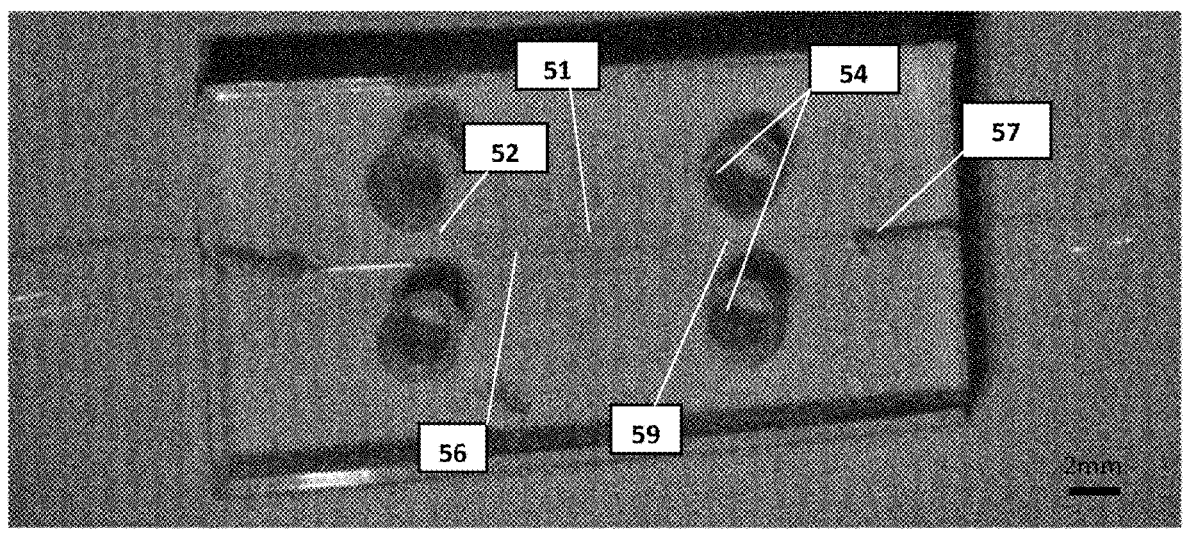
FIG. 9 shows a picture of a microchip resulting from the protocol schematized in the FIG. 8.

FIG. 8 shows the fabrication process employed to create such a microfluidic chip. Firstly, a pattern comprising a 2 mm-wide microchamber [51], two loading channels [52] connecting said chamber with loading ports [55], and two 70 μm-wide guiding ducts [59] is micromachined with a height of 80 μm on a brass plate [50] by micromilling, and used as a mold [50]. A mixture of PDMS and its curing agent at the ratio of 10:1 (w/w) [53] is degassed, poured on the brass mold [50], and reticulated at 65° C. for 4 hours (FIG. 8*a*). After being hardened, the PDMS block [60] is demolded and four inlets [54] are punched in it (FIG. 8*b*).

A movable fiber [56] made of fluorocarbon with a diameter of 86 μm is inserted in the middle of the microchamber [51] along the two guiding ducts [59] on the obtained PDMS block, and further embedded in the block by using a needle [62], with its extremities piercing out from the block [57] (FIG. 8*c*). The PDMS block [60] is then bonded to a substrate [58], either a bare glass slide or a PDMS-coated glass slide, with the microchannel side down, by using oxygen plasma (FIG. 8*d*). FIG. 8*e* schematizes the top view of the final microfluidic chip [61], whereas FIG. 9 shows a picture of a real microfluidic chip.

Example 7

This example shows an application of the embodiment described in example 6. Here, the microfluidic chip is used to position neuronal cell bodies [13] on one side of the microchamber [11], and to guide axons into the other side, by using a micro-patterned substrate.

Figure 10:
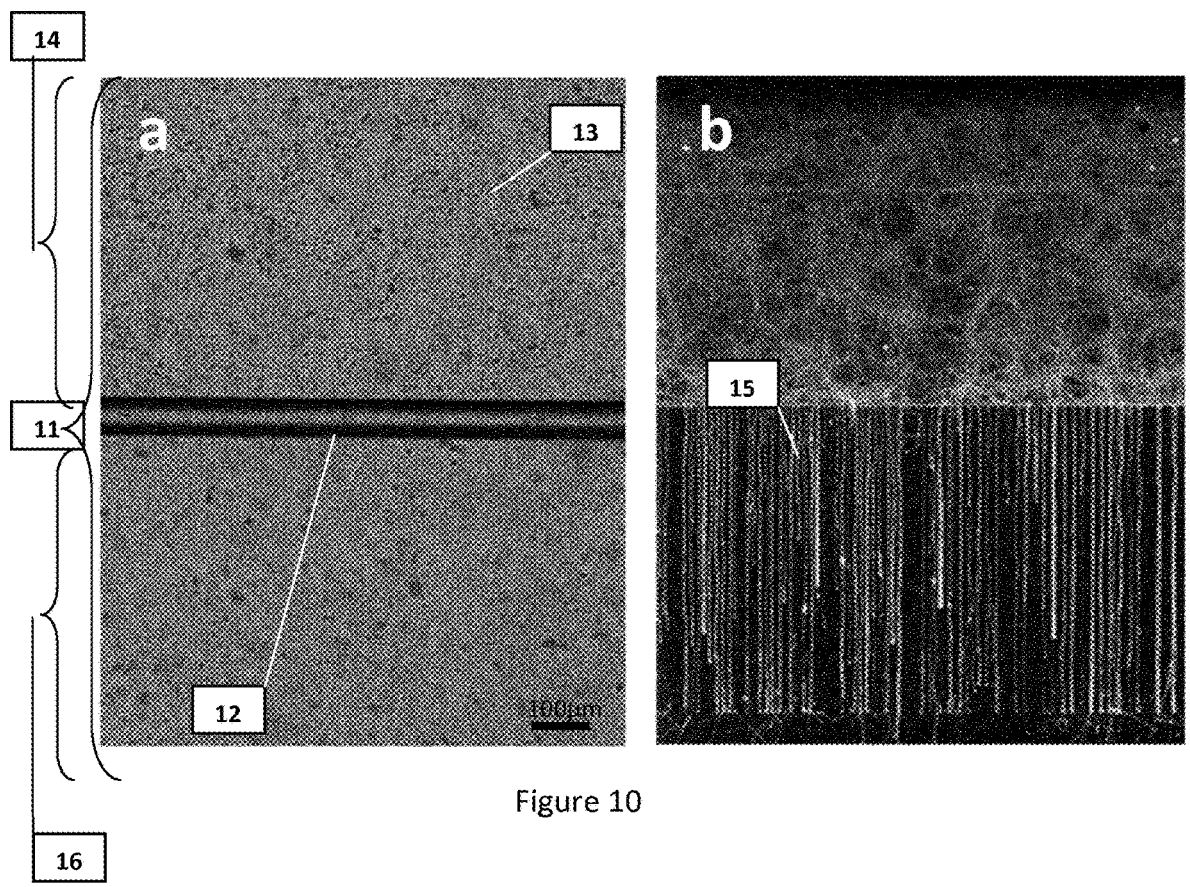
FIG. 10 shows two pictures of a first application of this microchip.

After completing a microfluidic chip as described in Example 6 (FIG. 9), one side [14] of the whole microchamber [11] divided into two by the movable fiber [12], is filled with a culture medium containing neuronal cells [13], whereas the other side [16] is filled with a medium without cells (FIG. 10*a*). This filling is performed thanks to the inlet (reference [57] on FIG. 9) on each side. As shown in FIG. 10*a*, the neuronal cells are positioned and attached on one side of the guiding duct. The movable fiber [12] is then removed from the guiding duct by pulling from one of its extremities. After 6 days of cell culture at 37° C. with 5% $CO_2$, axons [15] are successfully guided toward the other side of the channel [16] by a micro-pattern on the bottom substrate. FIG. 10*b* shows the immunofluorescence image of tau protein, which is abundant in axons. Note that all the cell bodies remain in the original side of the microchamber [14] (FIG. 10*b*).

Example 8

This example shows another technical solution to compartmentalize a microchannel, using another type of moving fiber.

Figure 11:
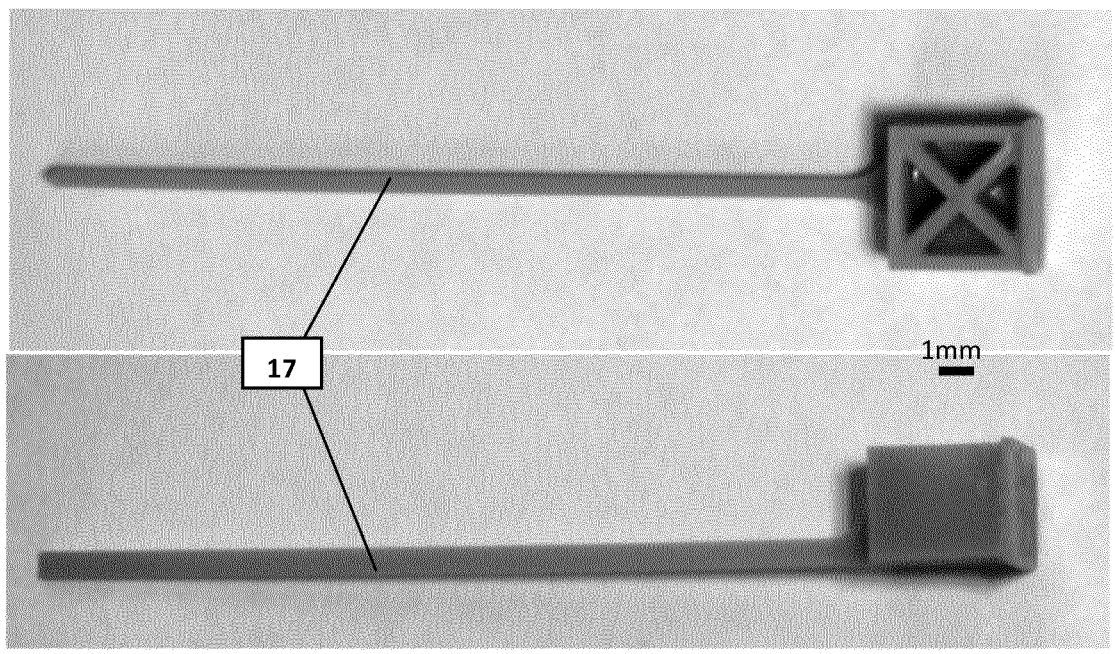
FIG. 11 shows a picture of a movable fiber prepared by 3-D printing.
Figure 12:
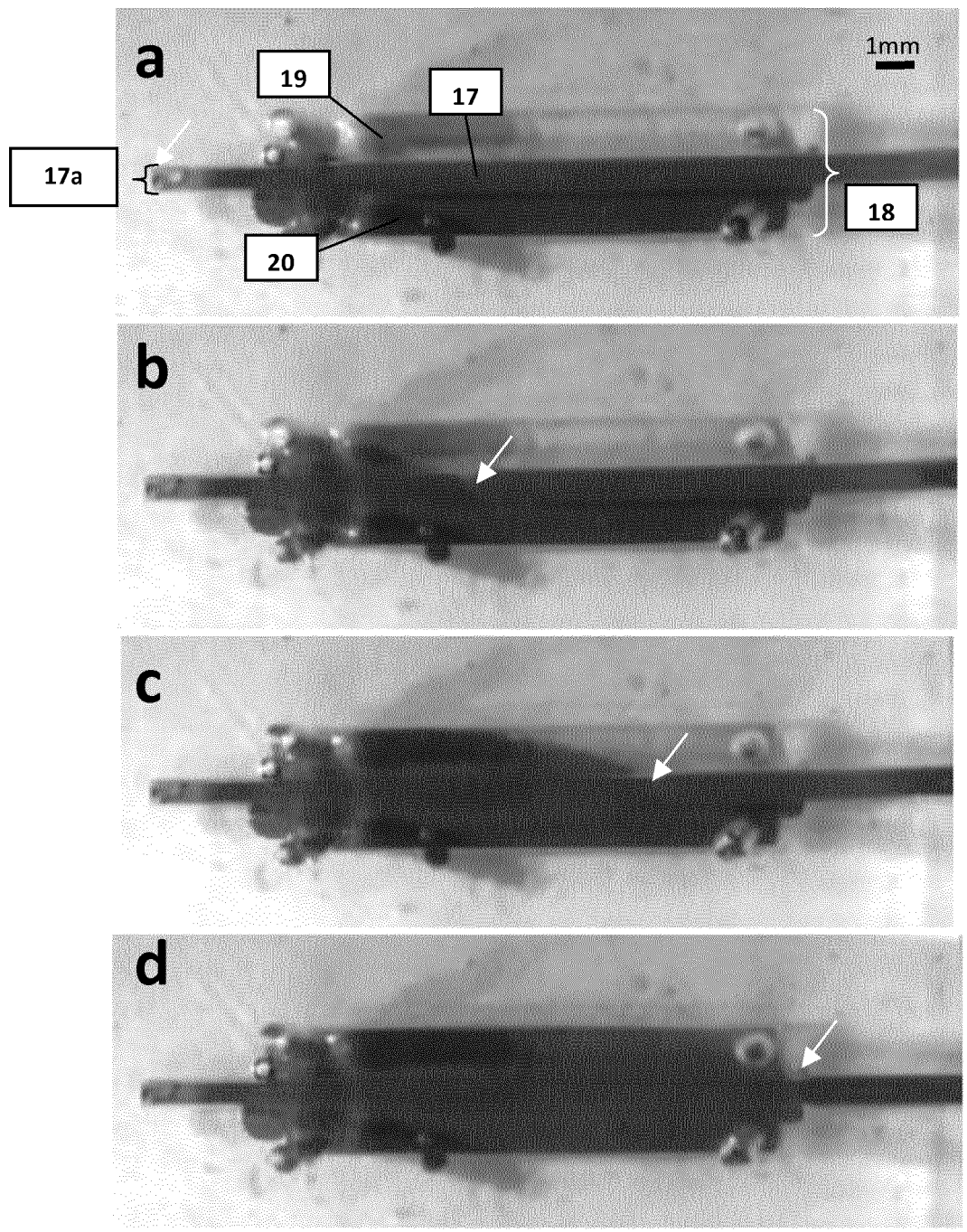
FIG. 12 shows four pictures illustrating an example for operation of a device of the invention, with a movable fiber as described in FIG. 10.

Instead of using a conventional fiber, the movable fiber here is a thin bar of plastic [17], as shown in FIG. 11. In this embodiment, the fiber [17] was prepared by 3D printing, but any other fabrication means known in the art could be suitable, such as molding, casting, micromachining, lithography, and the like. FIG. 12 *a, b, c, d* show the top view of a microchamber [18] with the 3D-printed bar [17] inserted in the channel along a guiding duct [17*a*] made of Poly-DiMethyl Siloxane, an elastomeric elastic material. On FIG. 12*a*, the movable fiber compartmentalizes the microchamber. One side [19] is filled with water, whereas the other side [20] is filled with orange ink. FIG. 12 *b, c* and *d* illustrate the removal of the movable fiber and the diffusion of the ink into the upper part [19]. For visibility, on FIG. 12, the end of the movable fiber [17] is indicated by white arrows.

Example 9

Figure 13:
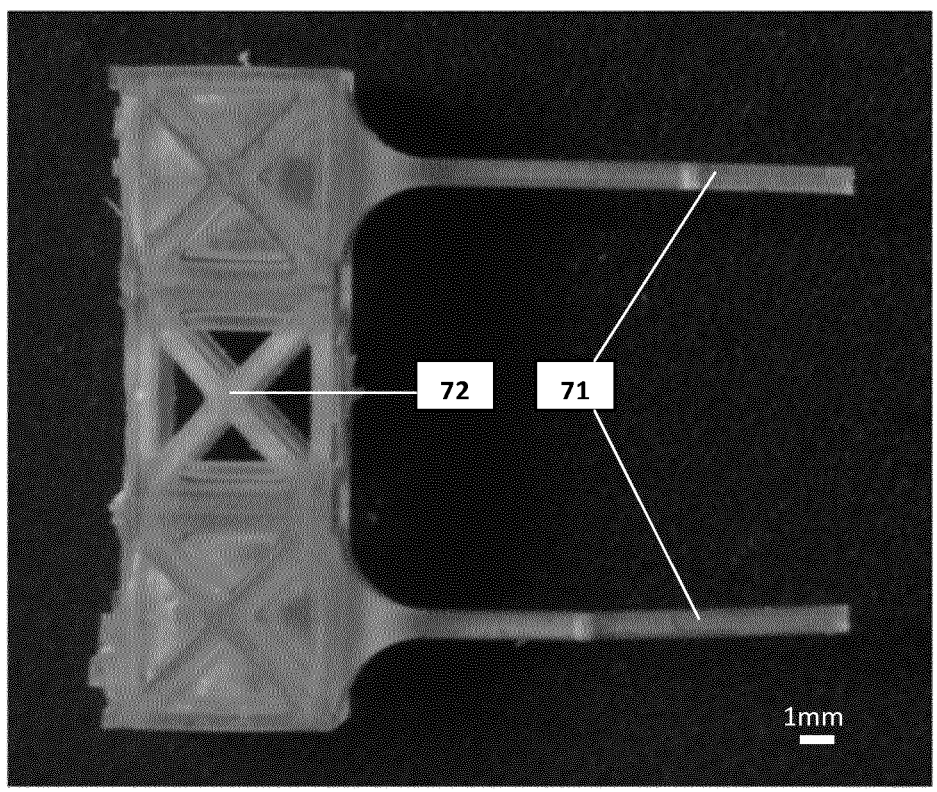
FIG. 13 shows a picture of an embodiment comprising two movable fibers connected together, prepared by 3D printing FIG. 14 provides two pictures illustrating examples of movable fibers connected together by interweaving in a textile.
Figure 14:
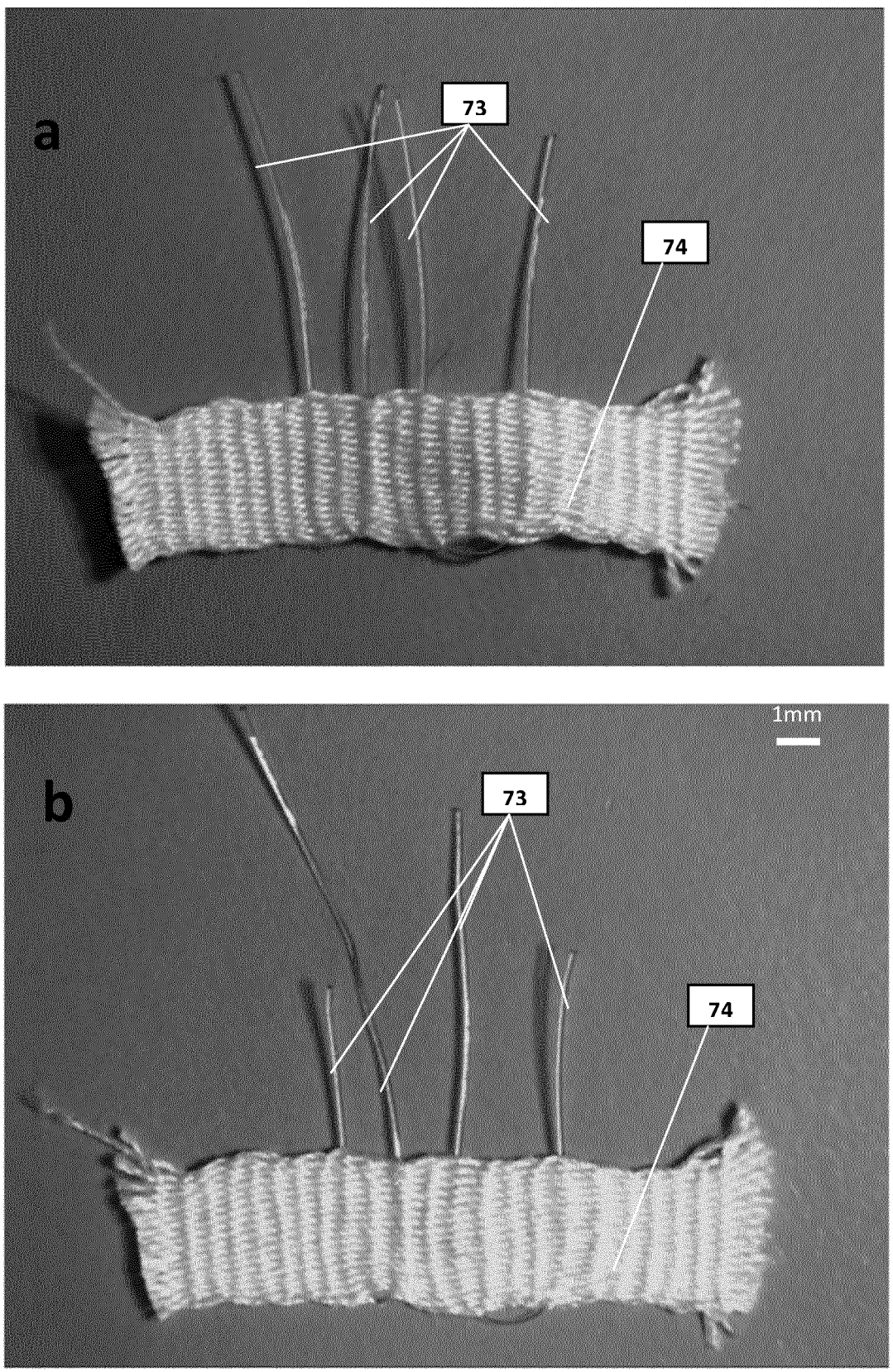

Movable fibers can be linked together in order to allow the opening or closing of several compartments with a single move. This example shows two technical solutions to this linking. On FIG. 13, two 3D-printed movable fiber [71] are attached to a support structure [72]. On FIG. 14, four nylon movable fibers [73] are loomed in a fabric structure [74]. FIG. 14*b* shows the possibility to use several movable fibers [73] with different lengths, linked to the same support structure [74]. The schematic on FIG. 15 illustrates the use of such movable comb [75] for a sequential filling of a microchannel [76]. As the movable comb is pulled out of the chip, as shown on the FIG. 15 *b, c, d*, movable fibers [73*a*] are removed from the microchannel [76], by sliding along the guiding ducts [73*b*], the liquid [77], initially in the chamber [78] fills sequentially the whole microchannel.

Example 10

This example shows another functionality of the chip described in Example 6, using a movable fiber with non-uniform thickness along its length. The system can be used as a valve that can be opened and closed repeatedly. The movable fiber blocks or lets fluid pass from one side of a microchannel to the other, depending on the thickness of the fiber that separates the microchannel into two, by moving the fiber along its length.

A fluorocarbon movable fiber [80] used in this example has originally a homogenous diameter of 86 μm, which is 6 μm larger than the microchannel height. Some part [81] of its length are flattened to have a smaller thickness than the microchannel height by pinching with tweezers. First, the movable fiber [80] is positioned in the guiding duct [82] with its flattened parts [81] away from the intersection [83] with the microchamber. In this configuration, which corresponds to a "closed" state of the valve, the microchamber is initially separated into two compartments. One compartment [84] is filled with colored water and the other compartment [85] is filled with non-colored water. As shown in FIG. 16*a*, there is no leakage between the two compartments in this configuration. Next, the fiber [80] is moved along the guiding duct [82] so that the flattened parts [81] are brought inside the guiding duct [82]. This configuration corresponds to an open configuration of the valve. As shown in FIGS. 16*b* and 16*c*, colored water [84*a*] crosses the movable fiber [80] through the flattened parts [81] of the movable fiber. This valve can be closed again by moving the flattened parts outside the guiding duct [82], as shown in FIG. 16*d*.

Example 11

This example shows another technical solution to create a valve in a microchannel, using a movable fiber [86] with via [87], in the same configuration as Example 9.

The movable fiber here is a thin bar of plastic [86] with via [87], as shown in FIG. 17*a*. In this embodiment, the fiber was prepared by 3D printing, but any other fabrication means known in the art could be suitable, such as molding, casting, micromachining, lithography, and the like. FIGS. 17*b* and *c* show the top view of a microchannel [88] with a 3D-printed movable fiber [86] inserted into a guiding duct

[85]. FIG. 17b illustrates a closed-position of the valve. All the vias [87] are located outside the microchamber [89] in the guiding duct [85], and the microchamber [89] is hermetically separated into two compartments. FIG. 17c shows an open-position of the valve. Sliding the 3D-printed element allows the via [87] to be displaced to the channel or guiding duct [88] joining the chambers, and create a fluidic connection between the right side [88a], and the left side [88b]. In this position, the two compartments communicate through the via [87] and the ink can diffuse on the previously inaccessible part of the microchannel.

Example 12

This example shows different movable fibers with a via. FIG. 18 illustrates a technical solution to create a rectangular movable fiber [86] by micromilling. A planar copper sheet of 250 μm is taped to a metallic support and milled by a tool with a diameter of 1 mm. Two vias [87] are then created with a tool with a diameter of 200 μm.

Example 13

FIG. 19 illustrates different exemplary embodiments of via in a movable fiber, with various shapes and positions: a circular fiber [90] with a indentation [91] (FIG. 19a), a rectangular and transversal via [92] in a circular fiber [93] (FIG. 19b), a via [94] between two adjacent planes [95] of a square fiber [95a] (FIG. 19c) and a via with one inlet [96] and two outlets [97] in a square fiber [98] (FIG. 19d).

Example 14

This example describes an exemplary embodiment of an integrated pump, operating thanks to three movable fibers [100a, 100b, 100c] of the invention, two of which [100a, 100b] are connected together, and a third one [100c] being actuated synchronously with the first two. The two linked movable fibers [100a, 100b] present via [101a, 101b], and the third movable fiber [100c] does not present a via. The pump operates as shown on FIG. 20. On FIG. 20b, the movable fiber [100c] is pulled out of the microchannel [102] and sucks the liquid from the inlet [103] through the upstream via [101a], like a microsyringe. The linked movable fibers [100a, 100b] are then displaced (FIG. 20c) by pulling the support structure [104], the downstream via [101b] is now in the microchannel [102]. The movable fiber [100c] is then pushed in the microchannel [102], pulling the liquid through the downstream via [101a] (FIG. 20d). The linked movable fibers [100a, 100b] are then pulled out in order to place the upstream via [101b] in the microchannel [102] (FIG. 20e). The cycle can be repeated to induce a pumping from the inlet to the outlet. FIG. 21 shows a 3D-printed embodiment of this "movable fiber pump", with the central movable fiber [100c] mobile with respect of the two linked fibers with vias [100a, 100b].

Example 15

This example shows an application of the invention. A microfluidic network including a multiplicity of microchannels [108] and a multiplicity of microchambers [107] is represented on FIGS. 22a and 22b. A movable fiber [104] with indentation [105], capable of sliding along a guiding duct [109], closes or opens microchannels [106] connected to microchambers [107]. FIG. 22a shows an open state of the system, enabling the loading of the microchambers [107] from the loading microchannels [108]. After loading, the microchambers [107] are isolated by sliding the movable fiber [104] to the close state of the system, as shown on the FIG. 22b. Then, each chamber [107] is insulated, and can be used for instance to perform digital PCR and single cell experiments.

The invention claimed is:
1. A minifluidic device, comprising:
   actuation means;
   a matrix;
   an elongated guiding duct embedded at least in part in said matrix with at least one port to the outside of the matrix, all of a perimeter of said guiding duct, on at least part of a length of said guiding duct, being surrounded by said matrix;
   a movable fiber at least partly contained in said guiding duct, said movable fiber being slidable so as to undergo a sliding with respect to the matrix within said guiding duct,
   at least a portion of a length of the movable fiber being elastic or non-linear, or
   at least part of the matrix being elastic such as to be one of:
      a hard elastic material having an elastic modulus comprised between 100 kPa and 100 MPa,
      a moderately hard elastic material having an elastic modulus comprised between 20 and 500 kPa, and
      a soft elastic material having an elastic modulus comprised between 50 Pa and 100 kPa, wherein said actuation means induces onto said movable fiber at least one of a pulling or a pushing, at least along a part of said fiber.

2. The minifluidic device according to claim 1, further comprising:
   at least one zone in fluidic connection with said guiding duct, said zone being selected from: a fluid drop area, a reservoir, and a chamber.

3. The minifluidic device according to claim 1, wherein the means for actuation are mechanical means that induce onto said movable fibers at least one of a pulling or a pushing.

4. The minifluidic device according to claim 1, wherein a multiplicity of said movable fibers are at least partly contained in a multiplicity of said guiding ducts and are slidable so as to undergo a sliding within said guiding ducts and along said fibers.

5. The minifluidic device according to claim 4, wherein at least some of said movable fibers re mechanically related, and actuatable together by a single manipulation means.

6. The minifluidic device according to claim 1, wherein the movable fiber comprises at least one zone presenting fluid flow properties different from fluid flow properties in a part of the fiber different from said at least one zone.

7. The minifluidic device according to claim 1, wherein at least one of the guiding duct, the matrix, and the movable fiber is flexible or semi-flexible.

8. The minifluidic device according to claim 1, further comprising:
   at least one channel intersecting with the guiding duct, or
   at least one channel network in fluidic communication with the guiding duct.

9. The minifluidic device according to claim 1, wherein the actuation of said movable fiber within the guiding duct modifies a fluidic connectivity, or at least one fluidic resistance, within a channel or within a channel network of the device.

10. The minifluidic device according to claim 1, further comprising:
- a textile component embedded in said matrix,
- wherein the guiding duct is entangled with said textile component.

11. The minifluidic device according to claim 1, wherein the path of the guiding duct is non-linear or is three-dimensional, or the guiding duct is in fluidic connection with a non-linear or three dimensional channel or with a non-linear or three-dimensional channel network.

12. An instrument comprising a device according to claim 1, said instrument being any of, or any combination of, an analytical instrument, a medical instrument, a functional clothing, a wearable instrument, an implantable instrument, a monitoring instrument, a processing instrument.

13. A kit for preparing, connecting or using a minifluidic device or instrument, comprising:
- a minifluidic device according to claim 1; and
- at least one component selected among:
  - a fluid,
  - a chemical product or a biological product, and
  - an additional physical component.

14. A method of initiating, or modifying, or controlling, or stopping fluid flow in a fluidic device according to claim 1, wherein said method comprises at least one of a pulling along the movable fiber or a pushing along the movable fiber.

15. A method for analyzing any of a biological, a physical or a chemical agent, or for monitoring a process, an environment, a living species, a condition of a patient or for producing a product, or for discovering or testing a drug or an active product, wherein said analysis, monitoring, production, discovery, or test, is performed using a device according to claim 1.

16. The device of claim 2, wherein said fluid drop area or reservoir or chamber is enclosed at least in part within said matrix or supported by said matrix.

17. The device of claim 6, wherein the zone is selected from a group consisting of: a hole, a via, a lumen, an indentation, a change in cross-section, a porous zone, a zone of material permeable to fluids, and a gel.

18. The minifluidic device according to claim 2, wherein a multiplicity of said movable fibers are at least partly contained in a multiplicity of said guiding ducts and are slidable so as to undergo a sliding within said guiding ducts and along said fibers.

* * * * *